(12) United States Patent
Tsibulevskiy

(10) Patent No.: US 12,193,127 B2
(45) Date of Patent: Jan. 7, 2025

(54) CHARGING TECHNOLOGIES

(71) Applicant: Roman Tsibulevskiy, East Brunswick, NJ (US)

(72) Inventor: Roman Tsibulevskiy, East Brunswick, NJ (US)

( * ) Notice: Subject to any disclaimer, the term of this patent is extended or adjusted under 35 U.S.C. 154(b) by 110 days.

(21) Appl. No.: 16/924,265

(22) Filed: Jul. 9, 2020

(65) Prior Publication Data
US 2020/0375011 A1 Nov. 26, 2020

Related U.S. Application Data

(63) Continuation of application No. 16/244,840, filed on Jan. 10, 2019, now Pat. No. 10,716,192, which is a continuation-in-part of application No. 16/118,248, filed on Aug. 30, 2018, now Pat. No. 11,394,247.

(60) Provisional application No. 62/610,258, filed on Dec. 25, 2017, provisional application No. 62/551,782, filed on Aug. 30, 2017.

(51) Int. Cl.
| | |
|---|---|
| *H05B 47/19* | (2020.01) |
| *H02J 7/00* | (2006.01) |
| *H02J 9/06* | (2006.01) |
| *H02J 50/80* | (2016.01) |

(52) U.S. Cl.
CPC ............ *H05B 47/19* (2020.01); *H02J 7/0048* (2020.01); *H02J 7/0049* (2020.01); *H02J 9/061* (2013.01); *H02J 50/80* (2016.02); *H02J 7/0013* (2013.01)

(58) Field of Classification Search
CPC . H05B 47/19; H02J 7/025; H02J 9/061; H02J 7/0013; H02J 7/00036; H02J 7/0048; H02J 7/0049; H02J 7/342; H02J 50/80
See application file for complete search history.

(56) References Cited

U.S. PATENT DOCUMENTS

| | | |
|---|---|---|
| 4,790,514 A | 12/1988 | Marks |
| 5,033,715 A | 7/1991 | Chiang |
| 6,202,980 B1 | 3/2001 | Vincent et al. |
| 7,221,106 B1 * | 5/2007 | Nemir .................. H05B 47/185 315/291 |
| 7,979,928 B2 | 7/2011 | Allen, Jr. et al. |
| 8,162,236 B2 | 4/2012 | Rodenbeck et al. |
| 9,445,481 B2 | 9/2016 | Kim |
| 9,472,982 B2 | 10/2016 | Chintala |
| 9,526,154 B2 | 12/2016 | Thompson |
| 9,692,485 B1 * | 6/2017 | Clark ...................... G05B 15/02 |
| 9,812,890 B1 | 11/2017 | Leabman et al. |
| 10,992,187 B2 | 4/2021 | Leabman |
| 11,316,379 B2 | 4/2022 | Pan et al. |
| 2003/0137258 A1 | 7/2003 | Piepgras |
| 2006/0271244 A1 * | 11/2006 | Cumming ............ G01R 21/133 700/291 |
| 2006/0281435 A1 | 12/2006 | Shearer et al. |
| 2008/0054729 A1 * | 3/2008 | Greene .................. H02J 50/402 315/363 |
| 2008/0166965 A1 * | 7/2008 | Greene .................. H02J 50/40 455/41.1 |
| 2008/0245422 A1 | 10/2008 | McTargett |

(Continued)

FOREIGN PATENT DOCUMENTS

| | | | | |
|---|---|---|---|---|
| CA | 2696931 A1 * | 9/2010 | ........... | A47K 5/1217 |
| CN | 102420466 A | 4/2012 | | |

*Primary Examiner* — Minh D A

(57) ABSTRACT

This disclosure enables various technologies for controlling and charging stationary and mobile devices.

51 Claims, 55 Drawing Sheets

(56) References Cited

U.S. PATENT DOCUMENTS

| | | | |
|---|---|---|---|
| 2009/0058361 A1* | 3/2009 | John | H04B 5/0037 307/104 |
| 2010/0194207 A1 | 8/2010 | Graham | |
| 2010/0237096 A1* | 9/2010 | Wegelin | H02J 50/20 222/63 |
| 2011/0074342 A1* | 3/2011 | MacLaughlin | H02J 50/80 320/108 |
| 2011/0163681 A1 | 7/2011 | Dau | |
| 2011/0163683 A1 | 7/2011 | Steele | |
| 2012/0133213 A1* | 5/2012 | Borke | H02J 50/12 307/104 |
| 2012/0139484 A1 | 6/2012 | Gunderman et al. | |
| 2012/0200756 A1 | 8/2012 | Church | |
| 2012/0206096 A1 | 8/2012 | John | |
| 2014/0015336 A1 | 1/2014 | Weber et al. | |
| 2015/0015195 A1 | 1/2015 | Leabman et al. | |
| 2015/0042168 A1* | 2/2015 | Widmer | H02J 50/80 307/104 |
| 2015/0148971 A1* | 5/2015 | Acker | F24H 15/31 700/282 |
| 2015/0189726 A1 | 7/2015 | Spira | |
| 2015/0214748 A1 | 7/2015 | Lin et al. | |
| 2015/0255994 A1* | 9/2015 | Kesler | H02J 50/12 307/10.1 |
| 2015/0322652 A1* | 11/2015 | Mazz | G05D 7/0623 137/583 |
| 2016/0072301 A1* | 3/2016 | Maniktala | H04B 5/79 307/104 |
| 2016/0097189 A1 | 4/2016 | Guidish | |
| 2016/0126752 A1 | 5/2016 | Vuori et al. | |
| 2016/0294225 A1* | 10/2016 | Blum | H02J 7/0042 |
| 2016/0330825 A1 | 11/2016 | Recker | |
| 2016/0349543 A1* | 12/2016 | Rogers | H05B 47/115 |
| 2016/0372959 A1* | 12/2016 | Faerber | H02J 7/0013 |
| 2017/0047737 A1* | 2/2017 | Ekselius | G06Q 50/06 |
| 2017/0105265 A1 | 4/2017 | Sadwick | |
| 2017/0141582 A1* | 5/2017 | Adolf | H02J 50/12 |
| 2017/0163045 A1* | 6/2017 | Michaelraj | H05K 5/02 |
| 2017/0260722 A1 | 9/2017 | Horwitz et al. | |
| 2017/0358950 A1 | 12/2017 | Zeine et al. | |
| 2018/0034321 A1 | 2/2018 | Tole et al. | |
| 2018/0066423 A1 | 3/2018 | Gaida et al. | |
| 2019/0010683 A1 | 1/2019 | Bush | |
| 2019/0219276 A1 | 7/2019 | Acker | |
| 2020/0153288 A1 | 5/2020 | Baumgarte et al. | |

* cited by examiner

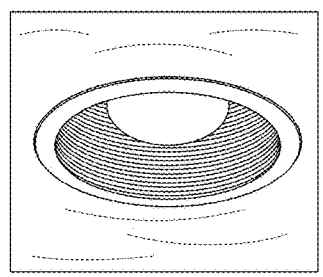
A
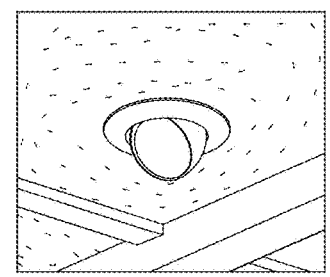
B
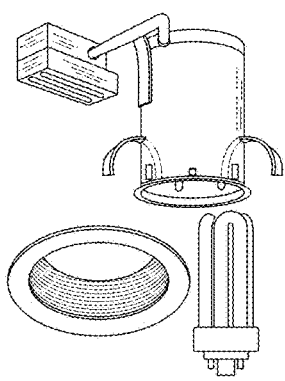
C
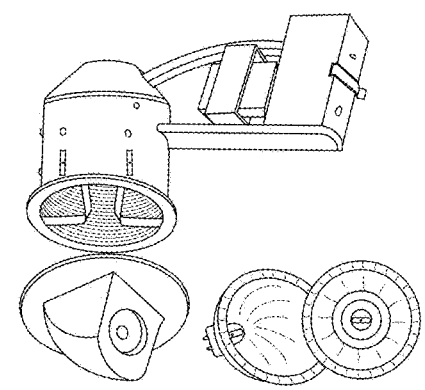
D
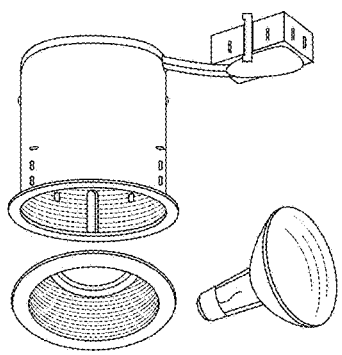
E
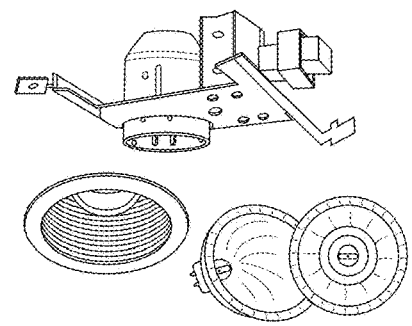
F
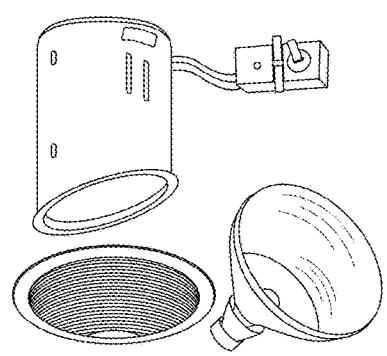
G
Fig. 5b

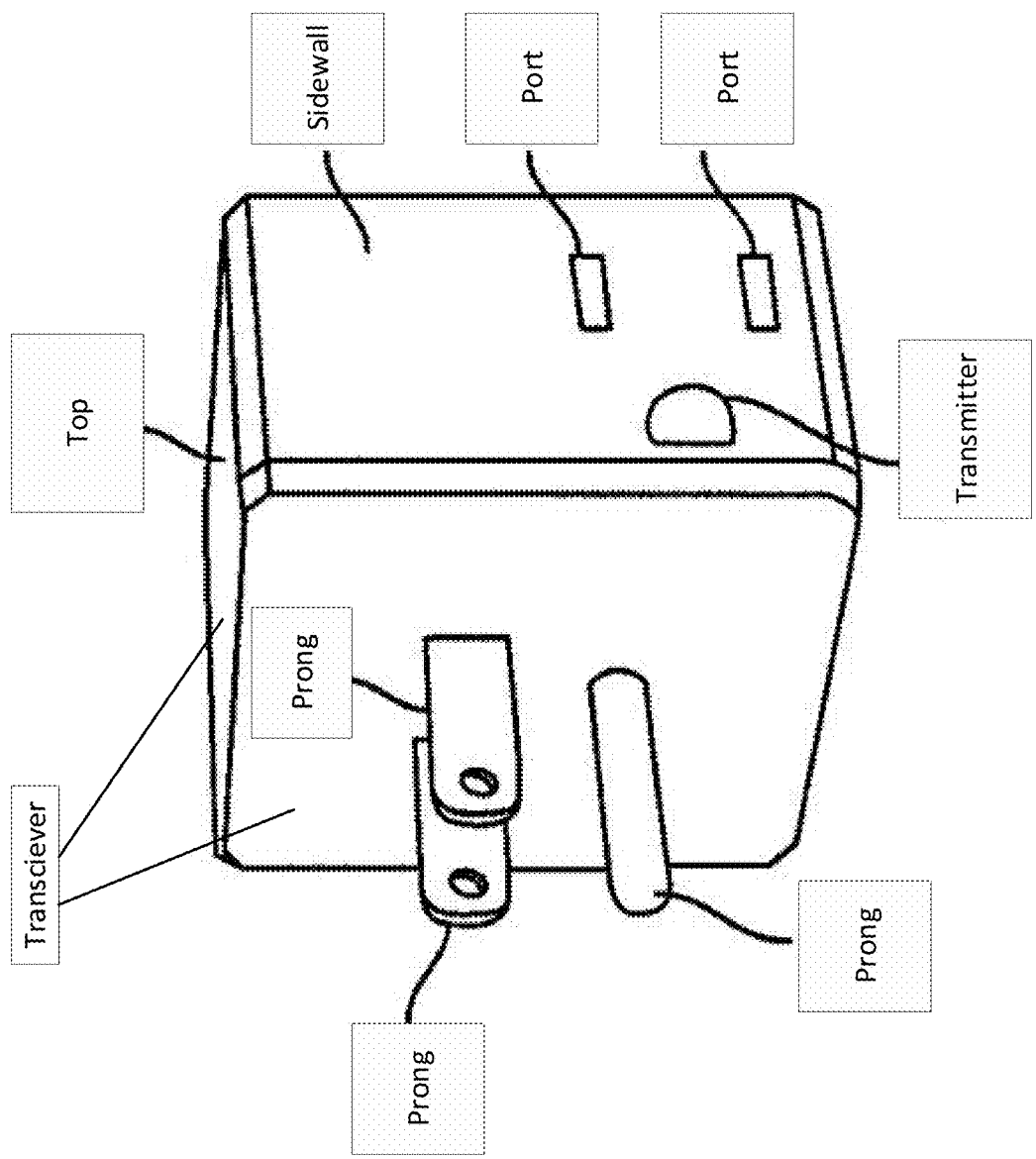

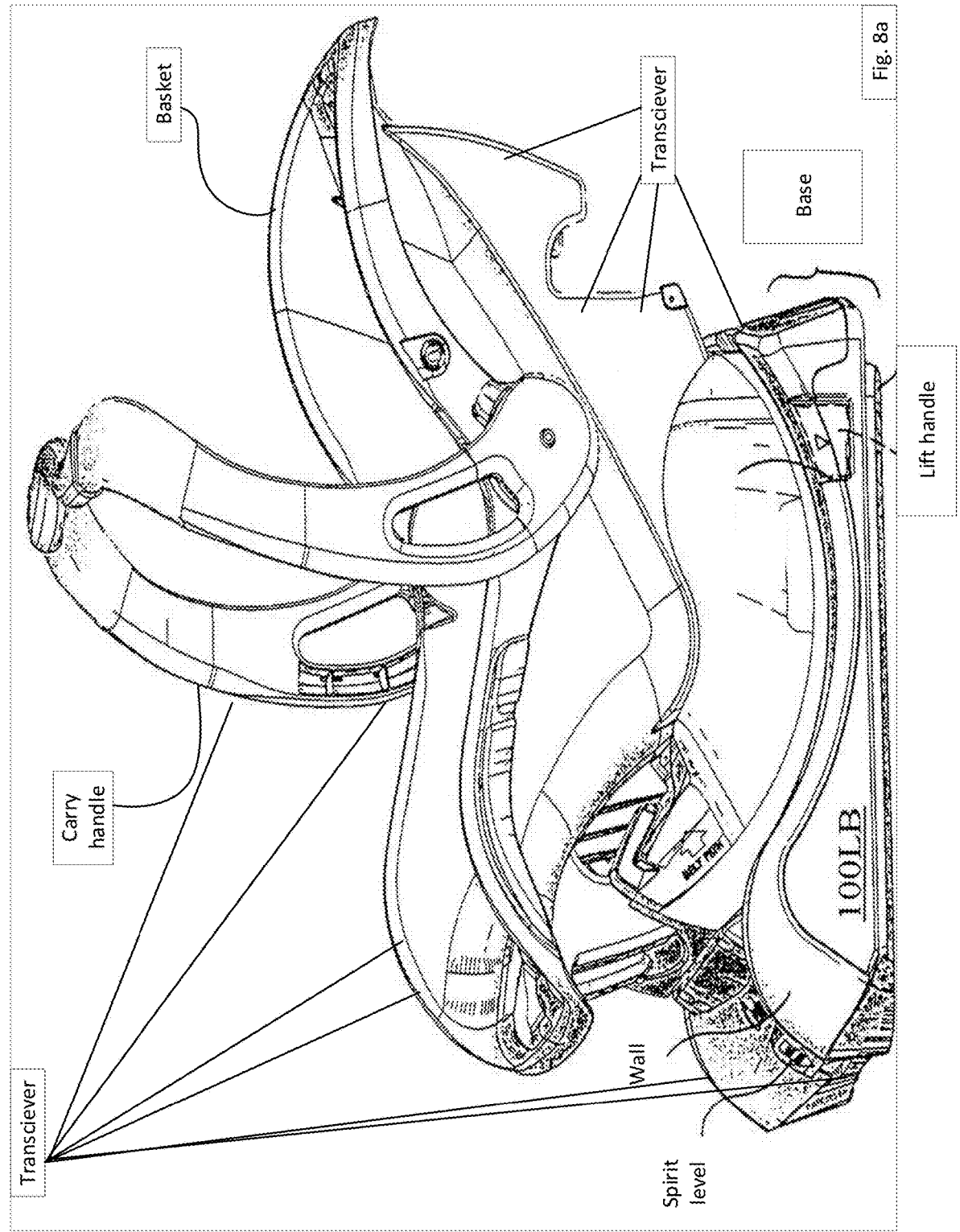

Analog

Electronic

Transciever

Transciever

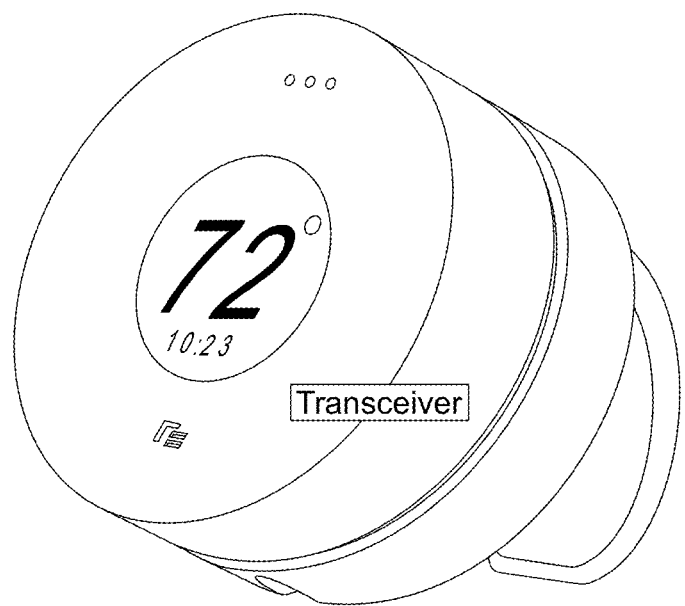
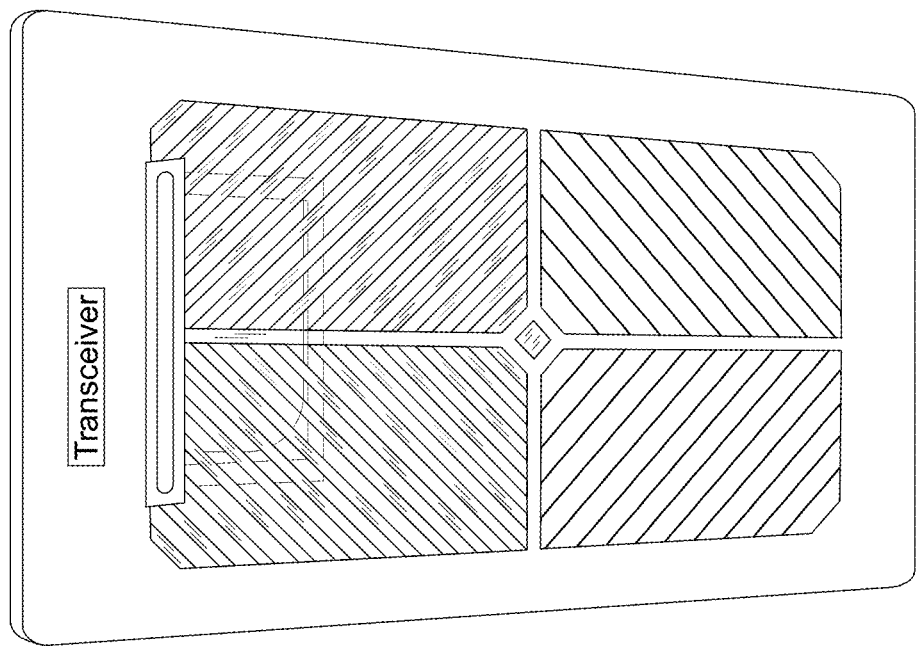
Fig. 43b

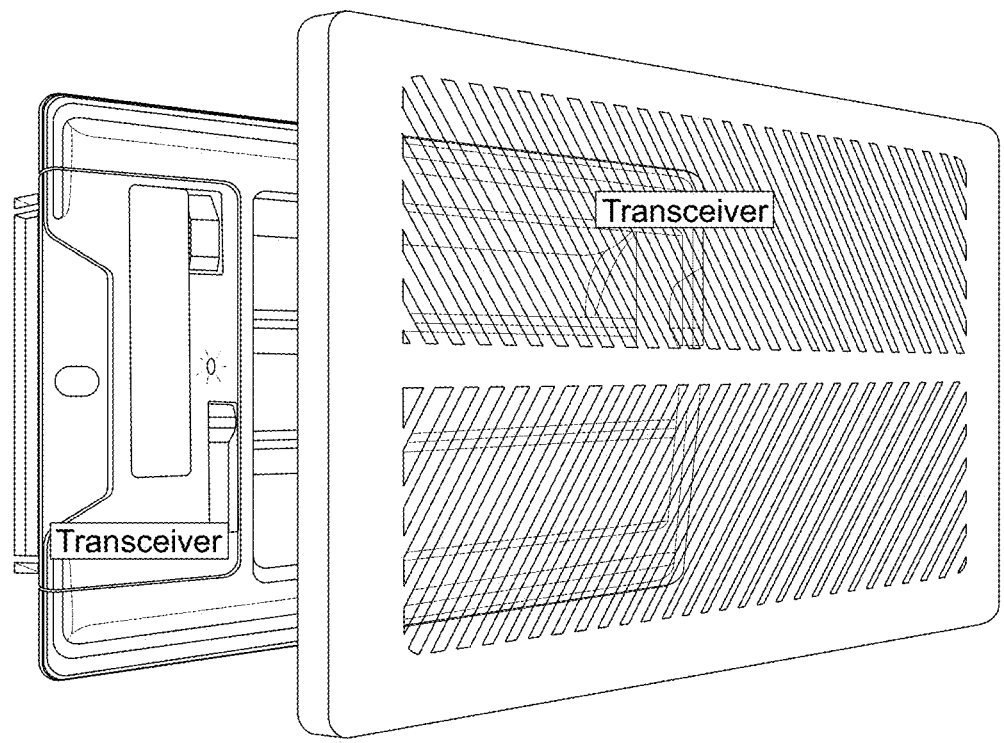
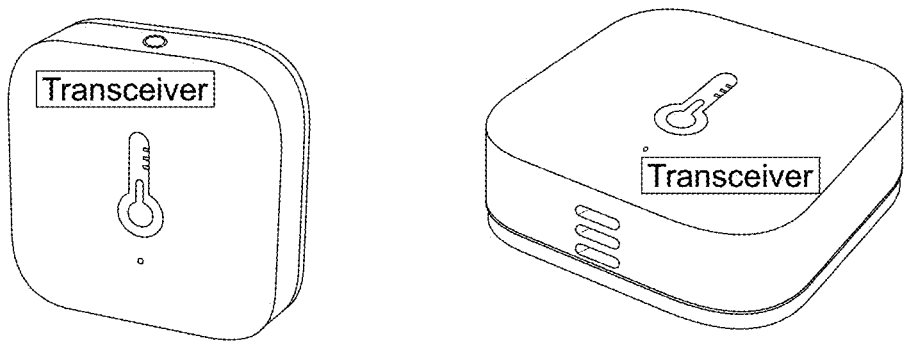
Fig. 43c

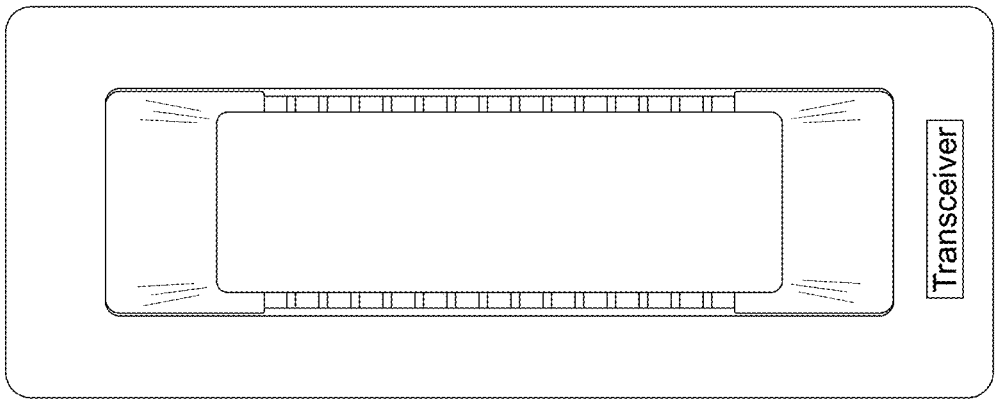
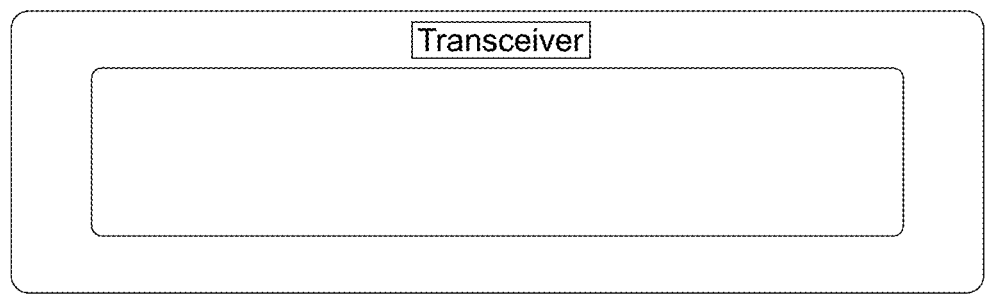
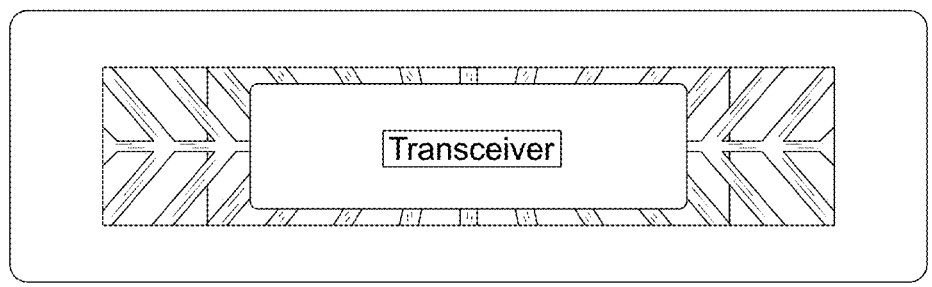
Fig. 43d

CHARGING TECHNOLOGIES

CROSS-REFERENCE TO RELATED PATENT APPLICATIONS

This patent application is a continuation of a U.S. Non-Provisional patent application Ser. No. 16/244,840 filed on Jan. 10, 2019, which is a continuation-in-part of U.S. Non-Provisional patent application Ser. No. 16/118,248 filed on Aug. 30, 2018, which claims a benefit of U.S. Provisional Patent Application 62/551,782 filed on Aug. 30, 2017 and a benefit of U.S. Provisional Patent Application 62/610,258 filed on Dec. 25, 2017, all of which are incorporated by reference herein for all purposes.

BACKGROUND

A constraint on installing a new light fixture is hardwiring the new light fixture. For example, within a residential home, a process of installing the new light fixture, such as a recessed lamp or others, involves opening a wall, a ceiling, or a floor, internally running a wire between a mains powerline and a spot where the new light fixture will be installed, and closing the wall, the ceiling, or the floor such that the wall, the ceiling, or the floor are sufficiently pleasing. This process is laborious, time-consuming, dirty, expensive, dangerous, and unaesthetic, especially when the wire is made to extend between rooms or between floors, especially more than one room or more than one floor. In order to avoid opening and closing the wall, the ceiling, or the floor, some residents elect to run the wire externally on the wall, the ceiling, or the floor. However, this is laborious, time-consuming, dangerous, and unaesthetic.

BRIEF DESCRIPTION OF DRAWINGS

FIG. 5b shows a diagram of a plurality of embodiments of a plurality of light fixtures according to this disclosure.

FIGS. 7a-7c show a diagram of an embodiment of a device for wireless charging according to this disclosure.

FIGS. 8a-8c show a plurality of diagrams of a plurality of embodiments of a plurality of car seats for a plurality of children according to this disclosure.

FIGS. 43a-43d show a plurality of diagrams of a plurality of embodiments of a plurality of powered vents/registers/dampers according to this disclosure.

DETAILED DESCRIPTION

Figure 1A:
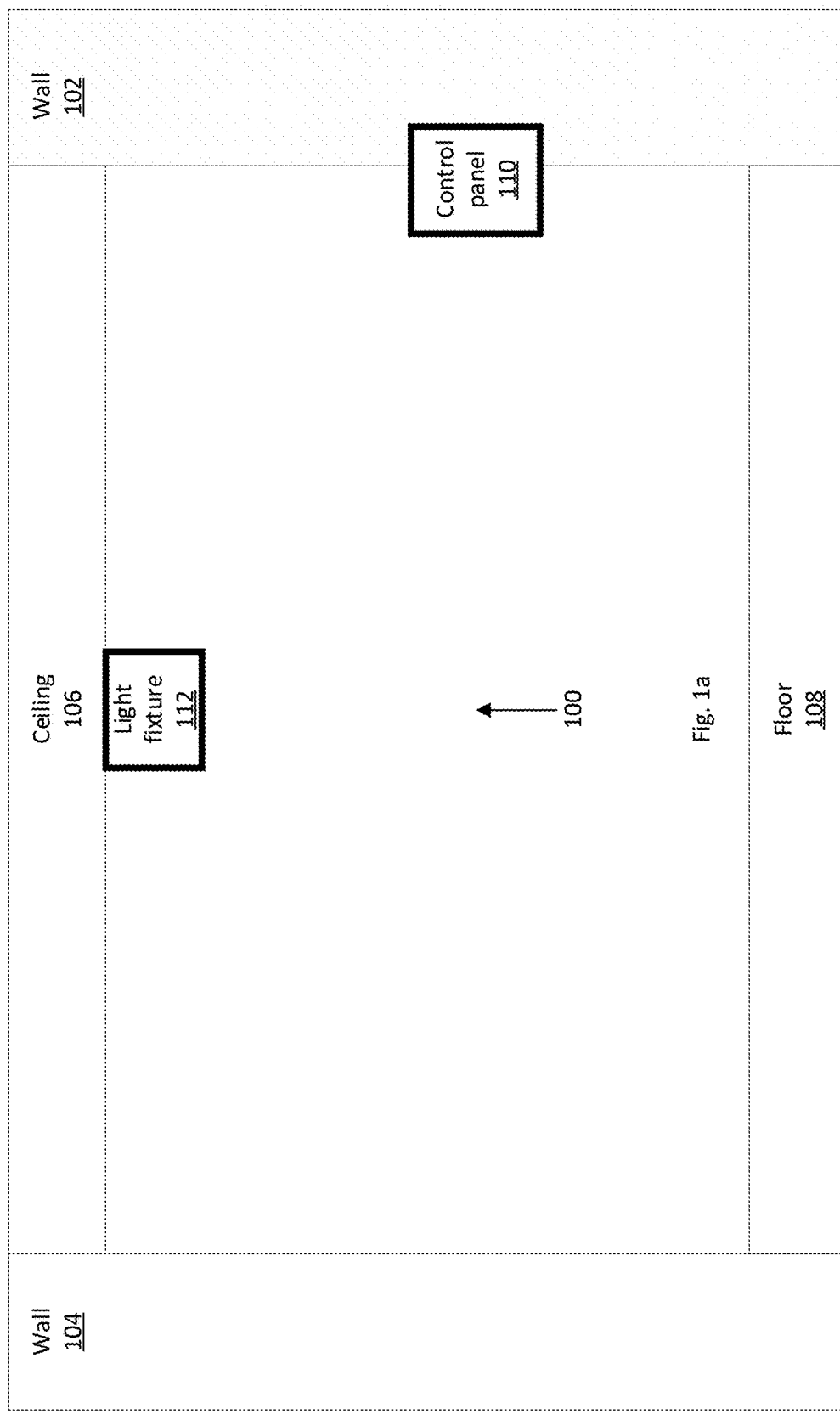
FIG. 1a shows a diagram of an embodiment of a defined area with a control panel and a light fixture according to this disclosure.

This disclosure may be embodied in many different forms and should not be construed as necessarily being limited to various embodiments disclosed herein. Rather, these embodiments are provided so that this disclosure is thorough and complete, and fully conveys various concepts of this disclosure to skilled artisans. In addition, features described with respect to certain embodiments may be combined in or with various other example embodiments in any permutational or combinatory manner. Different aspects or elements of example embodiments, as disclosed herein, may be combined in a similar manner. A term "or others," "combination", "combinatory," or "combinations thereof," as used herein, refers to all permutations and combinations of listed items preceding that term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. Skilled artisan will understand that typically there is no limit on number of items or terms in any combination, unless otherwise apparent from the context.

Various terminology used herein can imply direct or indirect, full or partial, temporary or permanent, action or inaction. For example, when an element is referred to as being "on," "connected" or "coupled" to another element, then the element can be or avoid being directly on, connected or coupled to the other element and/or intervening elements may be present, including indirect and or direct variants. In contrast, when an element is referred to as being "directly connected" or "directly coupled" to another element, there are no intervening elements present.

Although terms first, second, etc. may be used herein to describe various elements, components, regions, layers or sections, these elements, components, regions, layers or sections should not necessarily be limited by such terms. These terms are only used to distinguish one element, component, region, layer or section from another element, component, region, layer or section. Thus, a first element, component, region, layer, or section discussed below could be termed a second element, component, region, layer, or section without departing from the teachings of this disclosure.

Various terminology used herein is for describing particular embodiments only and is not intended to be necessarily limiting of this disclosure. As used herein, a singular form of "a," "an" and "the" are intended to include plural forms as well, unless the context clearly indicates otherwise. For example, a term "a" or "an" shall mean "one or more," even though a phrase "one or more" is also used herein. Terms "comprises," "includes" or "comprising," "including" when used in this specification, specify a presence of stated features, integers, steps, operations, elements, or components, but do not preclude a presence or addition of one or more other features, integers, steps, operations, elements, components, and/or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

Embodiments of this disclosure are described herein with reference to illustrations of idealized embodiments (and intermediate structures) of this disclosure. As such, variations from the shapes of the illustrations as a result, for example, of manufacturing techniques and/or tolerances, are to be expected. Thus, the embodiments of this disclosure should not be construed as necessarily limited to the particular shapes of regions illustrated herein, but are to include deviations in shapes that result, for example, from manufacturing.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be or avoid being instituted and still have one of ordinary skilled in the art recognize the modified feature as still having the required characteristics and capabilities of the unmodified feature. In general, but subject to the preceding discussion, the term "about," "substantial," and/or "substantially" refers to an up to and including a +/−15% variation from the nominal value/term. Such variation is always included in any given value/term provided herein, whether or not such variation is specifically referred thereto.

All elements, as disclosed herein, can be or avoid being formed from a same, structurally continuous piece, such as being unitary, or be separately manufactured or connected, such as being an assembly or modules. All elements, as disclosed herein, can be or avoid being manufactured via any manufacturing processes, whether or not additive manufacturing, subtractive manufacturing, and/or other any other types of manufacturing. For example, some manufacturing processes include three-dimensional (3D) printing, laser cutting, computer numerical control (CNC) routing, milling, pressing, stamping, vacuum forming, hydroforming, injection molding, lithography, chiseling, and so forth.

All elements, as disclosed herein, can be or avoid being a part of, are, or include, whether or not partially or fully, a solid, including a metal, a mineral, an amorphous material, a ceramic, a glass ceramic, an organic solid, such as wood or a polymer, such as rubber, a composite material, a semiconductor, a nanomaterial, a biomaterial, a shape memory material (e.g. metal, plastic), a fabric (e.g. interweaved circuitry), a leather, a silicone, a rubber, a piezoelectric material, a hook-and-loop interface (hook surface or loop surface) with interweaved circuitry (hook interface, loop interface, when hook surface and loop surface engage each other and thereby create an electrical circuit), or any combinations thereof. All elements, as disclosed herein, can be or avoid being a part of, are, or include, whether or not partially or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, non-translucency, opaqueness, luminescence, reflection, anti-reflection and/or holography, a photosensitive coating, an electronic or thermal property coating, such as for passivity, insulation, resistance or conduction, a magnetic coating, a water-resistant or waterproof coating, a scent coating or any combinations thereof. All elements, as disclosed herein, can be or avoid being rigid, flexible, elastic, resilient, shape memory, or any other combinations thereof. All elements, as disclosed herein, can be or avoid being identical or different from each other in material, shape, size, color, or any measurable dimension, such as length, width, height, depth, area, orientation, perimeter, volume, breadth, density, temperature, resistance, and so forth.

Hereby, all issued patents, published patent applications, and non-patent publications that are mentioned or referred to in this specification are herein incorporated by reference in their entirety for all purposes, to a same extent as if each individual issued patent, published patent application, or non-patent publication were specifically and individually indicated to be incorporated by reference. To be even more clear, all incorporations by reference specifically include those incorporated publications as if those specific publications are copied and pasted herein as if originally included in this disclosure for all purposes of this disclosure. Therefore, any reference to something being disclosed herein includes all subject matter incorporated by reference as explained above. However, if any disclosures are incorporated herein by reference and such disclosures conflict in part or in whole with this disclosure, then to an extent of the conflict or broader disclosure or broader definition of terms, this disclosure controls. If such disclosures conflict in part or in whole with one another, then to an extent of conflict, the later-dated disclosure controls.

Figure 2:
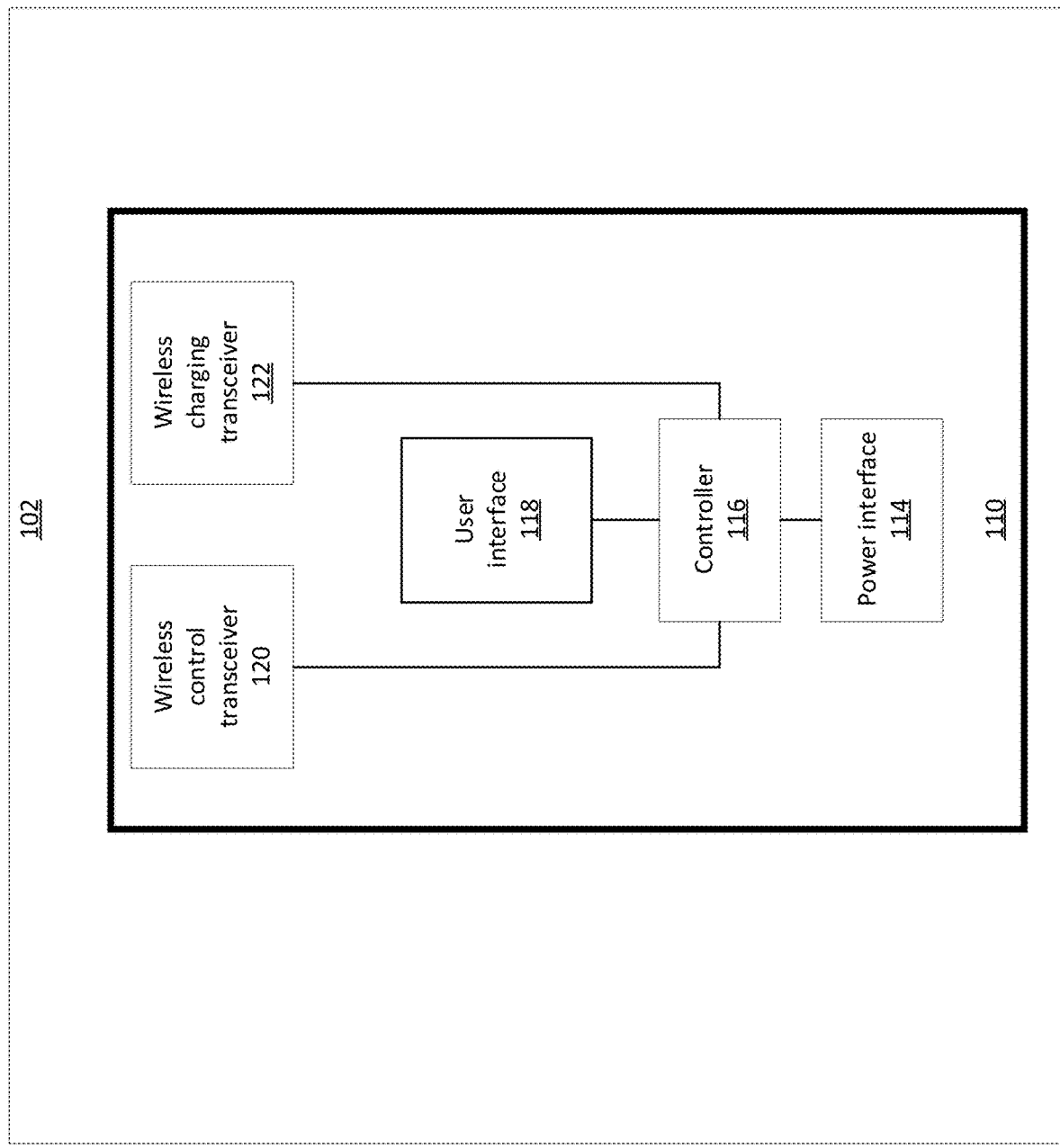
FIG. 2 shows a diagram of an embodiment of a control panel according to this disclosure.
Figure 3:
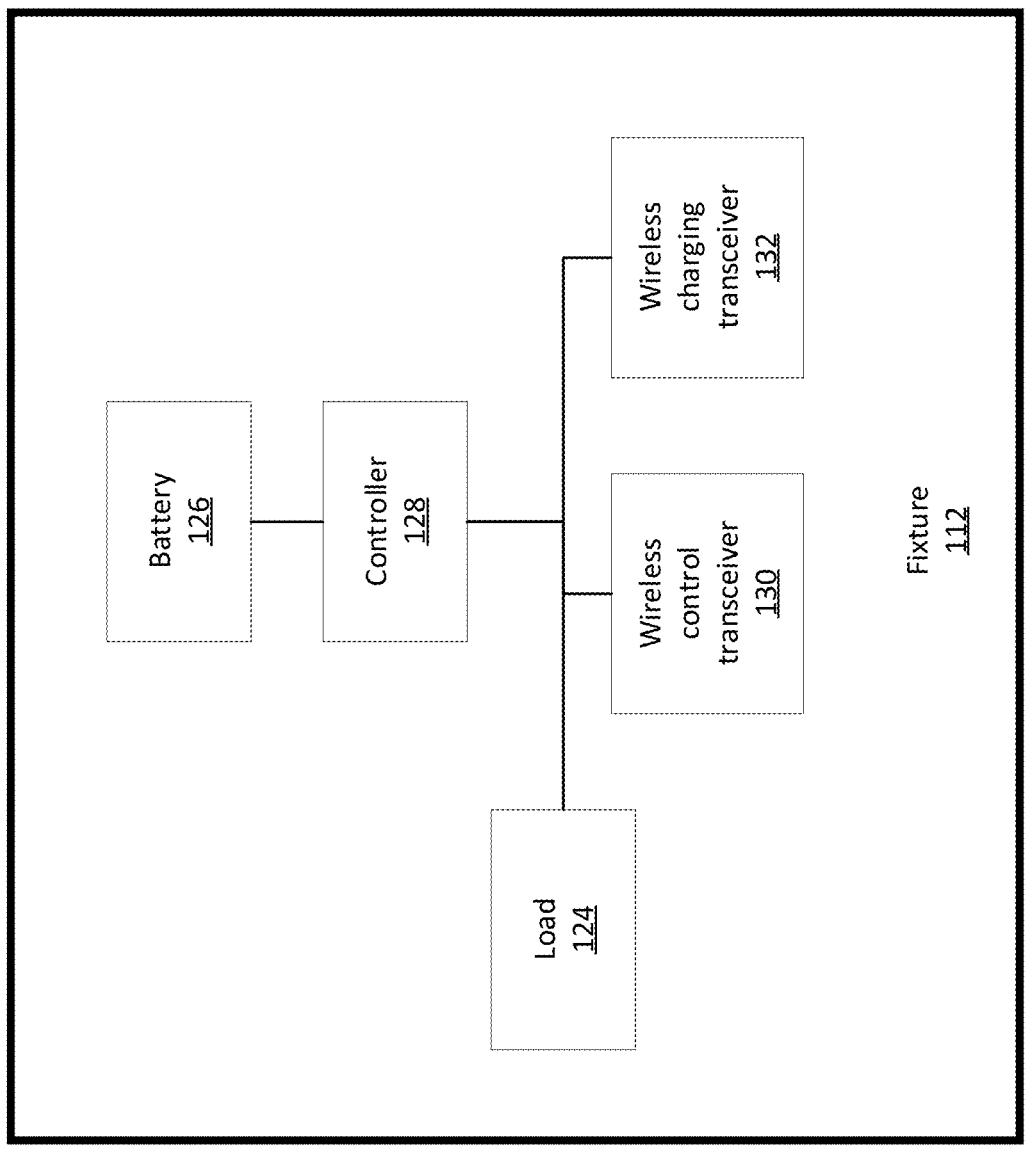
FIG. 3 shows a diagram of an embodiment of a fixture according to this disclosure.
Figure 4:
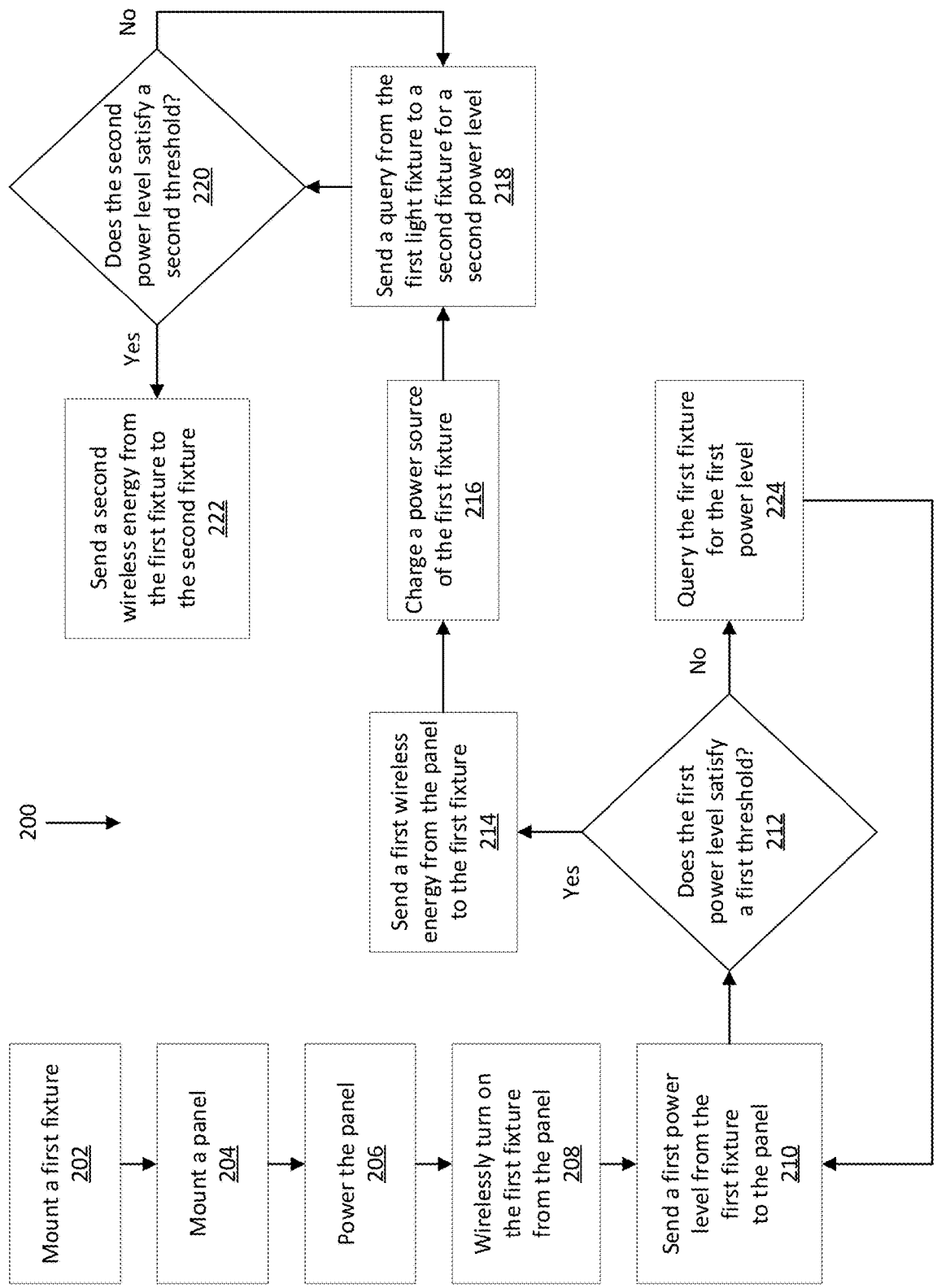
FIG. 4 shows a flowchart of an embodiment of a process for operating a fixture according to this disclosure.

FIG. 1 shows a diagram of an embodiment of a defined area including a control panel and a light fixture according to this disclosure. FIG. 2 shows a diagram of an embodiment of a control panel according to this disclosure. FIG. 3 shows a diagram of an embodiment of a light fixture according to this disclosure. FIG. 4 shows a flowchart of an embodiment of a process for using a fixture according to this disclosure. FIG. 5 shows a diagram of an embodiment of a light fixture according to this disclosure. In particular, a defined area 100 includes a plurality of walls 102, 104, a ceiling 106, and a floor 108. The defined area 100 includes a system including a control panel 110 hosted via the wall 102 and a light fixture 112 (or any other load device otherwise disclosed herein) hosted via the ceiling 106. Resultantly, the control panel 110 can wirelessly control and wirelessly charge the light fixture 112. Additionally, the control panel 110 or the light fixture 112 can operate as a node (e.g. wireless signal hotspot, wireless signal broadcaster, wireless signal rebroadcaster, wireless signal repeater, or wireless signal range extender) in a wireless charging mesh network (e.g. charge other mobile devices or stationary devices). Also, the control panel 110 or the light fixture 112 can operate as a node (e.g. wireless signal hotspot, wireless signal broadcaster, wireless signal rebroadcaster, wireless signal repeater, or wireless signal range extender) in a wireless control mesh network (e.g. control other mobile devices or stationary devices). Note that star or tree networks are possible as well.

The defined area 100 can be or avoid being open-shaped (e.g. U-shape, C-shape, V-shape, L-shape, S-shape, M-shape, N-shape, Z-shape, or others including any permutational combinations thereof) or closed-shaped (e.g. D-shape, O-shape, B-shape, O-shaped, or others including any permutational combinations thereof) along any dimension (e.g. 2-dimensional, 3-dimensional, or others including any combinations thereof) or plane (e.g. horizontal, vertical, diagonal or any others including any permutations thereof), whether or not symmetrically-shaped or asymmetrically shaped or others including any permutational combinations thereof, whether or not indoors, outdoors, or others including any permutational combinations thereof, whether or not in a residential setting, a commercial setting, an industrial setting, a medical setting, a military or law enforcement setting, a government setting, or others including any permutational combinations thereof. For example, the defined area 100 can be or avoid being cuboid-shaped, spherical-shaped, cube-shaped, pyramid-shaped, cone-shaped, polygon-shaped, cylinder-shaped, prism-shaped, trapezoidal-prism shaped, symmetrical-shaped, asymmetrical-shaped, closed-shape, open-shape, or others including any permutational combinations thereof.

The defined area 100 can be stationary or mobile, whether or not any operations thereof or any components thereof are tracked via a blockchain local to or remote from the defined area 100. For example, when stationary, the defined area 100 can avoid or include or be embodied as or be a component of a dining room, a living room, a bathroom, a shower room, a hallway, a sunroom, a kitchen, a den, a corridor, a crawl space, a library, an office, a mailroom, a lobby, an airport hangar, an airport wing or branch or main building or trunk building, a transportation or logistics hub, a bus terminal, a train terminal, a train or subway depot, a boiler room, a plumbing room, a laundromat, a dry cleaning room, a storage room, a closet, a utility room, a dance room or disco, a swimming pool, a basketball or hockey or volleyball court, a baseball field, a tennis court, a basement, a garage, a tent, an opera house, a bank branch (e.g. with or without a drive-through or any others including any permutational combinations thereof), a funeral home or crematorium, a catering hall (e.g. birthdays or wedding or parties or others including any permutational variations thereof), a booth (e.g. a marketing booth, a commercial booth, a food service booth or others including any permutational variations thereof), a vault (e.g. in a bank building or a government building or a commercial building or others including any permutational combinations thereof), a lockbox, a warehouse, a shopping mall, a retail store, a supermarket, a medical procedure room (e.g. operating, imaging, inspection, diagnosis, therapy, monitoring, or others including any permutational combinations thereof), a waiting room, a cleanroom, a tunnel, a laboratory, a gas station, a hospital, a nursing home, a stadium (e.g. soccer, rugby, or others including a permutational combinations thereof), a horse racing track, an ice rink, an entertainment complex, an arena, a gazebo, a pergola, a factory, a succah, a gym, a bunkhouse, a toll booth (e.g. human operated or automated or sensor operated or others including any permutational combinations thereof), a factory, an assembly or conveyor line (e.g. vehicle or appliance or others including any permutational combinations thereof), a cave, a trench, a culvert, a tree house, a swing set, a climbing fort or outdoor toy freestanding climbing structure or playlet or clubhouse, a studio (e.g. photo, audio, image, or others including any permutational combinations thereof), a restaurant (e.g. drive-through or sit-down or human-operated or automated or sensor-operated or others including any permutational combinations thereof), a barn, a shed, a repair shop (e.g. land vehicles or appliances or others including any permutational combinations thereof), a police or fire station, an office building, a self-storage facility, a skyscraper, a high-rise building, a multi-floor building, a videogame arcade machine, an ATM machine, a sprinkler controller, a sprinkler control valve box, a sprinkler head, a stationary robot (e.g. a collaborative robot, an industrial robot, a medical procedure robot, or others including any permutational combinations thereof), a vending machine, a gas (e.g. air, nitrogen, hydrogen, steam, CO, carbon dioxide ($CO_2$), hydrogen sulfide, noble gas, compressed gas, radioactive or non-radioactive gas, or any others including any permutational combinations thereof) or liquid (e.g. water, beverage, alcohol, wine, spirits, crude, gasoline, ammonia, bleach, chlorine, oil, slurry, mud, or any others including any permutational combinations thereof) tank (e.g. a storage tank, a storage reservoir, an underground tank, a generally cylindrical tank, a septic tank, a fuel tank, or others including any permutational combinations thereof), a photobooth, a walk-in refrigerator, a physically fenced area, or others including any permutational combinations thereof.

For example, when mobile, the defined area 100 can avoid or include or be embodied as or be a component of a wearable for a baby, infant, toddler, teenager, adult, elderly, disabled, sick, or others including any permutational combinations thereof, whether or not male or female, whether or not human or animal or bird or fish or pet or others including any permutational combinations thereof. For example, the wearable can avoid or include or be embodied as or be a component of a garment (e.g. outer or inner or others including any permutational combinations thereof), a jacket, an apron, a vest, a shirt, a pair of pants, a pair of shorts, a tie (e.g. elongated or bow or others including any permutational combinations thereof), an undershirt, an underwear, a diaper (e.g. baby or adult or others including any permutational combinations thereof), a pajama set, a sock, a belt, a winter jacket, a fleece, a hoodie, a sweatshirt, a uniform (e.g. sports or military or airline or law enforcement or commercial service provider or others including any permutational combinations thereof), a sweater, a vest or inflatable life vest or bulletproof vest or flak jacket, a shoe, a dress shoe, a boot, a sneaker, a medical shoe, a glove (e.g. with fingers or fingerless or others including any permutational combinations thereof), a mitten, a skullcap, a hat or helmet (e.g. sports or military or industrial or others including any permutational combinations thereof), a baseball hat, a winter hat, a beret, a swimming cap, a swimming fin, a scuba suit, a belt, a sleeping bag, a jewelry item (e.g. ring, bracelet, anklet, necklace, brooche, pin, earring, medal, or others including any permutational combinations thereof), a hazmat suit, an eyewear frame, a hearing aid, a roller blade or skate, a hair accessory (e.g. pin, clip, bow, wig, headband, or others including any permutational combinations thereof), a medical device (e.g. for forecasting medical condition or disease, for diagnosing medical condition or disease, for treating medical condition or disease, for monitoring medical condition or disease, or others including any permutational combinations thereof), or others including any permutational combinations thereof.

For example, when mobile, the defined area 100 can avoid or include or be embodied as or be a component of a land vehicle, an aerial vehicle, a marine vehicle, a space vehicle, a mobile robot, or others including any permutational combinations thereof, whether or not manned or unmanned. For example, the land vehicle can avoid or include or be embodied as or be a component of a car, a jeep, a van, a bus (e.g. a single floor or multi-floor bus, a double decker, or others including any permutational combinations thereof), a tractor, an armored car, a tank or armored vehicle with or without continuous tracks, a truck (e.g. light, medium, or heavy or others including any permutational combinations thereof), a mini truck, a skateboard, a scooter, a minivan, a panel truck, a service truck, a street sweeper, a box truck, a flatbed truck, a mobile crane, a platform truck, a stroller, a bicycle, a motorhome, a cement mixer truck, a towing truck, a hauling truck, a pickup truck, a package delivery truck, a monster truck, a dump truck, a low boy trailer, a trailer, a semi-trailer, a tractor-trailer, a garbage truck, a log carrier, a refrigerator truck, a tank truck, a ballast tractor, a heavy hauler, a haul truck, a motorcycle, a bicycle, a shopping cart, a wheelchair (e.g. motorized or non-motorized or others including any permutational combinations thereof), an ambulance, a police car, a fire truck, a locomotive, a steam engine, a passenger, transport, utility, or tanker rail car, a passenger, transport, or utility subway rail car, a high speed train, a funicular, a cable car, a tram, a trolleybus, a construction crane, a seaport crane, a heavy equipment machine, a pedestrian escalator assembly, a conveyor assembly, a rickshaw, a buggy or horse-drawn cart, a vacuum cleaner (e.g. unmanned or manned or others including any permutational combinations thereof), or others including any permutational combinations thereof.

For example, the heavy equipment machine can avoid or include or be embodied as or be a component of a track-type unit, a grader unit, a skid steer loader unit, an excavator unit, a backhoe or backhoe loader unit, a timber unit, a pipe layer or pipe layer side-boom unit, a scraper unit, a mining unit, an articulating unit, a compactor unit, a loader unit, a material handler unit, a paving unit, an underground unit, a hydromatic tool unit, or others including any permutational combinations thereof. For example, the track-type unit can avoid or include or be embodied as or be a component of an agricultural tractor, a bulldozer, a snowcat, a track skidder, a track-type tractor (e.g. bulldozer or others including any permutational combinations thereof), a tractor, a military engineering vehicle, or others including any permutational combinations thereof. For example, the excavator unit can avoid or include or be embodied as or be a component of an amphibious excavator, a compact excavator, a dragline excavator, a dredging unit, a bucket-wheel excavator, a excavator (e.g. digger or others including any permutational combinations thereof), a front shovel, a long reach excavator, a power shovel, a reclaimer, a steam shovel, a suction excavator, a walking excavator, a trencher (e.g. machine or others including any permutational combinations thereof), a yarder, or others including any permutational combinations thereof. For example, the timber unit can avoid or include or be embodied as or be a component of a feller buncher, a harvester, a skidder, a track harvester, a wheel forwarder, a wheel skidder, or others including any permutational combinations thereof. For example, the scraper unit can avoid or include or be embodied as or be a component of a fresno scraper, a scraper, a wheel tractor-scraper, or others including any permutational combinations thereof. For example, the mining unit can avoid or include or be embodied as or be a component of a construction and mining tractor or truck or others including any permutational combinations thereof. For example, the articulating unit can avoid or include or be embodied as or be a component of an articulated hauler or truck or others including any permutational combinations thereof. For example, the compactor unit can avoid or include or be embodied as or be a component of a wheel dozer, a soil compactor, a soil stabilizer, or others including any permutational combinations thereof. For example, the loader unit can avoid or include or be embodied as or be a component of a loader, a skip loader, a wheel loader (e.g. front loader, integrated tool carrier, or others including any permutational combinations thereof), a tracker loader, or others including any permutational combinations thereof. For example, the material handler unit can avoid or include or be embodied as or be a component of an aerial work platform or lift table, a cherry picker (e.g. with bucket or others including any permutational combinations thereof), a crane, a forklift, a knuckle boom loader (e.g. trailer mount or others including any permutational combinations thereof), a straddle carrier, a reach stacker, a telescopic handler, or others including any permutational combinations thereof. For example, the paving unit can avoid or include or be embodied as or be a component of an asphalt paver, an asphalt planter, a cold planer, a cure rig, a paver, a pavement milling, a pneumatic tire compactor, a roller (e.g. road roller or roller compactor or others including any permutational combinations thereof), a slip form paver, a vibratory compactor, a compactor, or others including any permutational combinations thereof. For example, the underground unit can avoid or include or be embodied as or be a component of a road header, a tunnel boring machine, an underground mining equipment, or others including any permutational combinations thereof. For example, the hydromatic tool unit can avoid or include or be embodied as or be a component of a ballast tamper, a drilling machine, a pile driver, a rotary tiller (e.g. rototiller or rotovator or others including any permutational combinations thereof), or others including any permutational combinations thereof.

For example, the mobile robot (e.g. an automated guided vehicle or others including any permutational combinations thereof) can include a vacuum cleaner or floor washer robot, a wall climbing robot, a walking or running robot, a multi-pedal robot (e.g. tri-pedal, quad-pedal, or others including any permutational combinations thereof), a telepresence robot, a scissor lift or wall climbing robot, whether with or without a sensor-guided (e.g. via barcode, quick response (QR) code, or others including any permutational combinations thereof) suction cup (e.g. motorized to suction out air or not motorized) or electromagnet or gripper arm coupled to a platform in order to pick up a container or box or tote along a vertical, horizontal, or diagonal plane, a window cleaning robot, or others including any permutational combinations thereof. For example, the mobile robot can include a robot floor scrubber (e.g. Auto-C from Brain Corp. powered by Brain operating system (OS)) hosting a plurality of sensors, as disclosed herein. The robot floor scrubber can autonomously navigate based on the sensors to scan its surroundings for obstacles.

For example, the defined area 100 can avoid or include or be embodied as or be a component of a container, which can food-grade or non-food grade, or others including any permutational combinations thereof. For example, the container, when food-grade, can avoid or include or be embodied as or be a component of a plate, a pot, a skillet, a pan, a tray, a spoon, a fork, a knife, a cup, a glass, a bottle, a pacifier, a sucking toy, a cooking appliance, a coffeemaker or coffee brewer, a slow cooker, a mixer, a blender, a toaster, a toaster oven, a seltzer or carbonated or sparkling water maker, a pitcher or bottle with or without a filter, a spout-mounted filter, a bread maker, a deep fryer, a food processor, a cannabis smoking device, a hookah, a cigarette box, a planter or flowerpot, a microwave, or others including any permutational combinations thereof, whether or not with or without a thermal insulation, whether or not with or without a motor, a heating element, an actuator, a sensor, a solenoid valve, a valve, a sensor, a mixer, a pump, or others including any permutational combinations thereof. For example, the container can contain a substance associated with a sale by date (e.g. perishables, liquid, milk, juice, paint, glue) or an expiration date (e.g. perishables, liquid, milk, juice, paint, glue). The container can host a battery and a sensor powered via the battery. The sensor can be configured to track the sale by date or the expiration date relative to current date. For example, the container, when non-food-grade, can avoid or include or be embodied as or be a component of a baby wipe container, a trash can, a soap or shampoo or toothpaste or shaving cream or oil or mouthwash or pre-rinse or sunscreen dispenser, a cleaning liquid or spray or detergent dispenser, a paint can, a gasoline can, a planter or flowerpot, an intermodal container (e.g. walls, floor, room, object inside), or others including any permutational combinations thereof, whether or not with or without a motor, a heating element, an actuator, a sensor, a solenoid valve, a valve, a sensor, a mixer, a pump, or others including any permutational combinations thereof, whether or not with or without a thermal insulation.

The defined area 100 is defined via a plurality of walls 102, 104, a ceiling 106, and a floor 108. At least two of at least one of the walls 102, 104, the ceiling 106, or the floor 108 can be or avoid being structurally similar or dissimilar or others including any permutational combinations thereof. For example, such similarity or dissimilarity can manifest itself via length, width, thickness, area, volume, density, buoyancy, material, coatings, thermal property, electrical property, or others including any permutational combinations thereof. For example, at least two of at least one of the walls 102, 104, the ceiling 106, or the floor 108 can avoid or include plastic, metal or alloy (e.g. copper, aluminum, iron, steel, gold, silver, brass, nickel, bronze, nitinol, carbide, or others including any permutational combinations thereof), wood or composite, rubber, gypsum, stones, drywall, carpet, paper, textile, cement, plaster, tiles, foam, concrete, human or animal or fish tissue, terracotta, polyvinyl chloride (PVC), chlorinated polyvinyl chloride (CPVC), cross-linked polyethylene (PEX), cast iron, cotton, linen, silk, leather, cardboard, paper, carbon fiber, recycled material (e.g. plastic, glass, metal, paper, or others including any permutational combinations thereof), fabric, fabric with interweaved, hook-and-loop (hook or loop), or braided circuitry (e.g. metal, alloy, shape memory material, carbon fiber), shape memory material (e.g. alloy, plastic, nitinol), ceramic, or others including any permutational combinations thereof, whether or not rigid or flexible or elastic or resilient, whether or not solid or perforated, whether or not thermally insulating or electrically insulating, or others including any permutational combinations thereof.

The walls 102, 104 oppose or face each other, but non-opposing or non-facing configuration is possible, such positioned along a same side or others. The ceiling 106 and the floor 108 oppose or face each other, but non-opposing or non-facing configuration is possible, such as positioned offset from each other or others. For example, the walls 102, 104, the ceiling 106, and the floor 108 can define the defined area 100. However, other configurations of defining the defined area 100 are possible, such as when at least one of these components is absent, such as only one wall 102 or 104 or no walls 102, 104 or no ceiling 106 or no floor 108 or others, or when more than two walls 102, 104 are present or more than one ceiling 106 or floor 108 is present, whether or not in front or behind or offset from that respective component or other components.

The defined area 100 can avoid or include or be embodied as or be a component of a control panel 110 (or any other load device or component thereof as disclosed herein) and a light fixture 112 (or any other load device or component thereof as disclosed herein). The control panel 110 can have its own light fixture (or any other load device or component thereof as disclosed herein) or the light fixture 112 can have its own control panel (or any other load device or component thereof as disclosed herein). Although the control panel 110 and the light fixture 112 are distinct devices, the control panel 110 and the light fixture 112 can be a same device, such as via sharing a platform, a chassis, a housing, an enclosure, a case, a frame, a box, a beam, a bar, a chain, a rope, a cable, a fabric, or others including any permutational combinations thereof, whether internally or externally. For example, the control panel 110 and the light fixture 112 can be the same device via the control panel 110 hosting the light fixture 112, the light fixture 112 hosting the control panel 110, or the control panel 110 and the light fixture 112 being hosted via or being components of an intermediary device, such as a platform, a chassis, a housing, an enclosure, a case, a frame, a box, a beam, a bar, a chain, a rope, a cable, a fabric, or others including any permutational combinations thereof. The control panel 110 and the light fixture 112 are exposed to each other or face each other or oppose each other or in line-of-sight of each other or others including any permutational combinations thereof. However, other configurations are possible, such as when the control panel 110 and the light fixture 112 are not exposed to each other or do not face each other or do not oppose each other or not in line-of-sight of each other or others including any permutational combinations thereof.

The control panel 110 is configured for installation, mounting, securing, suspension, fastening, mating, interlocking, adhering, suctioning, magnetizing, tying, or placement into or onto the ceiling 106, the walls 102 or 104, or the floor 108, whether indoors or outdoors, whether in a dry, humid, or moist environment, inclusive via an intermediary device, such as via a bracket, a hook, a box, a case, an encasement, a casing, a smartphone or tablet, a vehicle, an enclosure, a housing, a cabinet, a display, a speaker, a frame, a chassis, a platform, a board, a cable, a rope, a wearable, a chain, a thermostat, a fabric, or others. For example, such installation or placement or mounting or affixing or securing can be or avoid being via an intermediary device, which can be or avoid being positioned therebetween, such as an accessory, a bracket, a housing, a frame, an enclosure, a box, a chassis, a platform, a fastener, a male/female mater, an interlocking mechanism (e.g. French cleat, Lego-style, or others including any permutational combinations thereof), a nail, a hook, a bolt, an adhesive sticker, a hook-and-loop interface, a pocket, a suction cup, a magnet, an electromagnet, a cable, a chain, a rope, a fabric, or others including any permutational combinations thereof.

Note that the control panel 110 can avoid or be embodied as or be a component of or include a corner device (e.g. pyramid shape, cone shaped, cube shape, dome shaped, cuboid shaped, hemisphere shaped, or others) that can be positioned in a corner (e.g. wall-to-wall, wall-to-ceiling, wall-to-floor, ceiling-to-floor, or others) of the defined area 100. The corner device can include a wireless control transmitter 120 or 130, as disclosed herein, or a wireless power transmitter 130 or 132, as disclosed herein, where the corner device can be or function as an intermediary charging or control device between the control panel 110 and the light fixture 112. Note that the intermediary charging or control device does not need to be the corner device and can be positioned anywhere other than the corner. The corner device can be powered via a power source (e.g. mains powerline, battery, capacitor, accumulator, or others). The corner device can include a sensor, as disclosed herein, an input device, as disclosed herein, or an output device, as disclosed herein. For example, the control panel 110 can transmit a wireless power signal or wireless control or information signal to the corner device, which in turn can then act on that signal receipt. For example, the corner device can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices). For example, the corner device can operate as an independent, master, or slave node (e.g. wireless control or informational signal hotspot, wireless control or informational signal broadcaster, wireless control or informational signal rebroadcaster, wireless control or informational signal repeater, wireless control or informational signal booster, or wireless control or informational signal range extender) in a wireless control or informational mesh network (e.g. wirelessly control other mobile devices or stationary devices). However, note that a wireless charging network or a wireless control or informational network can also be star-based or tree-based. The corner device can include an infrared mirror for reflection or retransmission of the wireless power or wireless control or information signal to another device, such as the light fixture 112, mobile devices, stationary devices, fixture devices, or others. Likewise, antenna reflectors can be used for radio based wireless power signals, which can also adjust those signals upon reflection.

As shown in FIG. 1, the control panel 110 is installed or placed or mounted or affixed or secured on the wall 102, such as in a residential room of a detached residential house or others including any permutational combinations thereof. Note that the control panel 110 can also be suspended or hover or float near a ceiling, a wall, or a floor, whether or not indoors or outdoors, whether or not in a dry, humid, dirty, polluted, windy, underground, underwater, or moist environment or others including any permutational combinations thereof. For example, this distance (between the ceiling, the wall, or the floor and the control panel 110) can be within about 20 feet, 15 feet, 13 feet, 11 feet, 10 feet, 7 feet, 5 feet, 3 feet, 1 foot, 9 inches, 7 inches, 5 inches, 3 inches, 1 inch or less inclusive of any intermediate distances therebetween. For example, the control panel 110 can be equally or unequally spaced on the wall along a vertical plane or axis, such as ⅓ or ¼ or ⅕ or ½ or others, in order to assist with more efficient signal transmission or receipt.

The control panel 110 can include, be embodied as, or a component of a light switch, a wall switch, a thermostat, a junction box, an electrical box, a case, an encasement, a casing, a smartphone or tablet, a vehicle, an enclosure, a housing, a cabinet, a frame, a chassis, a platform, a board, a cable, a rope, a wearable, a chain, a fabric, or others such that the control panel 110 can be powered via a mains powerline (e.g. 110 volts, 220 volts, or others) or another power source (e.g. rechargeable battery (e.g. nickel, cadmium, lithium, zinc, alkaline, molten salt, or others), capacitor, accumulator, electric motor or others). For example, the rechargeable battery can be cylindrical shaped, conical shaped, cuboid shaped, button cell shaped, or others.

For example, the control panel 110 can avoid or include or be embodied as or be a component of a light switch, a junction box, an electrical box, a case or encasement, a chassis, a platform, a frame, a faceplate, a mobile device, a housing, a vehicle, an enclosure, a wearable, a light bulb, any load device disclosed herein, a cable, a rope, a housing with a plurality of electrical prongs or pins (e.g. two or three prongs or pins or more) configured for plugging (e.g. male/female mating or others including any permutational combinations thereof) into an electrical wall outlet or socket, or others such that the control panel 110 can be powered via a mains powerline (e.g. 110 volts, 220 volts, or others including any permutational combinations thereof), a battery (e.g. lithium, nickel-cadmium, or others including any permutational combinations thereof), a capacitor, an accumulator, or others including any permutational combinations thereof. For example, the control panel 110 can be or avoid being solid, perforated, rigid, flexible, elastic, resilient, shape memory, or others including any permutational combinations thereof.

The control panel 110 includes a power interface 114, a controller 116 electrically coupled to the power interface 114, a user interface 118 electrically coupled to the controller 116, a wireless control transceiver 120 (e.g. transmitter or receiver) electrically coupled to the controller 116, and a wireless charging transceiver 122 (e.g. transmitter or receiver) electrically coupled to the controller 116, all of which can be housed in or supported via a housing, a platform, a frame, a case, an encasement, a casing, a chassis, an enclosure, a box, or a board, such as a printed circuit board (PCB), a breadboard, a stripboard, or others. The power interface 114 is configured to interface with a power source (e.g. a mains powerline, a battery, an accumulator, a capacitor, or others). The power interface 114 can be or avoid being configured to modify electrical power received, such as via voltage stepping down or voltage stepping up, converting between an alternating current (AC) and a direct current (DC), change amperage, or others.

The user interface 118 includes an input device, such as a button, a switch, a dial, a touch or haptic display, a slider, a rocker, a lever, a touchpad, or others. For example, the user interface 118 can includes a user input device, whether mechanical or electronic. For example, the user input device can include a rocker, a button, a dial, a slider, a touch-enabled or haptic display with an icon-based or tile-based graphical user interface (GUI), a physical or virtual keyboard, a human-machine-interface (HMI), a motion sensor, a proximity sensor, a pressure sensor, a piezoelectric sensor, a heat sensor, a static electricity sensor, a load cell, a microphone, or a camera.

The wireless control transmitter 120 (e.g. transmitter or receiver) are configured to transmit or receive a control or information signal wirelessly via a first wireless technique, such as via a radio wave, a light wave, a sound wave, an infrared wave or others. For example, the wireless control transceiver 130 can transmit or receive the signal wirelessly via infrared, laser, Wi-Fi, Li-Fi, Bluetooth, ZigBee, Z-Wave, LTE, or other technologies, whether in line-of-sight or out of line-of-sight. For example, the wireless control transceiver 120 can transmit or receive, as disclosed in U.S. Pat. Nos. 9,401,252 and 9,557,043, which are fully incorporated by reference herein for at least these purposes and all other purposes, as disclosed herein.

For example, the wireless control transceiver 120 is configured to wirelessly transmit a signal to the light fixture 112 (or any load device disclosed herein) such that the control panel 110 can operate as a remote-control device to the light fixture 112 (or any load device disclosed herein). For example, the signal can inform or command the light fixture 112 (or any load device disclosed herein) to turn on, turn off, activate, deactivate, adjust power setting, adjust input device or output device setting (e.g. motor, actuator, or solenoid valve), adjust timer setting, adjust illumination (or relevant output) characteristic (e.g. dimness, brightness, color, softness, coolness, warmth, intensity, flashing, or movement), or adjust mesh network characteristic (e.g. network parameters, authorization parameters, authentication parameters, encryption parameters, node parameters, node control parameters, node charging parameters, data sharing parameters, quality of service (QOS) parameters, bandwidth or channel parameters, interference parameters, node activation or deactivation parameters, frequency hopping parameters, node help parameters, node data logging parameters, node alarm parameters, frequency/wavelength/modulation parameters, machine learning parameters, augmented reality parameter, sensor parameters, sensor sensitivity, or blockchain parameters).

The wireless control transceiver 120 is configured to wirelessly receive a signal from the light fixture 112 (or any load device disclosed herein). The signal can enable the light fixture 112 (or any load device disclosed herein) to operate as a remote-control device to the control panel 110. For example, the signal can inform or command the control panel 110 (or any load device disclosed herein) to turn on, turn off, activate, deactivate, adjust power setting, adjust input device or output device setting, adjust timer setting, inform of power level of the light fixture 112 (e.g. wireless charging needed or not needed, power level satisfies or does not satisfy a dynamic or static threshold, battery power left in terms of hours or percent on current or projected power load being used), inform of wireless power rate being wired or wirelessly sent to or wired or wirelessly being sent from the light fixture 112 (e.g. current wireless power receiving or transmitting rate or interference level) or adjust mesh network characteristic (e.g. network parameters, authorization parameters, authentication parameters, encryption parameters, node parameters, node control parameters, node charging parameters, data sharing parameters, QOS parameters, bandwidth or channel parameters, interference parameters, node activation or deactivation parameters, frequency hopping parameters, node help parameters, node data logging parameters, node alarm parameters, frequency/wavelength/modulation parameters, machine learning parameters, augmented reality parameter, sensor parameters, sensor sensitivity, or blockchain parameters).

The wireless charging transceiver 122 is configured to transmit a far-field wireless power signal wirelessly via a second wireless technique, such as via a radio wave, a light wave, a sound wave, an infrared laser beam, or others, whether identical to or different from the first wireless technique. For example, the wireless charging transceiver 122 can transmit the signal wirelessly via infrared, laser, Wi-Fi, Li-Fi, Bluetooth, ZigBee, LTE, or other technologies, whether in line-of-sight or out of line-of-sight. For example, the wireless charging transceiver 122 can transmit or receive, as disclosed in United States Patent Application Publication 20170005516, United States Patent Application 20170018976, and United States Patent Application Publication US20170085127, which are fully incorporated by reference herein for at least these purposes and all other purposes, as disclosed herein. For example, the wireless charging transceiver 122 (e.g. transmitter or receiver) can be embodied as Energous WattUp technology device, Ossia Cota technology device, Powercast powerharvester device or powerspot technology device, Wi-Charge technology device, or others. For example, when the wireless power signal includes an infrared laser beam, then a client device can include a receiver with a photovoltaic cell, which can be transparent, as disclosed herein, or be a part of or coated onto a display of the client device.

Note that the wireless charging transceiver 122 can also be configured for a wireless power transfer using a near-field wireless power (e.g. inductive charging). For example, the wireless charging transceiver 122 can be configured as a Qi transceiver for wireless power transfer using inductive charging over distances of up to about 5 centimeters. In such situations, the transceiver 122 can be a charging pad or a compatible device, which is placed on top of the pad, charging via resonant inductive coupling.

The light fixture 112 is configured for installation, mounting, securing, suspension, fastening, mating, interlocking, adhering, suctioning, magnetizing, tying, or placement into or onto the ceiling 106, the walls 102 or 104, or the floor 108, whether indoors or outdoors, whether in a dry, humid, or moist environment, inclusive via an intermediary device, such as via a bracket, a hook, a box, a case, an encasement, a casing, a smartphone or tablet, a vehicle, an enclosure, a housing, a cabinet, a display, a speaker, a frame, a chassis, a platform, a board, a cable, a rope, a wearable, a chain, a thermostat, a fabric, or others. For example, the light fixture 112 can be embodied as a lamp, a ceiling fan, or others.

Figure 5A:
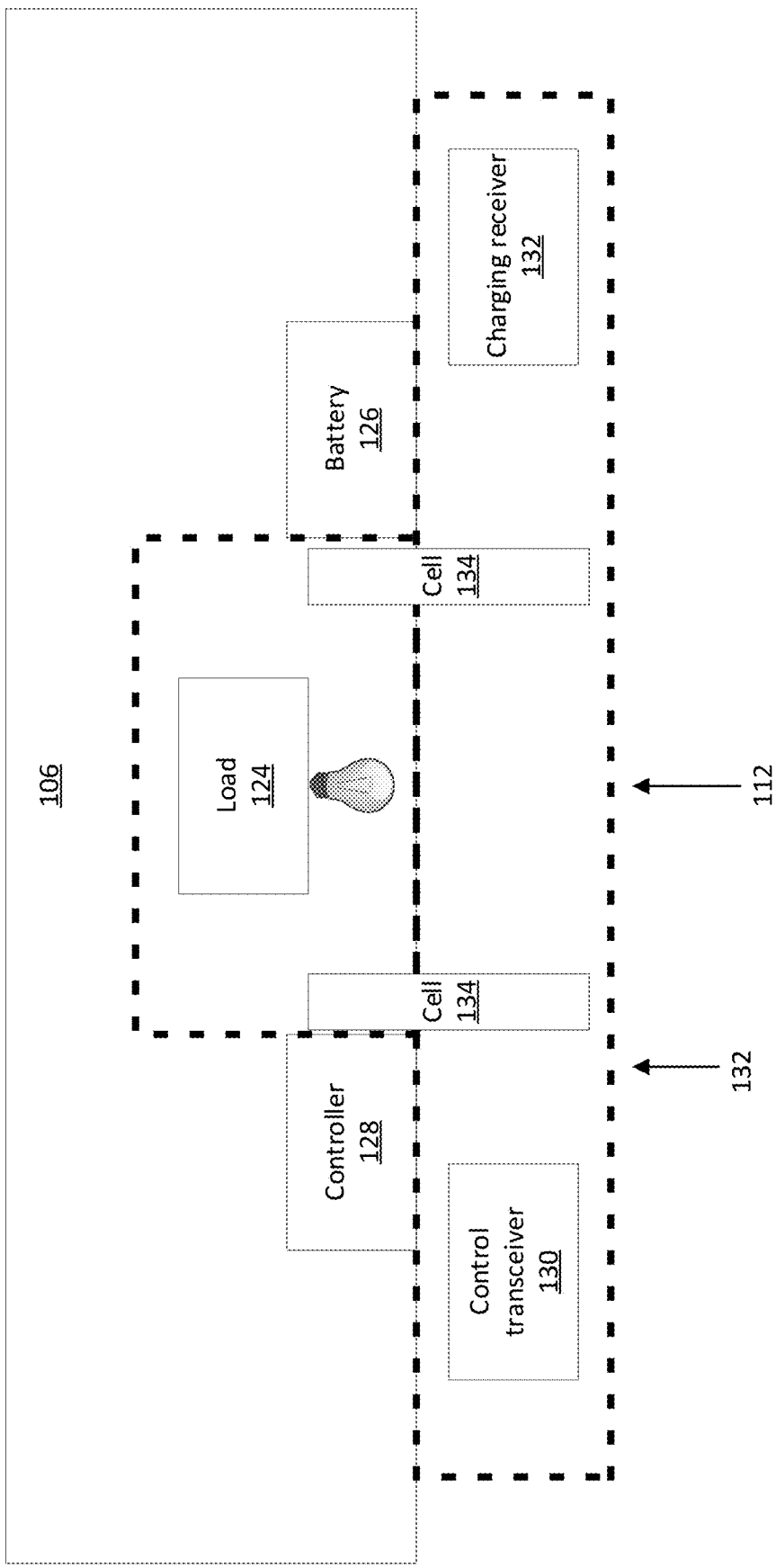
FIG. 5a shows a diagram of an embodiment of a light fixture according to this disclosure.

The light fixture 112 includes a battery 126, a controller 128 powered via the battery 126, a load 124 electrically coupled to the controller 128 and powered via the battery 126, a wireless control transceiver 130 (e.g. transmitter or receiver) electrically coupled to the controller 128 and powered via the battery 126, and a wireless charging transceiver 132 (e.g. transmitter or receiver) electrically coupled to the controller 128 and powered via the battery 126, some, many, most, or all of which can be housed in or supported via a housing, a frame, a chassis, a box, an enclosure, a cable, or others. As shown in FIG. 5a, the wireless control transceiver 130 and the wireless charging transceiver 132 are hosted via a trim of the light fixture 112. However, note that this form of hosting is illustrative and can vary, such as when the wireless control transceiver 130 or the wireless charging transceiver 132 can avoid being hosted via the trim and be hosted in another area, such as within a can of the light fixture 112 or above the ceiling 106 or on the ceiling 106 but not via the light fixture 112 or others.

The wireless control transmitter 130 (e.g. transmitter or receiver) are configured to transmit or receive a control or information signal wirelessly via a first wireless technique, such as via a radio wave, a light wave, a sound wave, an infrared wave or others. For example, the wireless control transceiver 130 can transmit or receive the signal wirelessly via infrared, laser, Wi-Fi, Li-Fi, Bluetooth, ZigBee, Z-Wave, LTE, or other technologies, whether in line-of-sight or out of line-of-sight. For example, the wireless control transceiver 130 can transmit or receive, as disclosed in U.S. Pat. Nos. 9,401,252 and 9,557,043, which are fully incorporated by reference herein for at least these purposes and all other purposes, as disclosed herein.

The wireless charging transceiver 132 is configured to transmit a far-field wireless power signal wirelessly via a second wireless technique, such as via a radio wave, a light wave, a sound wave, an infrared laser beam, or others, whether identical to or different from the first wireless technique. For example, the wireless charging transceiver 132 can transmit the signal wirelessly via infrared, laser, Wi-Fi, Li-Fi, Bluetooth, ZigBee, LTE, or other technologies, whether in line-of-sight or out of line-of-sight. For example, the wireless charging transceiver 132 can transmit or receive, as disclosed in United States Patent Application Publication 20170005516, United States Patent Application 20170018976, and United States Patent Application Publication US20170085127, which are fully incorporated by reference herein for at least these purposes and all other purposes, as disclosed herein. For example, the wireless charging transceiver 132 (e.g. transmitter or receiver) can be embodied as Energous WattUp technology device, Ossia Cota technology device, Powercast powerharvester device or powerspot technology device, Wi-Charge technology device, or others. For example, when the wireless power signal includes an infrared laser beam, then a client device can include a receiver with a photovoltaic cell, which can be transparent, as disclosed herein, or be a part of or coated onto a display of the client device.

Note that the wireless charging transceiver 132 can also be configured for a wireless power transfer using a near-field wireless power (e.g. inductive charging). For example, the wireless charging transceiver 132 can be configured as a Qi transceiver for wireless power transfer using inductive charging over distances of up to about 5 centimeters. In such situations, the transceiver 122 can be a charging pad or a compatible device, which is placed on top of the pad, charging via resonant inductive coupling.

The load 124, whether static or dynamic, can include a bulb socket, an electrical socket, an electric motor (e.g. brushed, brushless, or others), an actuator, a solenoid valve, a printed circuit board, a processor, a sensor, a display, a speaker, a transceiver, an electrical appliance, a valve, a pump, or others. Note that more than one load may be used, whether identical to or different from each other in structure, material, shape, size, or function. For example, the light fixture 112 can host a bulb socket, a motion sensor, a temperature sensor, a fan motor, and a Wi-Fi network transceiver.

The battery 126 can be a single rechargeable battery (e.g. flat, cylindrical) or a bank of rechargeable batteries (e.g. flat, cylindrical), whether coupled serially or in parallel. Note that the single rechargeable battery or the bank of rechargeable batteries can be housed within a case (e.g. flat, cylindrical) or a safety enclosure (e.g. flat, cylindrical) to minimize risk of explosion or fire or to preclude physical or electric access thereto. The light fixture 112 can physically support the battery 126 or the battery 126 is electrically coupled to the load 124, yet not physically supported via the light fixture 112, such as when the battery 126 is supported via a ceiling, a wall, or a floor as shown in FIG. 1. The battery 126 is sufficiently lightweight to be supported via a wall, a ceiling, or a floor as shown in FIG. 1. Note that a time period that the battery 126 can power the load 124 can vary based on context and use. For example, if the load 124 is a A19 socket hosting a LED bulb that draws 9 watts of power, then the battery 126 can support the load 124 for about 24 hours of continuous use, without the battery 126 being recharged. However, note that this is illustrative and variations, whether higher or lower, as known to skilled artisans are possible based on context and use. For example, an incandescent bulb or a halogen bulb may reduce the time period, whereas an LED bulb that draws less than 9 watts of power may increase the time period. Also, note that the load 124 can be any type of electrical load, such as a socket, a sensor, an electric motor, a transceiver, a receiver, a transmitter, an input device, a processor, a memory, an output device, a valve, a solenoid valve, a heating element, a condenser, a pump, an amplifier, a transducer, a light source, a sound source, a display, a filter, an entry/exit sign, or others. For example, the light source may be an infrared light source, an ultraviolet light source, a black light source, or others.

During operation, as shown in FIG. 4, in response to a user input via the input device at the user interface 118 or as programmed in advance, the wireless control transceiver 120 at the control panel 110 wirelessly sends a control or information signal to the wireless control transceiver 130 at the light fixture 112, whether in-line-of-sight or out-of-line-of sight, whether encrypted or unencrypted, such that the controller 128 uses the control or information signal to control the load 124, such as activate load, deactivate load, control load characteristic, or others. The controller 128 periodically or intermittently or continuously monitors a charge level of the battery 126, whether or not the load 124 draws power from the battery 126. In response to the charge level reaching a predetermined threshold level, such as 25% remaining, 33% remaining, 50% remaining, or 66% remaining, or 80% remaining, or vice versa, or others, the controller 128 requests the wireless control transmitter 130 to send a power request signal to the wireless control transceiver 120, whether in-line-of-sight or out-of-line-of sight, whether encrypted or unencrypted, i.e., informing the controller 116 that the battery 126 needs to be recharged. However, the light fixture 112 can periodically or intermittently send the charge level to the control panel 110 such that the control panel 110 determines whether the charge level reached the predetermined threshold. Regardless, in response, the controller 116 requests the wireless charging transceiver 122 to wirelessly send a wireless power signal to the wireless charging transceiver 132, whether in-line-of-sight or out-of-line-of sight, such that the wireless power signal enable recharging the battery 126 until the controller 128 determines that the charge level of the battery 126 has reached a predetermined threshold level, such as 90% remaining, 95% remaining, 100% remaining, or others. Then, the controller 128 requests the wireless control transceiver 130 to send a halt charging signal to the wireless control transceiver 120, whether in-line-of-sight or out-of-line-of sight, i.e., informing the controller 116 that the battery 126 is sufficiently charged and that the wireless charging transceiver 132 should cease transmitting the wireless power signal.

Note that the control or information signal to control and the wireless power signal to charge are not or are independent of each other, i.e., can charge the battery 126 whether the light fixture 112 is activated/deactivated. As such, in context of a building, since the control panel 110 controls the light fixture 112, while charging the light fixture 112, any hardwiring between the control panel and the light fixture is effectively minimized.

In some embodiments, the control panel 110 can be installed or placed or secured into or onto, whether removably or permanently, a ceiling, a wall, a floor, a furniture item, an electrical appliance, a freestanding structure, a plumbing appliance, or others, as disclosed herein, whether indoors or outdoors.

In some embodiments, the control panel 110 is mobile, such as included in or with or is a mobile device that powers the control panel 110, such as a case, a phone, a tablet, a laptop, a toy, a wearable, an eyewear unit, a medical device, a gaming device, a remote control, a vehicle, whether land, marine, or aerial, whether manned or unmanned, or others. For example, the control panel 110 includes the power interface 114 that is configured to interface with a power source, such as a powerline, a rechargeable battery, or others, such that the control panel 110 is powered thereby. For example, the power interface 114 can include a terminal, an electrode, or others. However, as explained above, although the control panel 110 is illustrated in FIG. 1, as being stationary, the control panel 110 can be mobile, such as a smartphone, a tablet, a wearable, a vehicle, a toy, a remote-control unit, or others. As such, the power interface 114 can be configured accordingly. For example, when the control panel 110 is embodied via the smartphone equipped with a rechargeable battery, whether the smartphone is plugged into a wall or computer or vehicular outlet or not, then the power interface 114 draws energy from the rechargeable battery or the wall or computer or vehicular outlet. The power interface 114 can be housed in or on a housing, a junction box, an enclosure, a phone or tablet case, a fabric, or others, or coupled to a board, such as a PCB, a breadboard, a stripboard, or others.

In some embodiments, the control panel 110 is distributed among a plurality of devices, such as the wireless control transceiver 120 (e.g. transmitter or receiver) is included in a first device and the wireless charging transceiver 122 (e.g. transmitter or receiver) is included in a second device, where the first device is positioned at a first location and the second device is positioned at a second location.

In some embodiments, the light fixture 112 can be configured for installation, mounting, securing, suspension, fastening, mating, interlocking, adhering, suctioning, magnetizing, tying, or placement, whether removably or permanently, a ceiling, a wall, a floor, a furniture item, an electrical appliance, a freestanding structure, a plumbing appliance, or others, whether indoors or outdoors. For example, the furniture item can include the light fixture 112 or other fixtures or load devices, as disclosed herein.

In some embodiments, the light fixture 112 is included in a vehicle, whether land, marine, or aerial, whether manned or unmanned, or others. This may be beneficial because of reduced wiring complexity. In some embodiments, the light fixture 112 and the control panel 110 are configured to signally communicate via powerline networking (e.g. control or information signal).

In some embodiments, the light fixture 112 can include at least one of a ceiling dome fixture (whether open or closed), a recessed light fixture (whether a can, a cove, or a troffer), a surface mounted fixture (whether a chandelier, a pendant fixture, a sconce fixture, a track lighting fixture, an under cabinet fixture, a display/showcase fixture, a ceiling fan (e.g. blade, pole, core, or others), an emergency lighting sign fixture, a bay lighting fixture, or a strip light fixture), an outdoor or landscape lighting (whether a high mast fixture, a bollard fixture, a solar lamp, a street light, a driveway or walkway light, or a yard light), an accent light, a Christmas light, a flood light, a searchlight, a strobe light, a traffic light, a theatrical light, a wallwasher, a night light, or others.

In some embodiments, the control panel 110 includes or is coupled to a sensor, such as a light sensor, a fluid sensor, an image sensor, a motion sensor, an acoustic sensor, an infrared sensor, a temperature sensor, a humidity sensor, a wind speed sensor, a wind direction sensor, a rainfall sensor, or others, based on which the control panel 110 is automatically operated, such as the controller 116 is wirelessly controlled or activated based on an input of the sensor. For example, the controller 116 can send the control signal based on the input of the sensor. In some embodiments, the control panel 110 or the load device, as disclosed herein, includes or is coupled a timer, whether mechanical, electromechanical, electronic, software, or others, whether a stopwatch, a time switch, or others, based on which the control panel 110 is operated. In some embodiments, the control panel 110 includes or is coupled to a smart home control wall panel. In some embodiments, the timer is included (e.g. integral, retrofitted, externally or internally attached) in a refrigerator (e.g. residential, commercial, vehicular) or is operably coupled (e.g. electronically, wirelessly, mobile app) to the refrigerator. The refrigerator (e.g. French door, upper or lower freezer) can be or include a freezer or be a refrigerator room. The timer may have a plurality of calendar entries programmed (e.g. manually, automatically, locally, remotely) thereinto, which can be inclusive of an adjustment for daylight savings time (e.g. manual, automatic) or a geolocation (e.g. GPS chip, GLONASS chip, signal triangulation, network address, user presetting, zip code, area code, physical address). For example, the calendar entries can include Christian holiday times, Jewish holiday times, Muslim holiday times, or others. For example, the calendar entries can have a date on or off, a time on or off, a temperature increase or decrease, a moisture increase or decrease, which can be any time period less than 24 hours or span more than one day, such as two days, three days, or more, based on holiday times and the geolocation. For example, the refrigerator can be configured to activate, deactivate, turn on, or turn off an internal light source (e.g. socket, bulb) or a drinking water spout or fountain during certain Jewish days or holidays (e.g. Sabbath, High Holidays) based on the calendar entries and the geolocation. For example, the timer can include a mechanical device with a clicker, poppet, button or another mechanical, gear-based, pulley-based, spring-based, or shape-memory-based piece configured to engage a light activation piece of the refrigerator, where the light activation piece is positioned in proximity of a refrigerator door. When the timer is attached (e.g. fastened, hook-and-looped, adhered, magnetized, suction cupped, mated, interlocked) to the refrigerator such that clicker, poppet, button or another mechanical, gear-based, pulley-based, spring-based, or shape-memory-based piece engages the light activation piece, then when the refrigerator door is open then the internal light source of the refrigerator does not go on. Note that the clicker, poppet, button or another mechanical, gear-based, pulley-based, spring-based, or shape-memory-based piece can be configured to automatically deploy (e.g. expand, nest out, move out) or automatically un-deploy (contract, nest in, move in) based on the calendar entries. Therefore, the refrigerator can operate based on the calendar entries. Note that this timer technology can also be applied to other household items or rooms, such as ovens, microwaves, dishwashers, garbage disposal unit, smart bathrooms, smart kitchens, smart basements, smart garages, or others. Further, note that this timer can also be housed in a housing having an electrical receptacle, while the housing is also configured to be plugged into an electrical outlet (e.g. wall outlet).

The wireless transceiver 122 or 132 can be configured to send a wireless power signal or receive a wireless power signal, as disclosed herein. For example, the wireless transceiver 120 or 130 can be configured to send a wireless control or informational signal or receive a wireless control or informational signal, as disclosed herein. For example, the wireless power transceiver 122 or 132 can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices). For example, the wireless control or information signal transceiver 120 or 130 can operate as an independent, master, or slave node (e.g. wireless control or informational signal hotspot, wireless control or informational signal broadcaster, wireless control or informational signal rebroadcaster, wireless control or informational signal repeater, wireless control or informational signal booster, or wireless control or informational signal range extender) in a wireless control or informational mesh network (e.g. wirelessly control other mobile devices or stationary devices). However, note that a wireless charging network or a wireless control or informational network can also be star-based or tree-based.

For example, as shown in FIG. 4, the light fixture 112 is configured to wirelessly transmit, such as via the wireless power transceiver 132, a wireless power signal to other devices, such as mobile devices or stationary devices or fixtures. For example, the light fixture 112 can query, such as via the wireless control or information transceiver 130, another device, such as another light fixture, for a power level thereof (for receipt via the wireless control or information transceiver 130 of that device). If that power level satisfies or does not satisfy a predetermined threshold, as determined via the light fixture 112 upon response from the other device, as received via the wireless control or information transceiver 130 of the light fixture 112, then the light fixture 112 can send the wireless power signal, such as via the wireless power transceiver 132, to another device (for receipt via the wireless power transceiver 132 of that device), thereby recharging that device. As such, the light fixture 112 can operate as a wireless power signal repeater. Likewise, the light fixture 112 can operate as a remote control to other devices.

In some embodiments, the control panel 110 can adjust the wireless power signal for providing more power or less power to recharge the battery, such as based on usage. For example, the control panel 110 can adjust the wireless power signal such that the wireless power is able to recharge the battery 126 at a rate higher or lower than a rate at which the load 124 draws power from the battery 126. For example, when the load 124 is not drawing power from the battery 126, then the wireless power signal can be at a rate higher or lower than a rate at which the load 124 draws power from the battery 126 in order to quickly recharge the battery. For example, the control panel 110 can track usage history to determine optimal times when to adjust the wireless power signal to most quickly recharge the battery 126 to a predetermined threshold and then do so, if mandated by a user.

In some embodiments, as shown in FIG. 5a, the light fixture 112, such as a recessed light fixture, whether insulation contact (IC) or non-IC, includes a photovoltaic cell 134 positioned to capture a light energy from the light fixture 112 and then recharge the battery 126 accordingly. Various embodiments of recessed light fixtures are shown in FIG. 5b. For example, at least some of the recessed light fixtures can include an open trim, baffle trim, fisheye trim, eyeball trim, reflective trim, decorative trim, low clearance recessed canister, light clips, trim with coil springs or squeezable rod springs, or others, some, many, most, or all of which can be configured to enable for various functionality, as disclosed herein. For example, these components can be structured to ensure that the battery 126 can fit above the ceiling 106, while avoiding interference with at least some light clips. The photovoltaic cell 134 can be transparent or translucent. For example, the photovoltaic cell 134 can be a cell obtained from Ubiquitous Energy Inc. This may be beneficial due to increased recharge speed or less need for wireless charging. In some embodiments, the light fixture 124 includes a fluid turbine, whether liquid or gas, such as water, air, or others, which generated energy to recharge the battery. Note that the photovoltaic cell 134 can be used on any devices, as disclosed herein.

In some embodiments, the control panel 110 and the light fixture 112 are uniquely (one-to-one correspondence) paired to each other in order to minimize signal interference and hacking. However, note that other correspondences are possible, such as one-to-many, many-to-many, or many-to-one in any permutational or combinatory manner. In some embodiments, the control panel 110 and the light fixture 112 are a kit, whether for a new installation or retrofitting a preexisting infrastructure.

Figure 6:
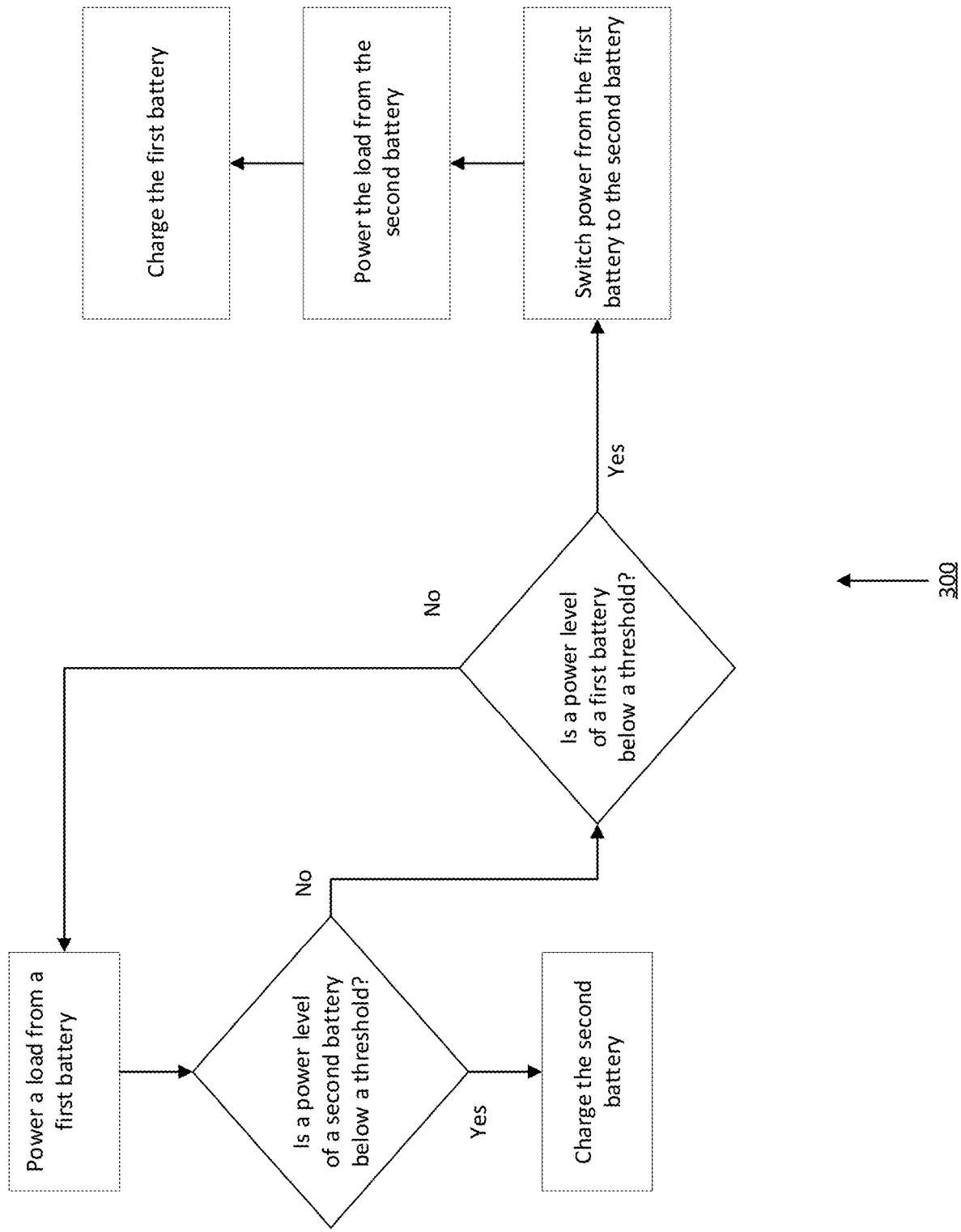
FIG. 6 shows a flowchart of an embodiment of a process for operating a fixture according to this disclosure.

In some embodiments, the controller 116 is able to request the power interface 114 to switch between a plurality of power sources, such as within a bank of batteries, as shown in FIG. 6, or between a battery and a powerline, such as to function as a backup or redundancy feature.

In some embodiments, a plumbing fixture or other types of fixtures, such as electrical, thermal, structural, or others, or freestanding devices or stationary devices or mobile devices may be used, whether additionally or alternatively, such as the control panel 110 or the fixture 112. For example, the plumbing fixture or other types of fixtures or freestanding devices or stationary devices can include a pipe, a valve, a fitting, a faucet, a spigot, a garbage disposal, a urinal, a footstool, a soap dispenser (built-in or resting on counter), a toilet brush holder, a tissue box, a tissue box holder, a home security camera (closed circuit camera), a recycling can or container, a furniture item, a water sensor/alarm unit, an air conditioning grill, a cooking or BBQ grill, a compressor, an air conditioner, a weather station, a weather station sensor, a shower door, a floor or ceiling molding, a crown molding with a light (e.g. bulbs) or sound (speakers) source or an air freshener, a baseboard with a light (e.g. bulbs) or sound (speakers) source or an air freshener, a wall frame (e.g. rectangular, oval) with painting or electronic display (e.g. LCD, electrophoretic), a mezuza case (e.g. rectangular, oval) with an electronic display (e.g. LCD, electrophoretic), a hinge (e.g. spring, barrel, pivot, flag), a door sign (e.g. analog, electronic display, LED, electrophoretic), an electronic ink (e.g. electrophoretic, color, black-white, monochrome) surface (e.g. floor, wall, ceiling, furniture), a door frame or window casing, a medallion, a picture frame, a floating shelf, a garage door, a window sash/molding/frame/sill/head/jamb/jambliner/casing/apron/stool, a utility (electric, gas, water) meter, a garage door opener, a disco ball, a showerhead, a soap dish, a printer, a scanner, a fax machine, a copier, a medical device, a garbage or trash can or container, a shredder, a register/vent (including motorized or non-motorized), a furnace, a thermostat, a thermostat sensor remote from a thermostat (e.g. Ecobee style), a smart home control wall panel, an air handler, a window blind or shade, a window protection gate (vertically or horizontally deployable), a mailbox, a playlet/swing set, an exhaust fan, an underfloor heating system (indoor or outdoor), a dishwasher, a kitchen stove, an oven, a microwave, a refrigerator, a smoke detector, a carbon monoxide detector, a supply or waste plumbing fixtures, a food disposer, a water heater, a tank less heater, a water softener or harder, a hot water dispenser, a tank less or electric or gas water heater, a hot water urn, an ice maker, a pot filler, a frost proof sill cock, a hands free faucet, a vacuum cleaner (mobile, robotic, or fixed), a pool table, a bowling alley seat, a bowling ball machine, a ping pong or foosball table, a water leak detector, a bathroom vanity light, a shed, a shutoff valve (indoors or outdoors), a buffalo box, a faucet sprayer, an electrical service panel/circuit breaker, an electrical box (metal, plastic), a doorbell including video and button and speaker, a floodlight with sensor, an electronic license plate, a bench or park bench or bus stop bench, a BBQ grill or smoker or pellet smoke or coal or gas, a smoker auger, a water cooler, a microscope, a Christmas tree (e.g. natural, artificial) and Christmas tree lights (e.g. LED, halogen) or decorations (e.g. spherical, cuboid, cube, character) or ornaments (e.g. spherical, cuboid, cube, character) or skirts (e.g. LCD display, electrophoretic display, LED display), a cylindrical or puck shaped speaker (e.g. Alexa device), a bathroom vent fan, a manned or unmanned vacuum cleaner, a dropped ceiling tile, an light source candle (e.g. LED), a smart glass device (e.g. electricity based, heat based), an tongue depressor (e.g. with light source), a conveyor belt (e.g. factory, store, vehicle), a battery pack, a spectrometer, a portable body scanner (e.g. U-shape, D-shape), an optical drowning monitor (e.g. Coral), a thermometer (e.g. infrared gun, forehead), a blockchain operated appliance (e.g. residential, commercial, industrial), an augmented or virtual reality eyewear unit or mobile device or wearable, a lawn sprinkler unit, a sprinkler controller, a basketball shot tracker, a speaker, a display, a mailbox, an HVAC blower, a heat pump, a water heating tank, a water tankless heater, a mousepad (e.g. wirelessly charge mouse or keyboard), a garden light, a driveway heating element, a toilet (e.g. seat, bowl, a water tank, a lever, a cleaning cartridge dispenser, a light source, a sensor, or others), a ventilation duct, a structure within a plumbing pipe, a gas pipe, a sump pump, a pergola, a patio, a medical image scanner, a load cell, an awning, a deck, a fence, an attic fan, a bookcase, a fireplace, a construction brick, a siding board, a shingle, a railroad track (rail or sleeper) or along rail or sleeper side whether internal (between rails) or external (not between rails), a shake, a foundation, a roof, a stud, a joist, an automated teller machine, a wall terminal or kiosk, or any other device, apparatus, structure, or system that is affixed, whether physically, electrically, or fluidly, to a piece of land, a building, or a vehicle or that is freestanding or stationary, whether additionally or alternatively, or mobile. For example, a wall, a ceiling, or a floor can be comprised via a framing structure with a plurality of drywall panels and a subfloor. However, note that this disclosure is not limited to an indoor environment and an outdoor environment can be used, whether additionally or alternatively. For example, at least one of the wall, the ceiling, or the floor can be positioned indoors or outdoors, in whole or in part, such as a component of a building, an auxiliary of the building, a freestanding structure, or others, such as a patio, a shed, a pergola, a barn, a garage, a pool, a hot tub, a deck, a jacuzzi, a driveway, a walkway, a porch, a waterfall, a garden, or others. Moreover, note that the indoor environment or the outdoor environment can be in a residential setting, a commercial setting, an industrial setting, a medical setting, a hazardous material setting, a clean room setting, a sealed room, a hydroponic structure, a jail/prison/cell setting, a military setting, or others. Also, note that this disclosure is not limited to a building. As such, a vehicle, whether land, marine, aerial, or space, can be used, whether manned or unmanned, whether additionally or alternatively. For example, the wall, the ceiling, or the floor can be hosted or supported in or via the vehicle, such as an automobile, a bus, a truck, an airplane, a helicopter, a drone, a satellite, a cruise ship, a yacht, a rocket, a space station, or others, whether civilian or military use. Note that the marine vehicle can include a submersible, such as a submarine or others.

In some embodiments, a sporting device or a board game may be used as the control panel 110 or a load device, as disclosed herein, whether additionally or alternatively. For example, the sporting device can include a basketball, a soccer ball, a football, a puck, a golf ball, a hockey stick, a golf club, a polo stick, a golf putter, a bowling ball, a billiards ball, a billiards cue, a billiards pocket, a billiards table, or others. For example, the board game can include a board (e.g. analog, electronic, display, speaker), a frame (e.g. analog, electronic, display, speaker), a game piece (e.g. analog, electronic, display, speaker), a dice (e.g. analog, electronic, display, speaker), a gaming surface, or others. For example, the board game can include chess, checkers, backgammon, dominos, connect four, or others. For example, the board, the frame, the game piece, the dice, or the gaming surface can send or receive signal from each other, whether or not based on sensors, which can internally or externally trigger inputs or outputs, as disclosed herein.

Note that any sensor, as disclosed herein, can be active or passive, whether mechanical or electronic or chemical. The sensor is configured to detect or to respond to an input from a physical or digital environment. For example, the input can be at least one of light, heat, motion, moisture, humidity, sound, electricity, pressure, or any other environmental aspect or parameter. The sensor can provide an output, such as a signal, which is sent, whether in a wired manner or a wireless manner, to an output device or a controller, as disclosed herein. Whether additionally or alternatively, the sensor can comprise or be coupled to a transducer. The sensor can be powered via a power source, whether in a wired manner or a wireless manner, such as a battery, a renewable energy source, such as a wind turbine or a water turbine, or a photovoltaic cell. For example, the sensor can be configured for communication, whether local or remote, whether in a wired or a wireless manner with another device, such as a mobile device, for instance, a tablet computer.

In some embodiments, the sensor can be at least one of acoustic, sound, or vibration based, such as at least one of a geophone, a hydrophone, or a microphone. In some embodiments, the sensor can be a chemical sensor, such as at least one of an oxygen sensor, a carbon dioxide sensor, a carbon monoxide sensor, a hydrogen sensor, a catalytic bead sensor, a chemical field-effect transistor, an electrochemical gas sensor, an electronic nose, an electrolyte insulator semiconductor sensor, a fluorescent chloride sensor, a holographic sensor, a hydrocarbon dew point sensor, a hydrogen sulfide sensor, an infrared point sensor, a non-dispersive infrared sensor, a microwave chemistry sensor, a nitrogen oxide sensor, an olfactometer, an optode, an ozone monitor, a pellistor, a glass electrode, a potentiometric sensor, a smoke detector, or a zinc oxide nanorod sensor. In some embodiments, the sensor can be at least one of electric current, electric potential, magnetic, or radio based, such as at least one of a current sensor, a Daly detector, an electroscope, a galvanometer, a hall effect sensor, a magnetic anomaly detector, a magnetometer, a micro-electromechanical (MEMS) magnetic field sensor, a metal detector, a radio direction finder, or a voltage detector. In some embodiments, the sensor can be at least one of flow or fluid velocity based, such as at least one of an air flow meter, an anemometer, a flow sensor, a gas meter, a mass flow sensor, or a water meter. In some embodiments, the sensor can be a radiation sensor, such as a Geiger counter. In some embodiments, the sensor can be an altimeter or a depth gauge. In some embodiments, the sensor can be at least one of position, angle, displacement, distance, speed, or acceleration based, such as at least one of a capacitive sensor, a photoelectric sensor, a shock or impact sensor, a tilt sensor, or an ultrasonic thickness sensor. In some embodiments, the sensor can be at least one of optical, light, imaging, or photon based, such as at least one of an electro-optical sensor, a flame detector, an infrared sensor, a photo detector, a photoionization detector, a photo switch, a phototube, or a scintillometer. In some embodiments, the sensor can be pressure based, such as at least one of a barograph, a barometer, a fluid density sensor, a piezometer, a fluid pressure sensor, a tactile sensor, or a contact sensor. In some embodiments, the sensor can be at least one of force, density, or level based, such as at least one of a hydrometer, a force gauge, a level sensor, a load cell, a magnetic level gauge, a nuclear density gauge, a piezoelectric sensor, a strain gauge, or a viscometer. In some embodiments, the sensor can be at least one of thermal, heat, or temperature based, such as at least one of a bolometer, a bimetallic strip, a calorimeter, a Gardon gauge/circular-foil gauge, a Golay cell, a heat flux sensor, an infrared thermometer, a quartz thermometer, a resistance thermometer, a silicon bandgap temperature sensor, a thermometer, a thermistor, a thermocouple, or a pyrometer. In some embodiments, the sensor can be at least one of proximity or presence based, such as at least one of an alarm sensor, a motion detector, an occupancy sensor, a proximity sensor, a passive infrared sensor, a reed switch, or a glass or material integrity break sensor. In some embodiments, the sensor can be at least one of a mold sensor, a mildew sensor, or a sensor configured to sense an environmental condition favorable to at least one of a mold, a mildew, or a fungus, such as disclosed in U.S. Pat. No. 7,382,269, which is fully incorporated by reference herein for at least these purposes and all other purposes, as disclosed herein.

Note that a valve can include a ball valve, butterfly valve, choke valve, diaphragm or membrane valve, gate valve, globe valve, knife valve, needle valve, pinch valve, piston valve, plug valve, slim valve, solenoid valve, spool valve, check valve or non-return valve, flow control valve, poppet valve, pressure reducing valve, thermal expansion valve, safety valve or relief valve, sampling valve, aspin valve, ball cock valve, bibcock valve, blast valve, boston valve, cock valve, stopcock valve, ceramic disc valve, choke valve, clapper valve, demand valve, double beat valve, double check valve, duckbill valve, flapper valve, heimlich valve, foot valve, four-way valve, freeze seal/freeze plug, gas pressure regulator valve, heart valve, hydrodynamic vortex valve, larner-johnson valve, leaf valve, pilot valve, pinch valve, plunger valve, poppet valve, sleeve valve, pressure regulator or pressure reducing valve, pressure sustaining valve, presta valve, schrader valve, dunlop valve, reed valve, regulator valve, rocker valve, rotolock valve, rotary valve, piston valves, rupture disc valve, safety valve, saddle valve, slide valve, stopcock, swirl valve, tap valve, tesla valve, thermostatic mixing valve, thermostatic radiator valve, trap primer, vacuum breaker valve, or others.

Note that any furniture item, as disclosed herein, includes a single seat (e.g. back, seat, legs) device, such as a chair, a bean bag, an ottoman, a recliner, a stool (bar stool, footstool, massager stand), a rocking chair, a children high chair (e.g. back, seat, rest, removable or permanent table tray, frame, caster wheels, belts, buckles), a cushion, or others including an accessory attachable/retrofittable thereto. Likewise, any furniture item, as disclosed herein, includes a multi-seat device (e.g. back, seat, legs), such as a bench, a couch, a divan, a love seat, a cushion, a bean bag, or others including an accessory attachable/retrofittable thereto. Moreover, any furniture item, as disclosed herein, includes a single or multi-user bed (e.g. platform, mattress, frame, legs, headboard), a bunk bed, a canopy bed, a four-poster bed, a murphy bed, a platform bed, a sleigh bed, a waterbed, a daybed, a futon, a hammock, a headboard, an infant bed (crib, cradle, bassinet), a mattress, a sofa bed, or others including an accessory attachable/retrofittable thereto. Additionally, any furniture item, as disclosed herein, includes a billiard table, a chess table, a compartmentalized entertainment center, a gramophone, a jukebox, a pinball machine, or others including an accessory attachable/retrofittable thereto. Furthermore, any furniture item, as disclosed herein, includes a changing table, a desk, a pedestal table, a coffee table, a dining table, a drop leaf-table, an end table, a work table, a folding table, a poker table, a television tray table, a trestle table, a washstand, an operating table, a workbench, or others including an accessory attachable/retrofittable thereto. Also, any furniture item, as disclosed herein, includes a bookcase, a kitchen cabinet, a bathroom cabinet (medicine chest), a drawer, a shelf or a floating shelf, a dresser, a chest, a coat rack, a hatstand, a filing cabinet, a nightstand (e.g. shelf, frame), an ottoman (e.g. removable seat, support frame), a sideboard, a safe (e.g. internal, external, walls, floor, ceiling, object inside), an umbrella stand (e.g. frame, container), an armoire, a wine rack (e.g. frame, container), a credenza, a floor lamp (e.g. base, stem, frame), an aquarium, or others including an accessory attachable/retrofittable thereto.

FIG. 6 shows a diagram of an embodiment of a process for power management according to this disclosure. In particular, when the light fixture 112 is powered via a bank of batteries 126, then controller 128 monitors power levels of at least two batteries in the bank of batteries 126. If one of the batteries 126 is undercharged based on predetermined power thresholds, then the controller 128 transfers or switches power from that battery to another battery that is not undercharged based on the predetermined power thresholds. Then, the controller 128 commands the wireless control transceiver 130 (e.g. transmitter) to request the control panel 110 to send wireless power for recharging the battery that is undercharged via the wireless power transceiver 122 (e.g. transmitter) as the light fixture 112 is powered via the battery that is not undercharged. This process can repeat iteratively.

Figure 7B:
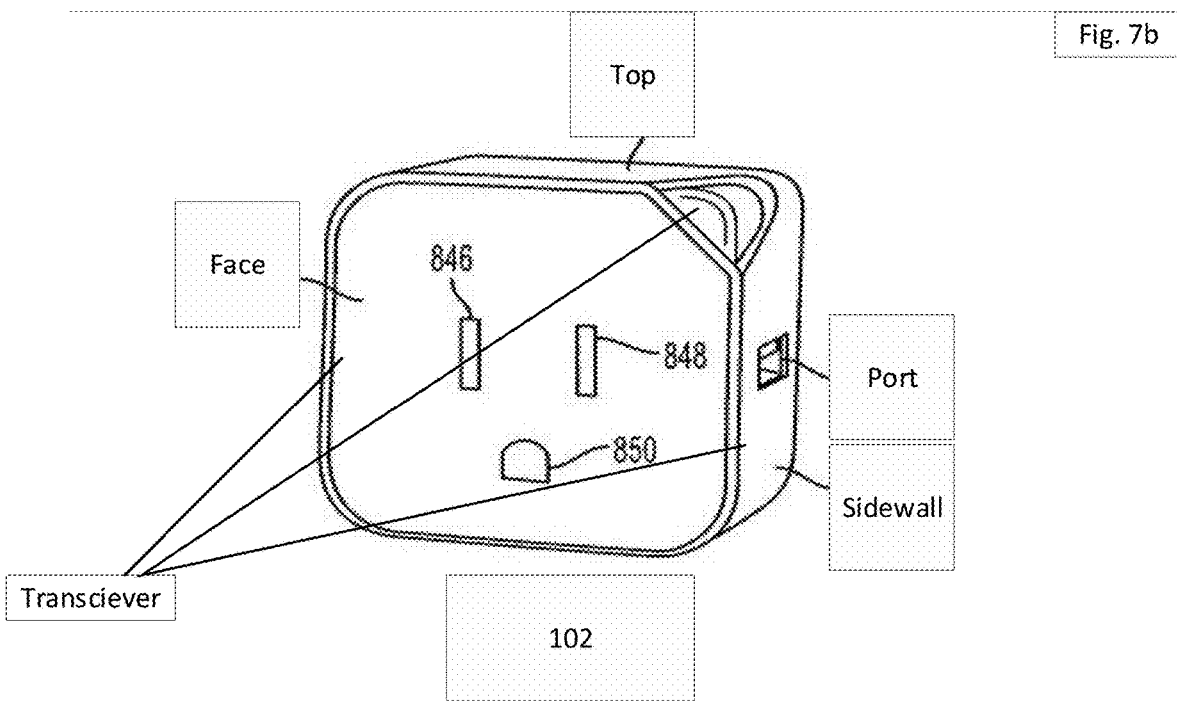
Figure 7C:
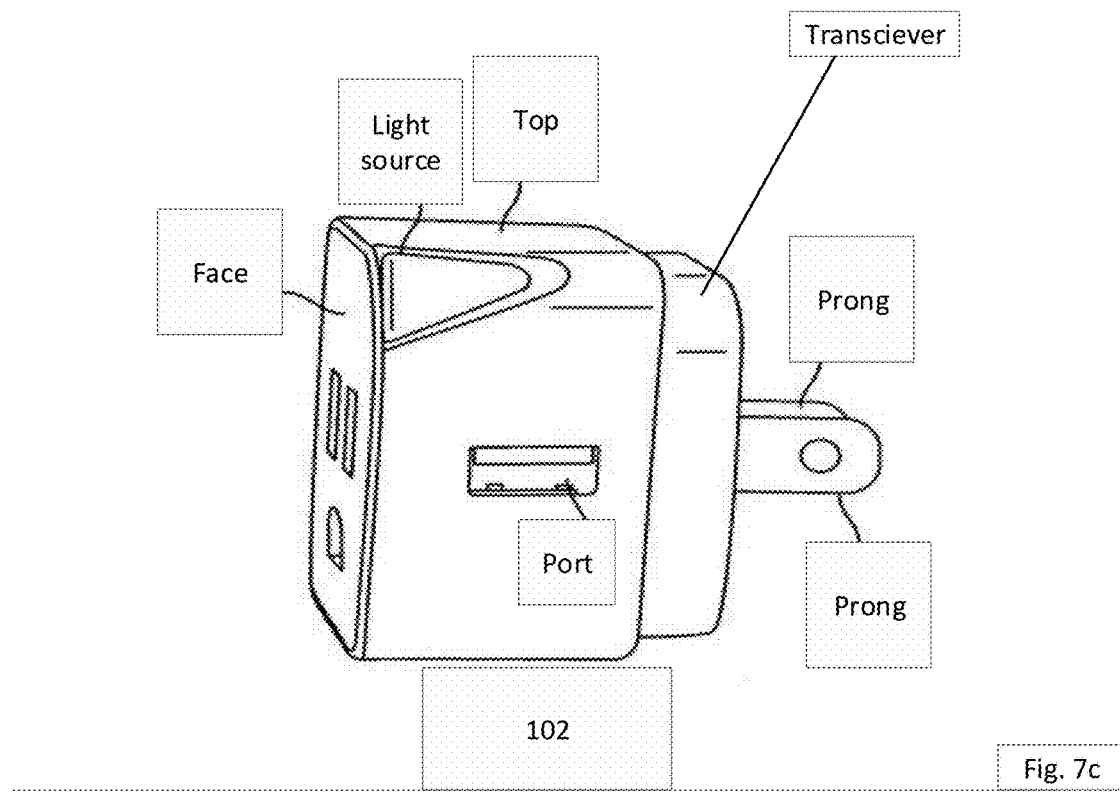

FIGS. 7a-7c show a diagram of an embodiment of a device for wireless charging according to this disclosure. In particular, a device for wireless charging or wireless control includes a housing and a plug for insertion into an AC socket. The housing can include a port, such as a USB, Lightning, or others. The device can include a surge protector system. The device can include a controller and a user interface, where the controller is electrically coupled to the user interface, as disclosed herein. The housing includes a sensor or a wireless transceiver (e.g. transmitter or receiver), as disclosed herein. The sensor can trigger any input or output action of an input device or an output device of the device for wireless charging. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the device can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or informational signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the device can be combined with all embodiments, devices, features, systems, or components thereof, as disclosed herein, and can be used to perform all methods, processes, algorithms, or sequences, as disclosed herein.

Figure 8B:
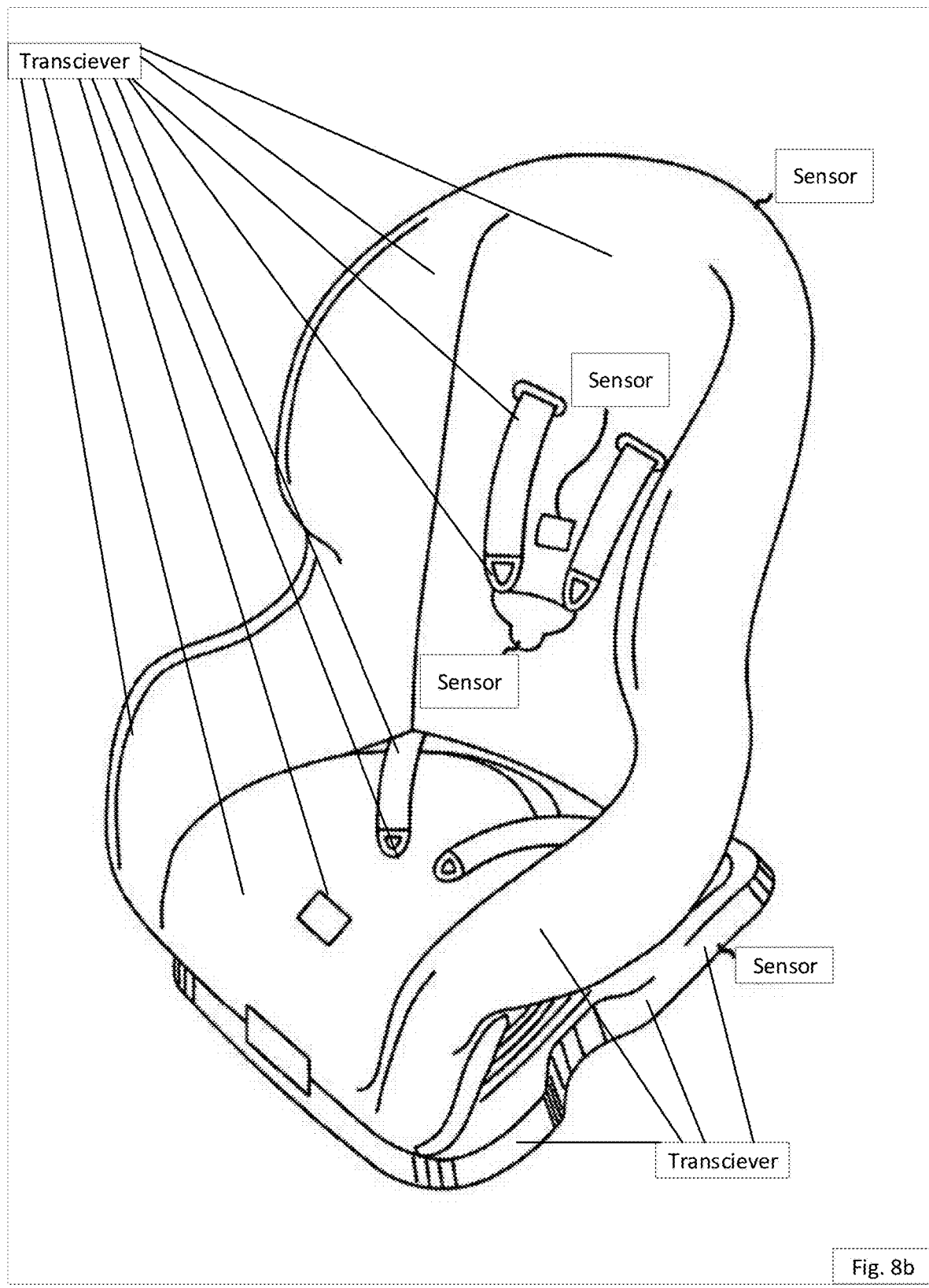
Figure 8C:
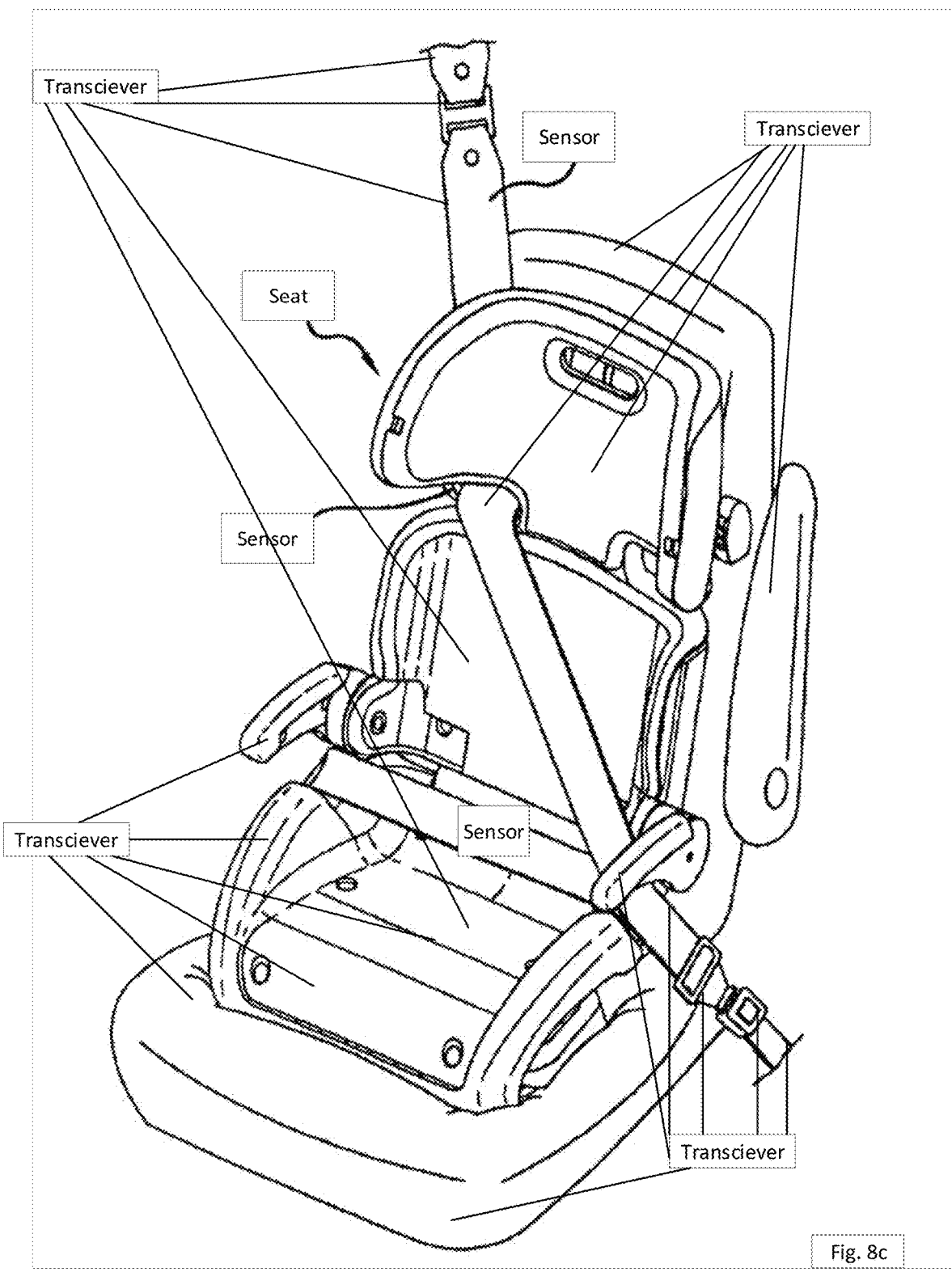

FIGS. 8a-8c show a plurality of diagrams of a plurality of embodiments of a plurality of car seats for a plurality of children according to this disclosure. FIG. 8a shows an infant carrier having a base and a basket. The base is securable to a bench or seat of an automobile, such as via a LATCH system, a seatbelt, or others. The base includes a lift handle and is removable from the automobile via the lift handle. The base includes a spirit level to determine proper base positioning. The base includes a pair of walls and the basket is removably secured (e.g. mating, interlocking, latching, or others) to the base between the walls. The basket hosts a carry handle (e.g. U-shaped but can be L-shaped) that is pivotable. The basket is configured for seating a child, such as an infant under 100 pounds. The basket includes a pair of seat belts (3 points, 5 points, 7 points, or others) to engage the child.

Any portion of the base (e.g. frame, housing, platform, seat belts or buckles, or others) or any component thereof (e.g. wall, floor, or others) or any portion of the basket (e.g. carry handle, seat, or others) or any component thereof (e.g. handle bars or handle bridge, back seat portion, lower seat portion, sidewalls, seat belts or buckles, or others) can include or host or be attached to a sensor configured to detect presence of the child in the basket. The sensor can be any sensor disclosed herein. For example, the sensor can include motion sensor, heat sensor, proximity sensor, acoustic sensor, pressure sensor, load cell, or others. Also, additional or alternative to the sensor being hosted via the infant carrier, as explained above, the sensor can be hosted via a wearable (e.g. T-shirt over a seat facing the infant carrier), a headrest facing the basket, a seat (including back portion thereof), a back portion of bench or seat facing the child, an automobile frame or chassis, a cable, a belt, an elastic band, a cabin pillar, a cabin door, a cabin window, a cabin handle, a cabin ceiling, a cabin floor, or others.

The sensor can include or be electrically coupled to a controller, as disclosed herein, and a user interface, as disclosed herein, where the controller is electrically coupled to the user interface, as disclosed herein. The sensor can include or be electrically coupled to a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the sensor can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the sensor can be combined with all embodiments, devices, systems, features, or components thereof, as disclosed herein, and can be used to perform all methods, processes, algorithms, or sequences, as disclosed herein.

As such, the sensor can be wirelessly powered (e.g. via the rechargeable battery) and thereby wirelessly paired (e.g. Wi-Fi, Bluetooth, Zigbee, Z-Wave, or others) with the automobile, a smartphone, a wearable, or another computer. Therefore, the sensor can periodically wirelessly communicate its readings to the automobile, the smartphone, or the wearable, whether the automobile is running or not, in motion or stationary. Consequently, the automobile, the smartphone, or the wearable can automatically act (inform that the basket still contains the child or assist the child) based on the readings of the sensor, such as honk horn, activate car alarm, open windows, turn on AC or fan not circulation, turn on automobile, send notifications to preprogrammed communication channels (e.g. email, text, social feed, OTT, or others), request help from emergency services, or others.

FIG. 8b shows a seat having a base and a seat secured to the base. The base is securable to a bench or seat of an automobile, such as via a LATCH system, a seatbelt, or others. The seat is configured for seating a child, such as a toddler. The seat includes a pair of seat belts (3 points, 5 points, 7 points, or others) to engage the child.

Any portion of the base (e.g. wall, floor, or others) or any portion of the seat (e.g. back seat portion, lower seat portion, sidewalls, seat belts or buckles, or others) can include or host or be attached to a sensor configured to detect presence of the child in the seat. The sensor can be any sensor disclosed herein. For example, the sensor can include motion sensor, heat sensor, proximity sensor, acoustic sensor, pressure sensor, load cell, or others. Also, additional or alternative to the sensor being hosted via the seat, as explained above, the sensor can be hosted via a wearable (e.g. T-shirt over a seat facing the seat), a headrest facing the seat, a seat (including back portion thereof), a back portion of bench or seat facing the child, an automobile frame or chassis, a cable, a belt, an elastic band, a cabin pillar, a cabin door, a cabin window, a cabin handle, a cabin ceiling, a cabin floor, or others.

The sensor can include or be electrically coupled to a controller, as disclosed herein, and a user interface, as disclosed herein, where the controller is electrically coupled to the user interface, as disclosed herein. The sensor can include or be electrically coupled to a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the sensor can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the sensor can be combined with all embodiments, devices, systems, features, or components thereof, as disclosed herein, and can be used to perform all methods, processes, algorithms, or sequences, as disclosed herein.

As such, the sensor can be wirelessly powered (e.g. via the rechargeable battery) and thereby wirelessly paired (e.g. Wi-Fi, Bluetooth, Zigbee, Z-Wave, or others) with the automobile, a smartphone, a wearable, or another computer. Therefore, the sensor can periodically wirelessly communicate its readings to the automobile, the smartphone, or the wearable, whether the automobile is running or not, in motion or stationary. Consequently, the automobile, the smartphone, or the wearable can automatically act (inform that the basket still contains the child or assist the child) based on the readings of the sensor, such as honk horn, activate car alarm, open windows, turn on AC or fan not circulation, turn on automobile, send notifications to pre-programmed communication channels (e.g. email, text, social feed, OTT, or others), request help from emergency services, or others.

FIG. 8c shows a seat belted to an automobile and can also be securable to a bench or seat of an automobile, such as via a LATCH system, a seatbelt, or others. The seat is configured for seating a child, such as a toddler.

Any portion of the seat (e.g. back seat portion, lower seat portion, sidewalls, seat belts or buckles, or others) can include or host or be attached to a sensor configured to detect presence of the child in the seat. Any portion of the seat belt (e.g. belt, buckle, belt, or others) can include or host or be attached to a sensor configured to detect presence of the child in the seat. The sensor can be any sensor disclosed herein. For example, the sensor can include motion sensor, heat sensor, proximity sensor, acoustic sensor, pressure sensor, load cell, or others. Also, additional or alternative to the sensor being hosted via the seat, as explained above, the sensor can be hosted via a wearable (e.g. T-shirt over a seat facing the seat), a headrest facing the seat, a seat (including back portion thereof), a back portion of bench or seat facing the child, an automobile frame or chassis, a cable, a belt, an elastic band, a cabin pillar, a cabin door, a cabin window, a cabin handle, a cabin ceiling, a cabin floor, or others.

The sensor can include or be electrically coupled to a controller, as disclosed herein, and a user interface, as disclosed herein, where the controller is electrically coupled to the user interface, as disclosed herein. The sensor can include or be electrically coupled to a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the sensor can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the sensor can be combined with all embodiments, devices, systems, features, or components thereof, as disclosed herein, and can be used to perform all methods, processes, algorithms, or sequences, as disclosed herein.

As such, the sensor can be wirelessly powered (e.g. via the rechargeable battery) and thereby wirelessly paired (e.g. Wi-Fi, Bluetooth, Zigbee, Z-Wave, or others) with the automobile, a smartphone, a wearable, or another computer. Therefore, the sensor can periodically wirelessly communicate its readings to the automobile, the smartphone, or the wearable, whether the automobile is running or not, in motion or stationary. Consequently, the automobile, the smartphone, or the wearable can automatically act (inform that the basket still contains the child or assist the child) based on the readings of the sensor, such as honk horn, activate car alarm, open windows, turn on AC or fan not circulation, turn on automobile, send notifications to preprogrammed communication channels (e.g. email, text, social feed, OTT, or others), request help from emergency services, or others.

Figure 9A:
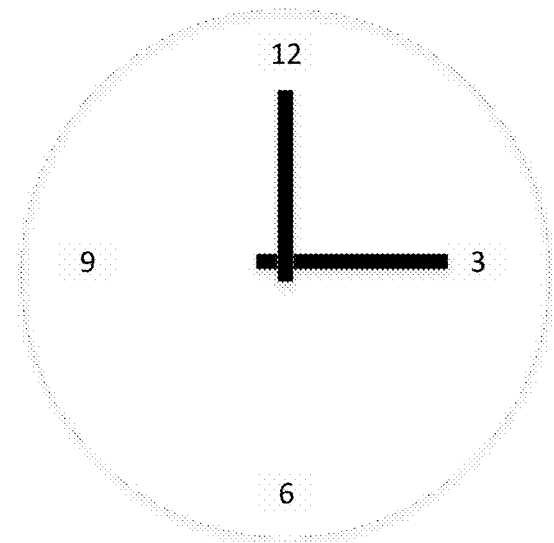
FIGS. 9a-9b show a plurality of diagrams of a plurality of embodiments of a plurality of clocks according to this disclosure.
Figure 9B:
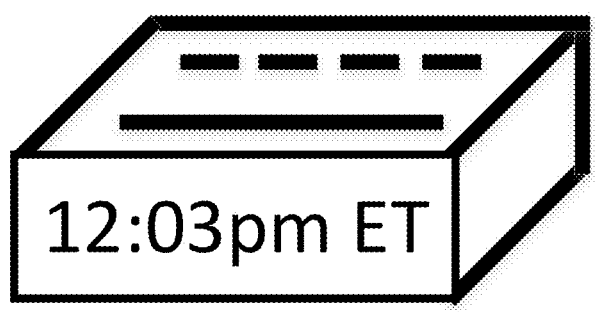

FIGS. 9a-9b show a plurality of diagrams of a plurality of embodiments of a plurality of clocks according to this disclosure. In particular, an analog wall clock and an electronic clock are stationary (e.g. resting, anchored, secured, mated, or fastened to a wall, floor, or ceiling). The analog wall clock can include physical analog hands (e.g. hour, minute, or second), clockface, and clock mechanism with moving parts (e.g. gears, weights, pendulum, springs, or others) or the analog wall clock can include an electronic display (e.g. LCD, electrophoretic, or others) displaying analog hands and clockface. The electronic clock displays time in numeric symbols (12-hour or 24-hour system), but can display analog hands and clockface. Note that the analog wall clock and the electronic clock can include an alarm function.

The analog wall clock and the electronic clock are powered via a power source (e.g. mains powerline, battery, accumulator, or others). The analog wall clock or the electronic clock, inclusive of any component thereof, can operate as a control panel or a load device, as disclosed herein. The analog wall clock or the electronic clock can include a sensor, as disclosed herein (e.g. battery, capacitor, or mains powered). The sensor can trigger any input or output action of an input device or an output device of the analog wall clock or the electronic clock. The analog wall clock or the electronic clock can include a controller, as disclosed herein, and a user interface, as disclosed herein, where the controller is electrically coupled to the user interface, as disclosed herein. The analog wall clock or the electronic clock can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the analog wall clock or the electronic clock can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the analog wall clock or the electronic clock can be combined with all embodiments, devices, systems, features, or components thereof, as disclosed herein, and can be used to perform all methods, processes, algorithms, or sequences, as disclosed herein.

Figure 10:
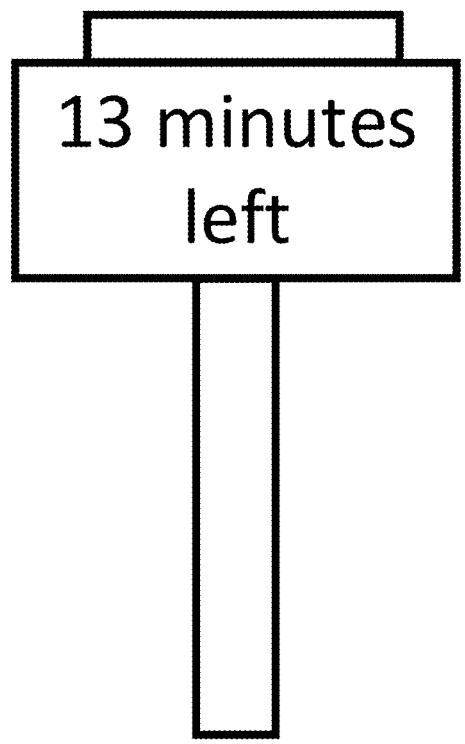
FIG. 10 shows a diagram of an embodiment of a parking meter according to this disclosure.

FIG. 10 shows a diagram of an embodiment of a parking meter according to this disclosure. In particular, a parking meter is stationary (e.g. anchored, secured, mated, or fastened to a wall, floor, or ceiling). The parking meter, inclusive of any component thereof, can operate as a control panel or a load device, as disclosed herein. The parking meter can include a sensor, as disclosed herein (e.g. battery, capacitor, or mains powered). The sensor can trigger any input or output action of an input device or an output device of the parking meter. The parking meter can include a controller, as disclosed herein, and a user interface, as disclosed herein, where the controller is electrically coupled to the user interface, as disclosed herein. The parking meter can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the parking meter can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the parking meter can be combined with all embodiments, devices, systems, features, or components thereof, as disclosed herein, and can be used to perform all methods, processes, algorithms, or sequences, as disclosed herein.

Figure 11:
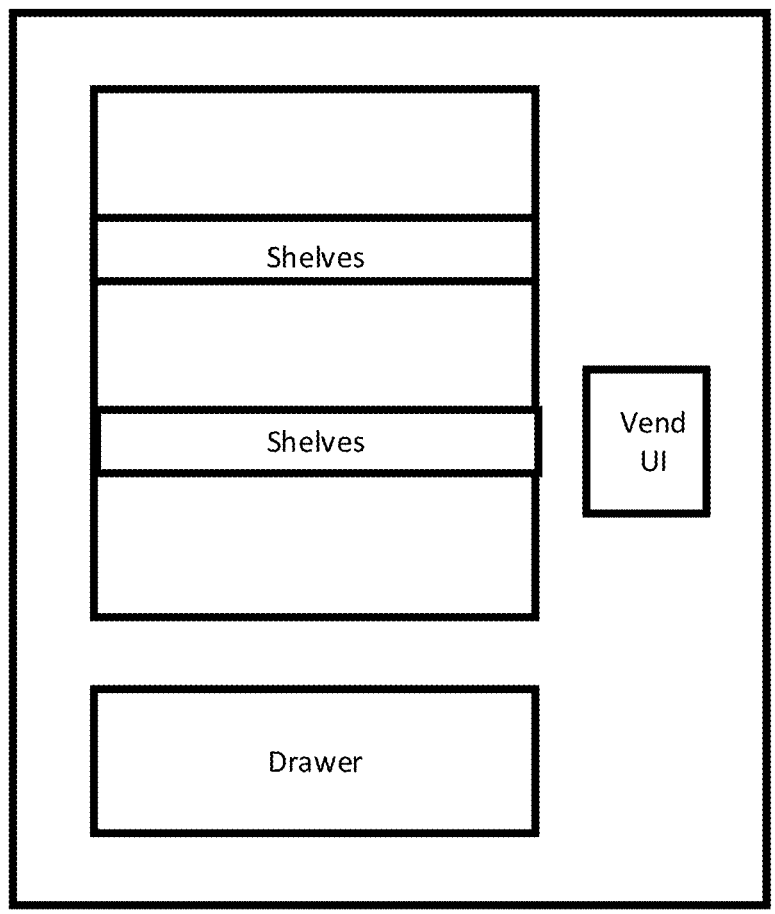
FIG. 11 shows a diagram of an embodiment of a vending machine according to this disclosure.

FIG. 11 shows a diagram of an embodiment of a vending machine according to this disclosure. In particular, a vending machine a vend UI. The vending machine includes package shelves and package removal drawer. The vending machine can vend via the vend UI based on the shelves and the package removal drawer. The vending machine is stationary (e.g. anchored, secured, mated, or fastened to a wall, floor, or ceiling). The vending machine, inclusive of any component thereof, can operate as a control panel or a load device, as disclosed herein. The vending machine can include a sensor, as disclosed herein (e.g. battery, capacitor, or mains powered). The sensor can trigger any input or output action of an input device or an output device of the vending machine. The vending machine can include a controller, as disclosed herein, and a user interface, as disclosed herein, where the controller is electrically coupled to the user interface, as disclosed herein. The vending machine can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the vending machine can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the vending machine can be combined with all embodiments, devices, systems, features, or components thereof, as disclosed herein, and can be used to perform all methods, processes, algorithms, or sequences, as disclosed herein.

Figure 12A:
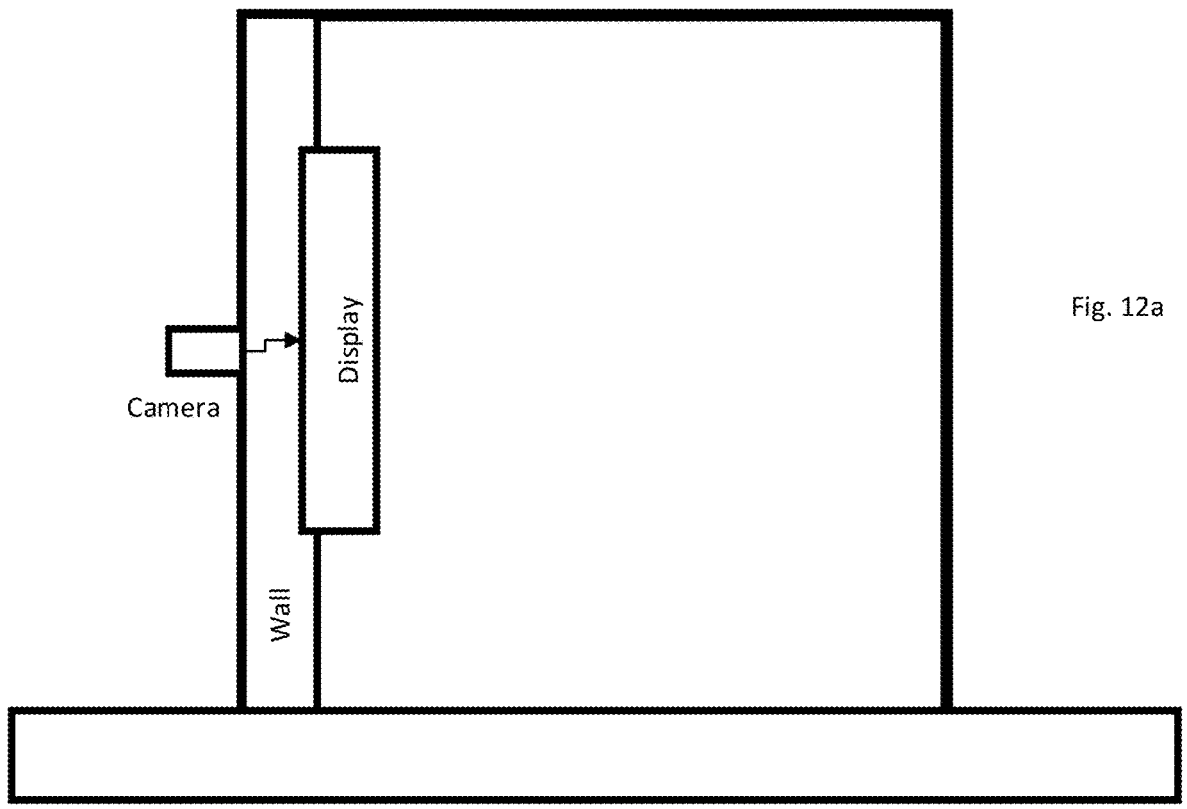
FIGS. 12a-12b show a plurality of diagrams for a plurality of embodiments of a plurality of virtual window systems according to this disclosure.
Figure 12B:
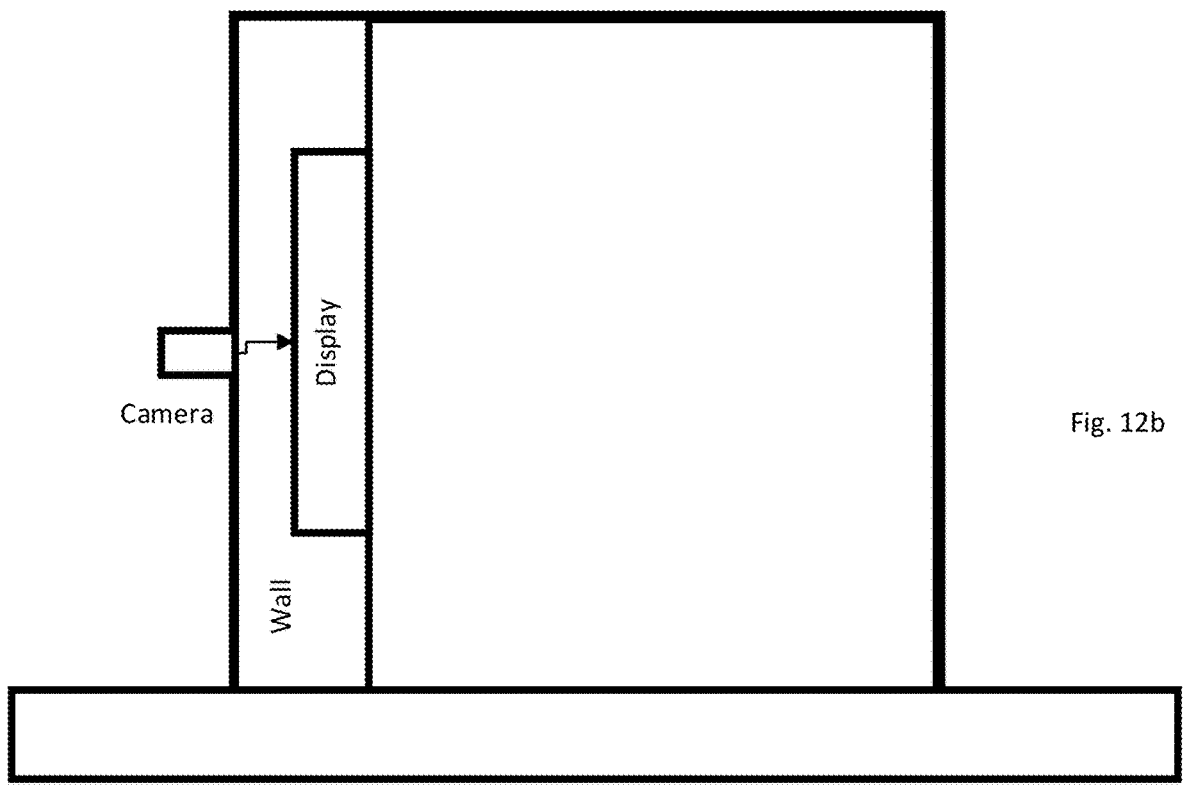

FIGS. 12a-12b show a plurality of diagrams for a plurality of embodiments of a plurality of virtual window systems according to this disclosure. In particular, since there are situations where physical windows are not feasible for installation or maintenance, such as due to cost, structural issues, or others, a virtual window system can be used. The virtual window system includes a building having a wall (e.g. thermally insulated, thermally uninsulated, or others), a camera (e.g. wide angle, fish-eye, 360-degree, PTZ, infrared, or others), and a display (e.g. LCD, plasma, electrophoretic, color, monochrome, touch or haptic-enabled, or others).

The wall hosts the camera and the display, such as via fastening, mating, interlocking, adhering, bracketing, magnetizing, suction cupping, hook-and-looping, or others. The wall can host the camera and the display such that the camera and the display can be opposite of each other on opposing wall sides (camera outdoors and display indoors).

The camera can be configured for capturing high or ultra-high resolution or high or ultra-definition video (e.g. 4 k, 8 k, 12 k, or others). The camera can be configured for weatherproofing, such as rain, snow, wind, sand, hail, or others. For example, the camera can include a brim, a wiper, a lens door, or others. The camera can be powered via a mains powerline or a battery. The camera, inclusive of any component thereof, can operate as a control panel or a load device, as disclosed herein.

The display can be configured for displaying high or ultra-high resolution or high or ultra-definition video (e.g. 4 k, 8 k, 12 k, or others). The display can be powered via a mains powerline or a battery. The display, inclusive of any component thereof, can operate as a control panel or a load device, as disclosed herein. The display can be oriented in landscape or portrait mode. For example, the display can range from 8 inches diagonally to 120 inches diagonally or less or more. The display can include or lack a bezel. The display can be framed in a frame or casing. The display can be rectangular, square-shaped, triangular, oval, pentagonal, or others.

The camera and the display can be directly connected to each other or connected to each other via an intermediary device, such as a controller or others, where the intermediary device can be powered via a mains powerline or a battery. The intermediary device, inclusive of any component thereof, can operate as a control panel or a load device, as disclosed herein. The wall can host the intermediary device or the intermediary device can be hosted off the wall, such as on a floor in proximity or non-proximity of the wall.

Accordingly, the camera captures a video imagery, in real-time, and feeds the video imagery, in real-time, to the display, whether directly or indirectly. As such, the display displays the video imagery, in real-time, such that a viewer is under impression that the display is a physical window. Note that to enhance a real window appearance, the display can be covered by a window treatment, such as blinds, shades, curtains, or others. Likewise, to enhance a real window appearance, the display can be encased in a window casing. Moreover, to enhance a real window appearance, the display can be non-flush with respect to the wall, as shown in FIG. 12a, or the display can be flush with respect to the wall, as shown in FIG. 12b. Additionally, to enhance a real window appearance, the camera can include or be electrically coupled to a microphone and the display can include or be electrically coupled to a speaker. Therefore, outdoor sounds can be captured via the microphone and can be output indoors via the speaker. Although FIGS. 12a-12b show the virtual window system from inside out, this configuration can be reversed to outside in, such as when the camera is indoors and the display is outdoors.

The camera, the display, or the intermedia device, inclusive of any component thereof, can operate as a control panel or a load device, as disclosed herein. The camera, the display, or the intermedia device can include a sensor, as disclosed herein (e.g. battery, capacitor, or mains powered). The sensor can trigger any input or output action of an input device or an output device of the camera, the display, or the intermedia device. The camera, the display, or the intermedia device can include a controller, as disclosed herein, and a user interface, as disclosed herein, where the controller is electrically coupled to the user interface, as disclosed herein. The camera, the display, or the intermedia device can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the camera, the display, or the intermedia device can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the camera, the display, or the intermedia device can be combined with all embodiments, devices, systems, features, or components thereof, as disclosed herein, and can be used to perform all methods, processes, algorithms, or sequences, as disclosed herein.

Figure 13:
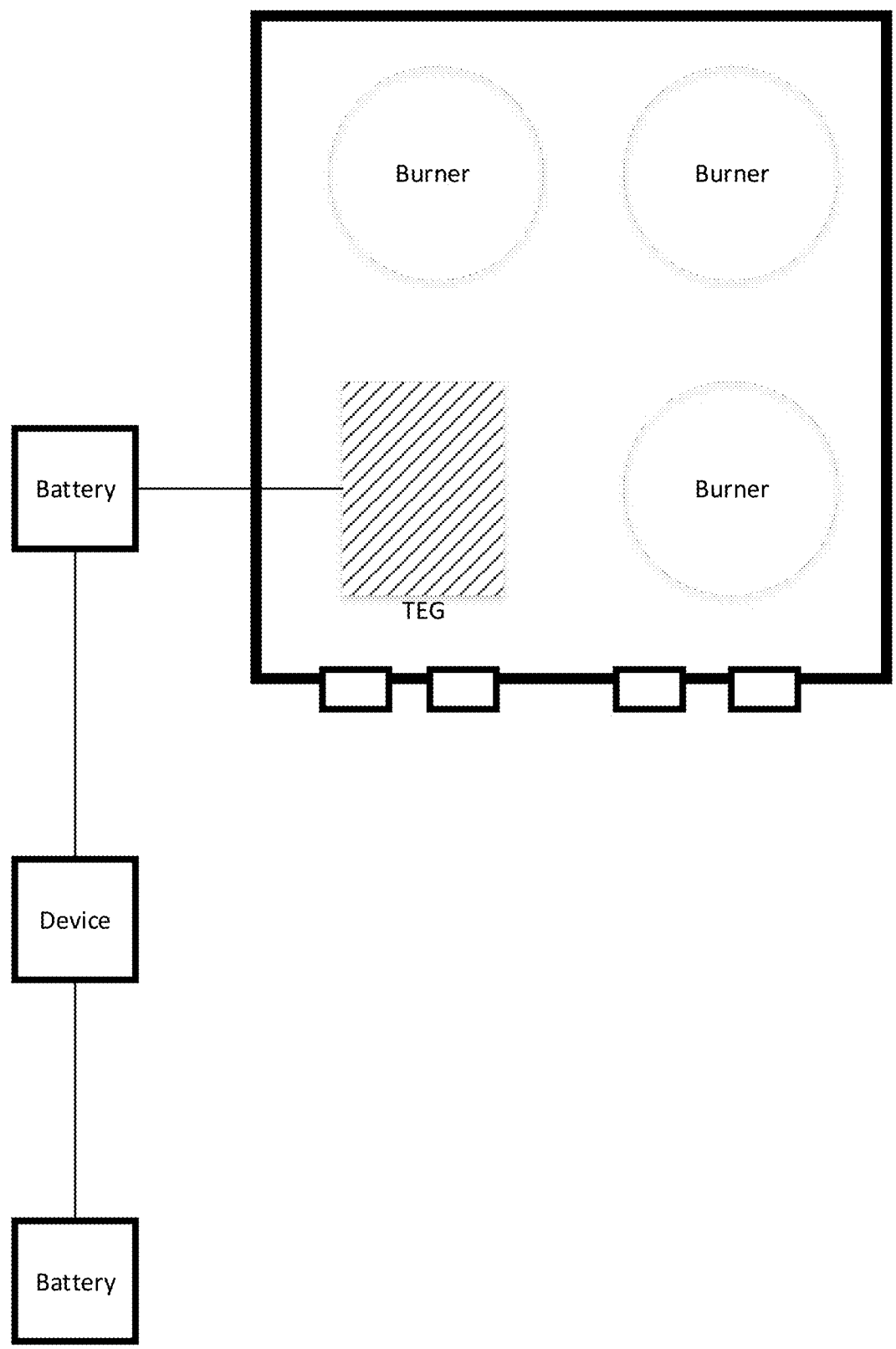
FIG. 13 shows a diagram of an embodiment of a thermoelectric generator (TEG) according to this disclosure.

FIG. 13 shows a diagram of an embodiment of a thermoelectric generator (TEG) according to this disclosure. In particular, a kitchen stove with a plurality of gas burners is shown. At least one of the burners is on and is emitting flame or heat. On top of that burner, whether directly or via grates, rests or sits a housing, a platform, a frame, a case, or a plate (e.g. flat, planar, cylindrical, or others) with a TEG having a hot side exposed to the burner (e.g. flame or heat) and a cold side (opposite side) exposed to a cooling solid or a cooling fluid, such as ambient air, volume of water, running water from sink, ice, frozen products or packages, or others. For example, the housing, the platform, the frame, the case, or plate can include a cavity or container or tube or conduit or channel containing a volume of ice or frozen products or packages, a still or moving or circulating volume of water or running water therethrough (e.g. from faucet inclined and circulating back into sink) or another cooling liquid. The TEG can include a thermoelectric material that generates power directly from heat by converting temperature differences into electric voltage (high electrical conductivity and low thermal conductivity). The TEG can include a thermoelectric module including a circuit containing thermoelectric materials which generates electricity from heat directly. The TEG can include a thermoelectric system that generates power by taking in heat from the burner. The TEG can include a heat exchanger on both sides of the thermoelectric module. As such, during electric power outages, the TEG can be used with at least one of the gas burners. For example, the plate can be sufficiently large to cover more than one burner, such as two, three, four, five, or more burners. The TEG is electrically coupled to a first rechargeable battery and the first rechargeable battery is electrically coupled to a load device, as disclosed herein, and the load device is electrically coupled to a second rechargeable battery, such that the load device is electrically between the first rechargeable battery and the second rechargeable battery. As such, the TEG can send power to the first battery and the first battery can power the load device, which can include a control panel, as disclosed herein. The second rechargeable battery can be recharged indirectly from the first rechargeable battery via the load device or power the load device. For example, the load device can include smartphone, tablet, kitchen appliance, refrigerator, or others.

Figure 14:
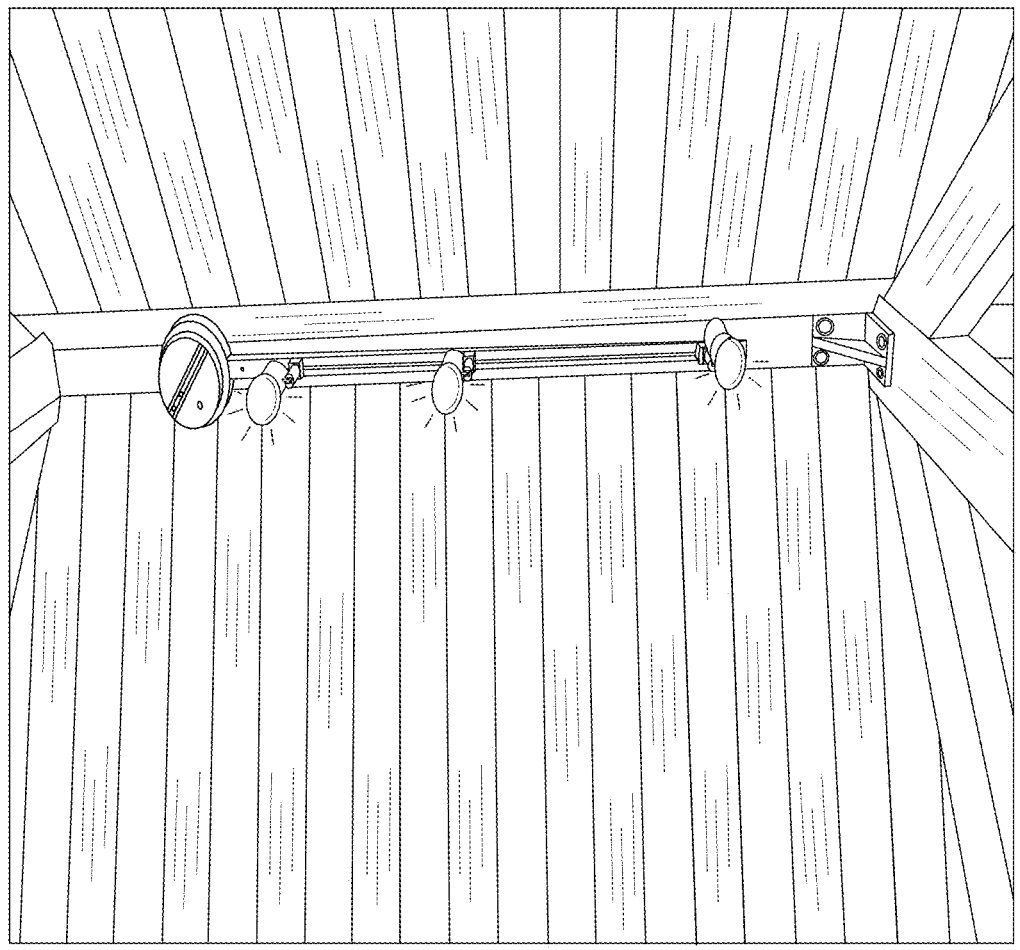
FIG. 14 shows a diagram of an embodiment of a plurality of lamps and a flame, smoke, or carbon monoxide (CO) detector powered via a power source that is wirelessly chargeable and hosted via a frame member according to this disclosure according to this disclosure.

FIG. 14 shows a diagram of an embodiment of a plurality of lamps and a flame, smoke, or carbon monoxide (CO) detector powered via a power source that is wirelessly chargeable and hosted via a frame member according to this disclosure according to this disclosure. In particular, an elongated bar (e.g. track, rail, or others) is attached (e.g. fastening, mating, interlocking, interlocking, bracketing, or others) to a ceiling portion of a building. The elongated bar hosts a flame, smoke, or CO detector, a power source, such as a rechargeable battery, and a plurality of lamps (e.g. LED, CFL, incandescent, halogen, or others) that are adjustable (e.g. positionally, orientation, or others) and powered via the power source. The flame, smoke, or CO detector is cylindrical, disc, or puck shaped, but such shaping can vary. The power source is cylindrical, disc, or puck shaped, but such shaping can vary. Note that the power source can be internal or external to the flame, smoke, or CO detector or attached or detached or coupled or uncoupled thereto. Otherwise, this configuration is similar to the light fixture 112.

Figure 15:
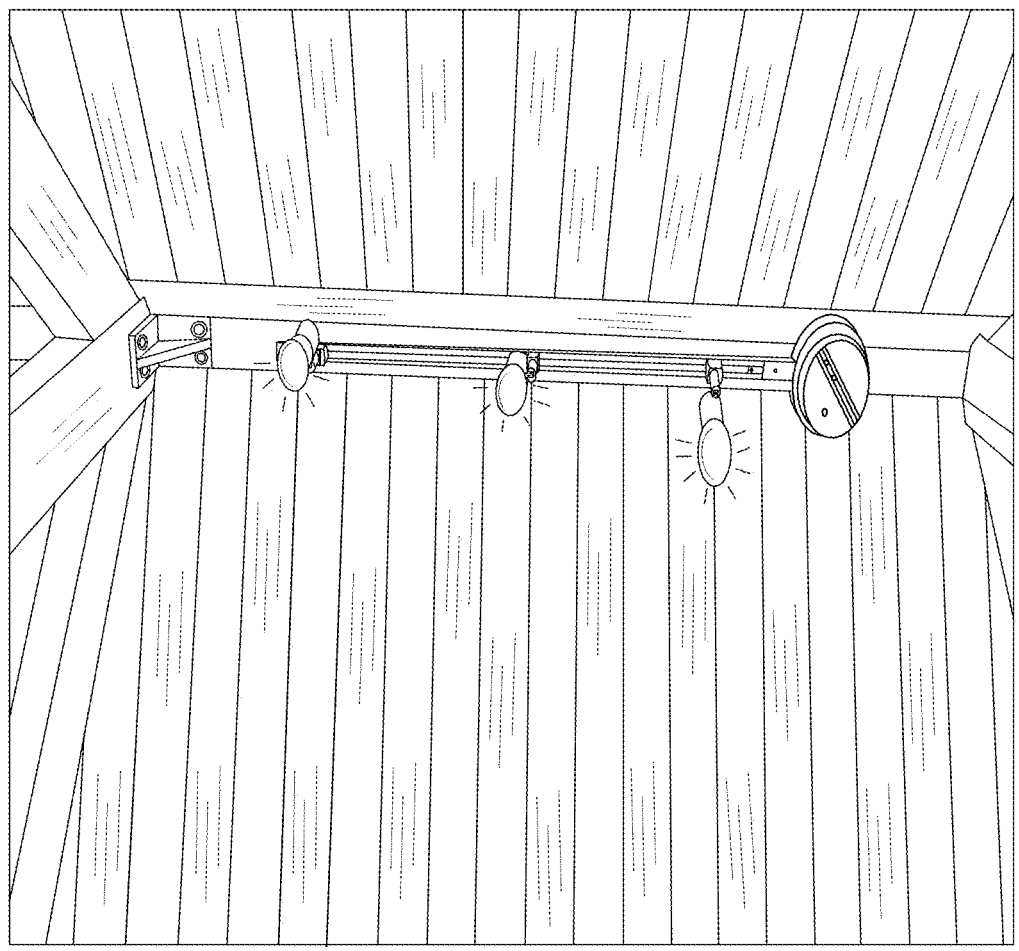
FIG. 15 shows a diagram of an embodiment of a flame, smoke, or CO detector powering a plurality of lamps according to this disclosure.

FIG. 15 shows a diagram of an embodiment of a flame, smoke, or CO detector powering a plurality of lamps according to this disclosure. In particular, an elongated bar (e.g. track, rail, or others) is attached (e.g. fastening, mating, interlocking, interlocking, bracketing, or others) to a ceiling portion of a building. The elongated bar hosts a flame, smoke, or CO detector containing a power source, such as a rechargeable battery, and a plurality of lamps (e.g. LED, CFL, incandescent, halogen, or others) that are adjustable (e.g. positionally, orientation, or others) and powered via the power source. The flame, smoke, or CO detector is cylindrical, disc, or puck shaped, but such shaping can vary. Otherwise, this configuration is similar to the light fixture 112.

Figure 16:
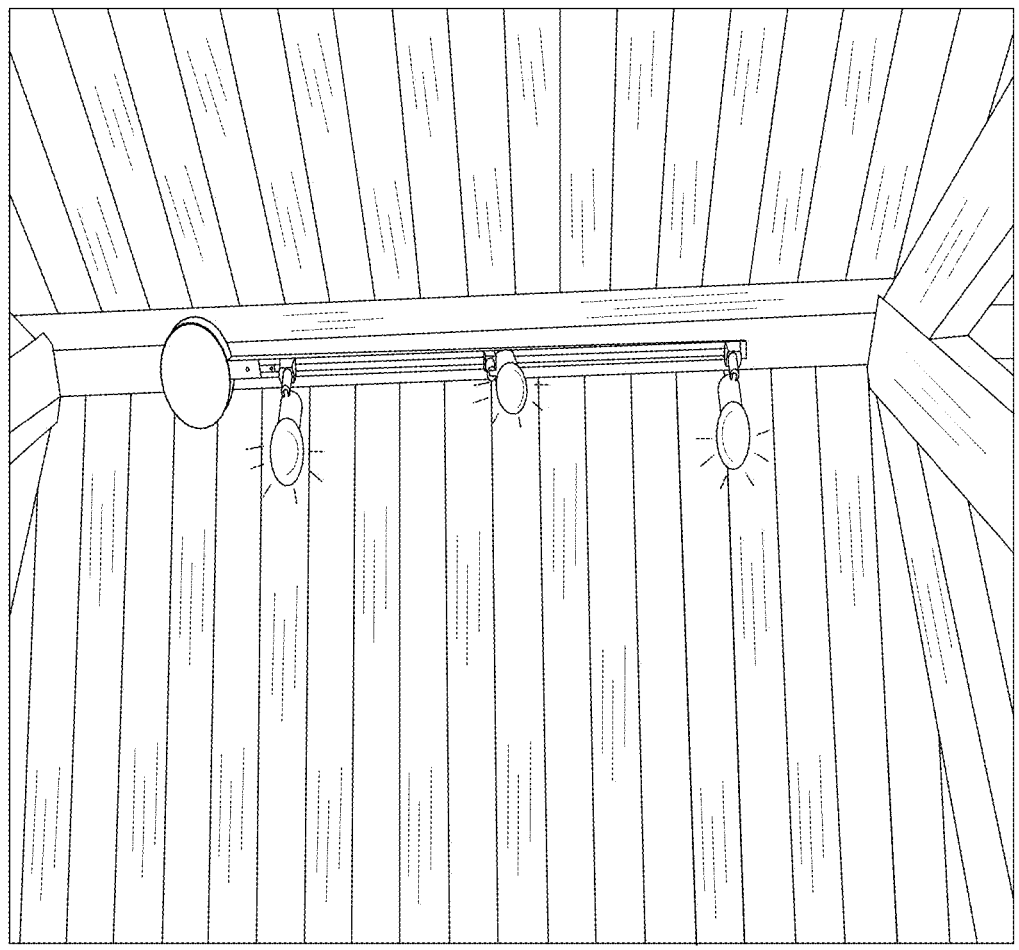
FIG. 16 shows a diagram of an embodiment of a power source that is wirelessly rechargeable and powering a plurality of lamps according to this disclosure.

FIG. 16 shows a diagram of an embodiment of a power source that is wirelessly rechargeable and powering a plurality of lamps according to this disclosure. In particular, an elongated bar (e.g. track, rail, or others) is attached (e.g. fastening, mating, interlocking, interlocking, bracketing, or others) to a ceiling portion of a building. The elongated bar hosts a power source, such as a rechargeable battery, and a plurality of lamps (e.g. LED, CFL, incandescent, halogen, or others) that are adjustable (e.g. positionally, orientation, or others) and powered via the power source. The power source is cylindrical, disc, or puck shaped, but such shaping can vary. Otherwise, this configuration is similar to the light fixture 112.

Figure 17:
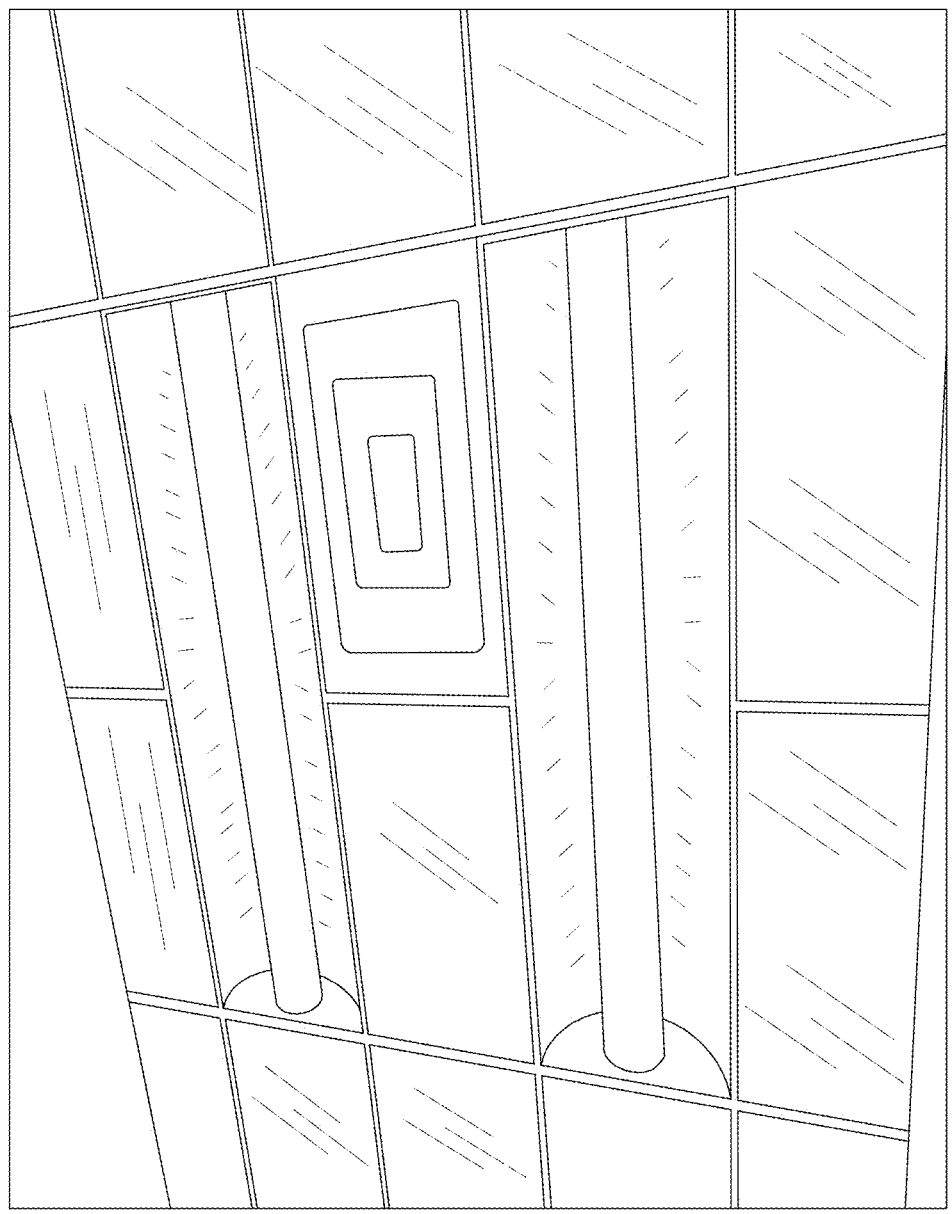
FIG. 17 shows a diagram of an embodiment of a plurality of gas discharge lamps being powered via a power source that is wirelessly chargeable according to this disclosure. The gas discharge lamps are configured as the light fixture 112.

FIG. 17 shows a diagram of an embodiment of a plurality of gas discharge lamps being powered via a power source that is wirelessly chargeable according to this disclosure. The gas discharge lamps are configured as the light fixture 112.

Figure 18:
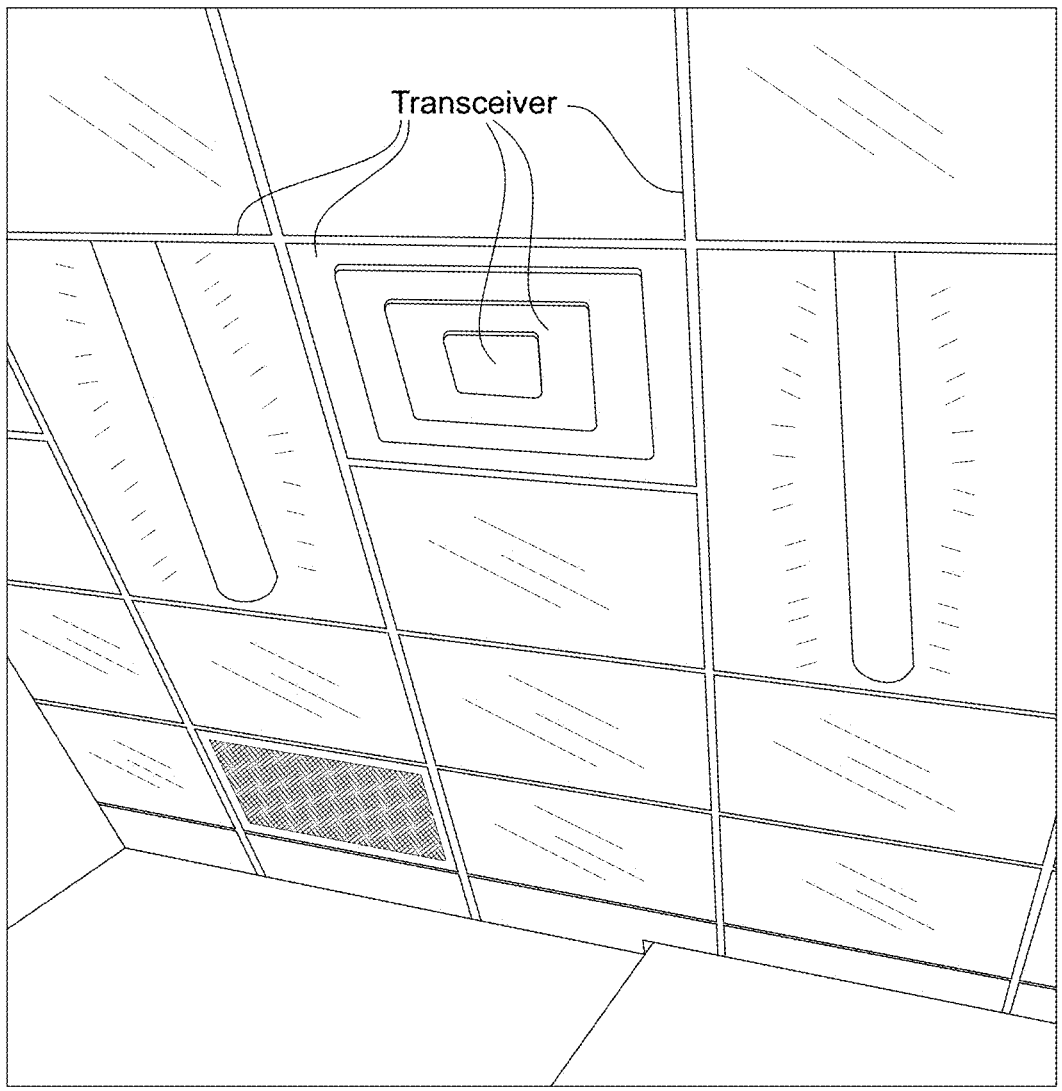
FIG. 18 shows a diagram of an embodiment of a ceiling diffuser positioned between a plurality of gas discharge lamps according to this disclosure.

FIG. 18 shows a diagram of an embodiment of a ceiling diffuser positioned between a plurality of gas discharge lamps according to this disclosure. In particular, a ceiling diffuser is stationary (e.g. resting, anchored, secured, mated, or fastened to a wall, floor, or ceiling). The ceiling diffuser, inclusive of any component thereof, can operate as a control panel or a load device, as disclosed herein. The ceiling diffuser can include a sensor, as disclosed herein (e.g. battery, capacitor, or mains powered). The sensor can trigger any input or output action of an input device or an output device of the ceiling diffuser. The ceiling diffuser can include a controller, as disclosed herein, and a user interface, as disclosed herein, where the controller is electrically coupled to the user interface, as disclosed herein. The ceiling diffuser can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the ceiling diffuser can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the ceiling diffuser can be combined with all embodiments, devices, systems, features, or components thereof, as disclosed herein, and can be used to perform all methods, processes, algorithms, or sequences, as disclosed herein.

Figure 19:
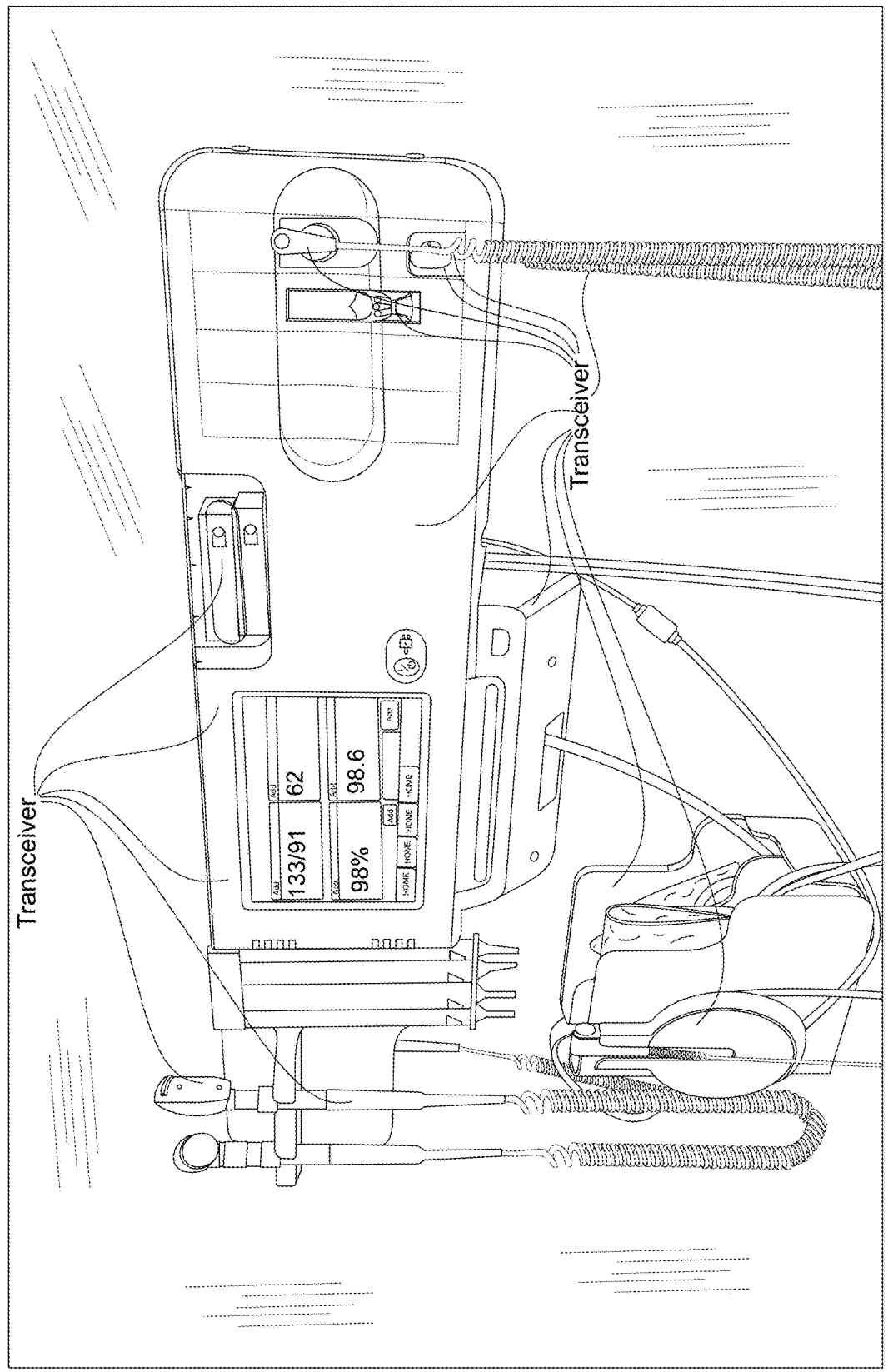
FIG. 19 shows a diagram of an embodiment of an integrated diagnostic wall system according to this disclosure.

FIG. 19 shows a diagram of an embodiment of an integrated diagnostic wall system according to this disclosure. In particular, an integrated diagnostic wall system is stationary (e.g. anchored, secured, mated, or fastened to a wall, floor, or ceiling). The integrated diagnostic wall system, inclusive of any component thereof, can operate as a control panel or a load device, as disclosed herein. Note that the integrated diagnostic wall system includes a plurality of medical devices wired thereto. Each of such medical devices, inclusive of any component thereof, can operate as a control panel or a load device, as disclosed herein. The integrated diagnostic wall system includes a power cable exiting therefrom. The power cable can enable battery manual recharging. Note that the integrated diagnostic wall system can avoid the power cable, such as via being self-contained. The integrated diagnostic wall system can include a sensor, as disclosed herein (e.g. battery, capacitor, or mains powered). The sensor can trigger any input or output action of an input device or an output device of the integrated diagnostic wall system. The integrated diagnostic wall system can include a controller, as disclosed herein, and a user interface, as disclosed herein, where the controller is electrically coupled to the user interface, as disclosed herein. The integrated diagnostic wall system can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the integrated diagnostic wall system can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the integrated diagnostic wall system can be combined with all embodiments, devices, systems, features, or components thereof, as disclosed herein, and can be used to perform all methods, processes, algorithms, or sequences, as disclosed herein.

Figure 20:
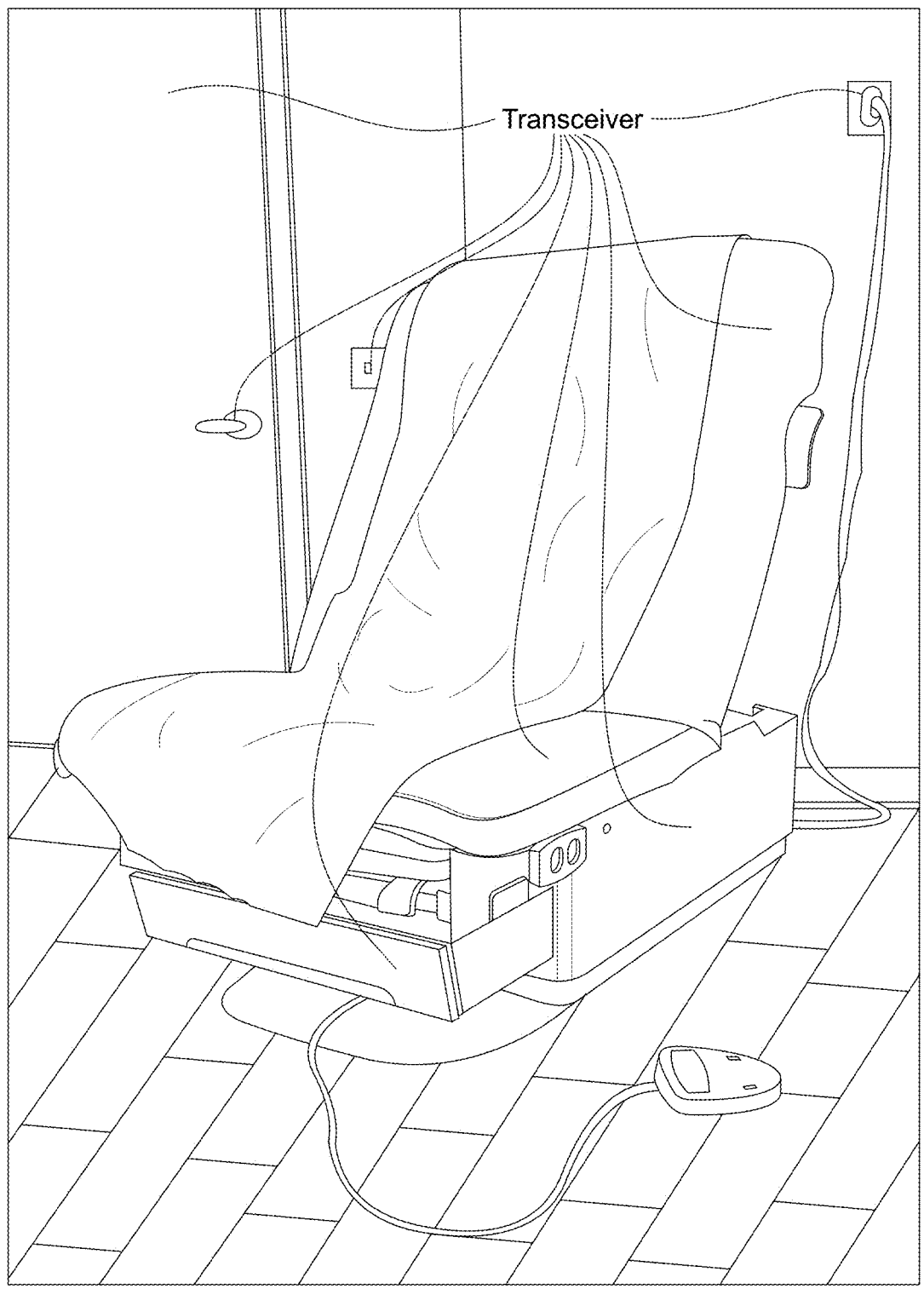
FIG. 20 shows a diagram of an embodiment of a medical chair according to this disclosure.

FIG. 20 shows a diagram of an embodiment of a medical chair according to this disclosure. In particular, a medical chair is stationary (e.g. resting, anchored, secured, mated, or fastened to a wall, floor, or ceiling). The medical chair, inclusive of any component thereof, can operate as a control panel or a load device, as disclosed herein. The medical chair includes a power cable and a pedal cable exiting therefrom. The power cable can enable battery manual recharging. Note that the medical chair can avoid the power cable, such as via being self-contained. The pedal cable enables a wired receipt of an input from a pedal device to adjust chair incline. Note that the medical chair can avoid the pedal cable, such as via the pedal device wirelessly communicating with the medical chair. Further, note that the pedal device, inclusive of any component thereof, can operate as a control panel or a load device, as disclosed herein. The medical chair can include a sensor, as disclosed herein (e.g. battery, capacitor, or mains powered). The sensor can trigger any input or output action of an input device or an output device of the medical chair. The medical chair can include a controller, as disclosed herein, and a user interface, as disclosed herein, where the controller is electrically coupled to the user interface, as disclosed herein. The medical chair can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the medical chair can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the medical chair can be combined with all embodiments, devices, systems, features, or components thereof, as disclosed herein, and can be used to perform all methods, processes, algorithms, or sequences, as disclosed herein.

Figure 21:
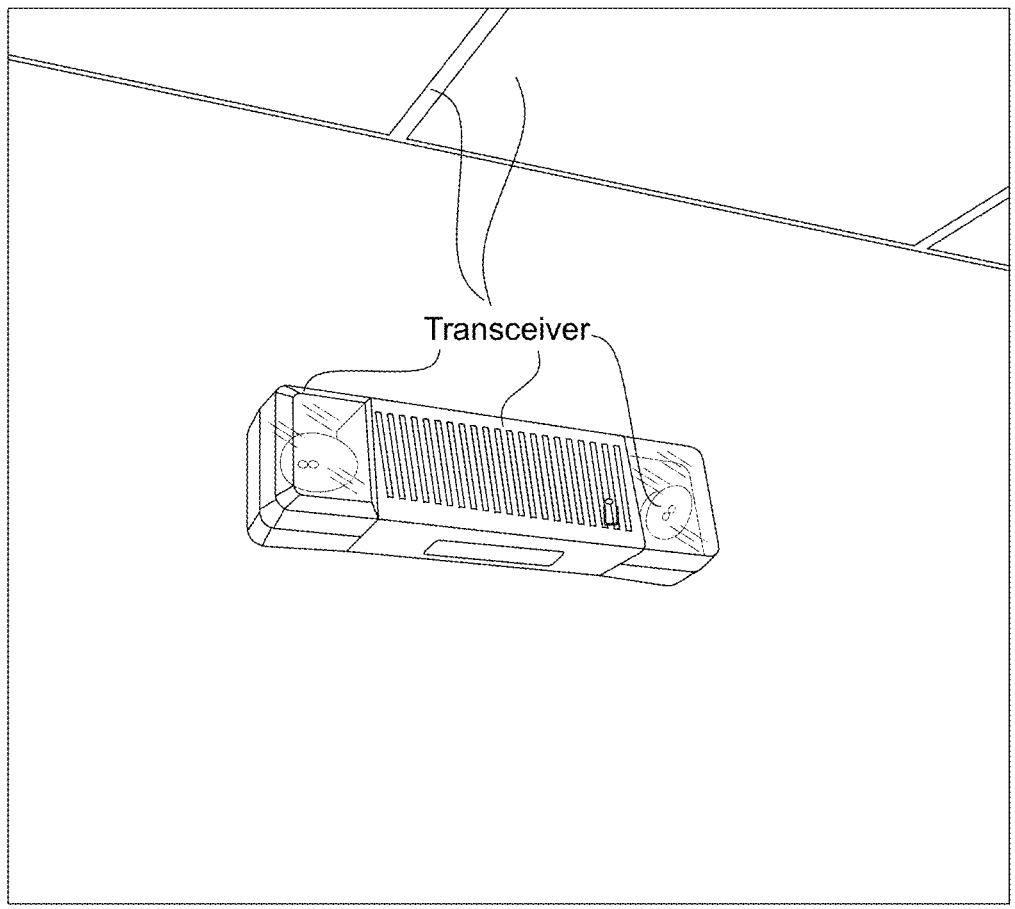
FIG. 21 shows a diagram of an embodiment of a wall housing hosting a plurality of emergency lamps according to this disclosure.

FIG. 21 shows a diagram of an embodiment of a wall housing hosting a plurality of emergency lamps according to this disclosure. In particular, a wall housing hosting a plurality of emergency lamps is stationary (e.g. anchored, secured, mated, or fastened to a wall, floor, or ceiling). The wall housing, inclusive of any component thereof, can operate as a control panel or a load device, as disclosed herein. The wall housing can include a sensor, as disclosed herein (e.g. battery, capacitor, or mains powered). The sensor can trigger any input or output action of an input device or an output device of the wall housing. The wall housing can include a controller, as disclosed herein, and a user interface, as disclosed herein, where the controller is electrically coupled to the user interface, as disclosed herein. The wall housing can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the wall housing can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the wall housing can be combined with all embodiments, devices, systems, features, or components thereof, as disclosed herein, and can be used to perform all methods, processes, algorithms, or sequences, as disclosed herein.

Figure 22:
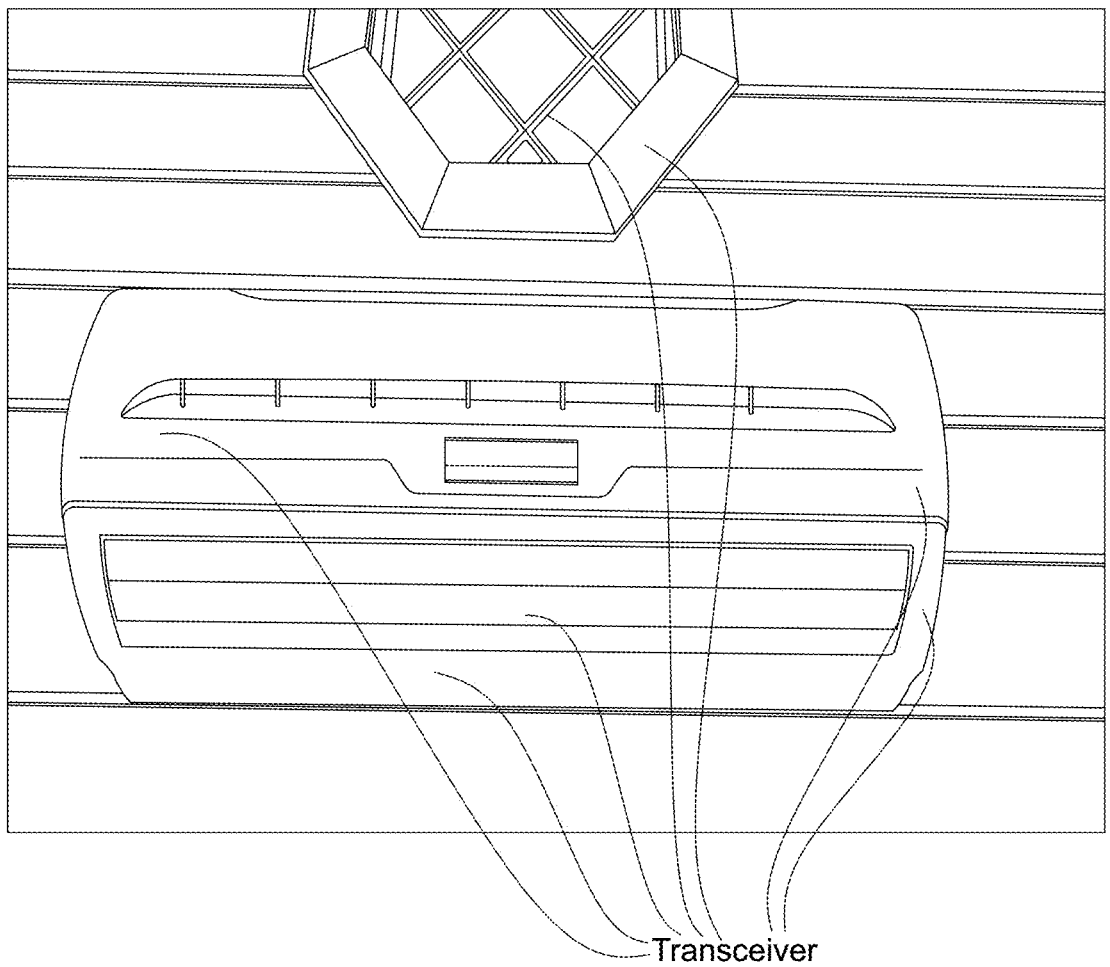
FIG. 22 shows a diagram of an embodiment of an indoor unit (air handler or evaporator) of a mini-split air heating or cooling system according to this disclosure.

FIG. 22 shows a diagram of an embodiment of an indoor unit (air handler or evaporator) of a mini-split air heating or cooling system according to this disclosure. In particular, an indoor unit is stationary (e.g. anchored, secured, mated, or fastened to a wall, floor, or ceiling). The indoor unit, inclusive of any component thereof, can operate as a control panel or a load device, as disclosed herein. The indoor unit can include a sensor, as disclosed herein (e.g. battery, capacitor, or mains powered). The sensor can trigger any input or output action of an input device or an output device of the indoor unit. The indoor unit can include a controller, as disclosed herein, and a user interface, as disclosed herein, where the controller is electrically coupled to the user interface, as disclosed herein. The indoor unit can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the indoor unit can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the indoor unit can be combined with all embodiments, devices, systems, features, or components thereof, as disclosed herein, and can be used to perform all methods, processes, algorithms, or sequences, as disclosed herein.

Figure 23:
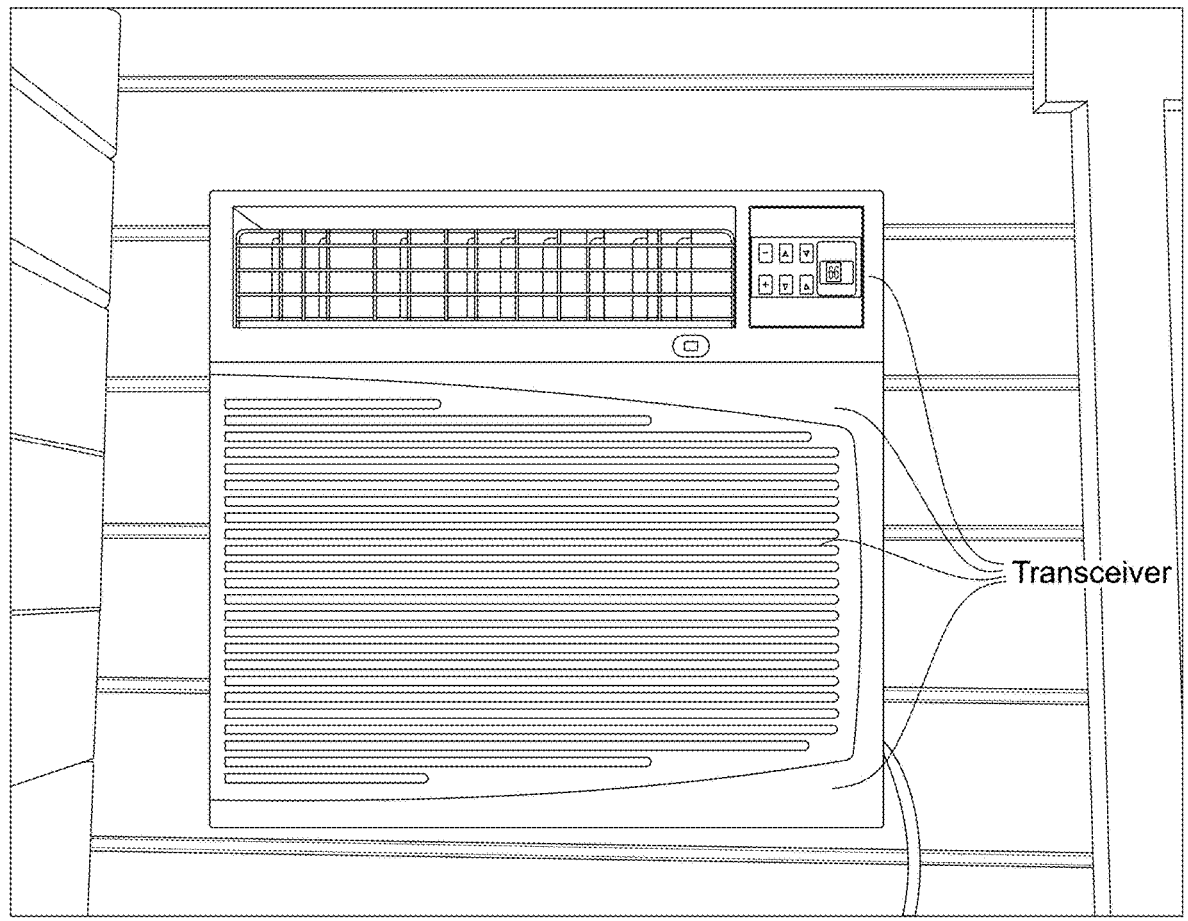
FIG. 23 shows a diagram of an embodiment of an air conditioner according to this disclosure.

FIG. 23 shows a diagram of an embodiment of an air conditioner according to this disclosure. In particular, an air conditioner can be stationary (e.g. anchored, secured, mated, or fastened to a wall, floor, or ceiling) or mobile, which can be inclusive of wheels. The air conditioner, inclusive of any component thereof, can operate as a control panel or a load device, as disclosed herein. The air conditioner includes a cable exiting therefrom, such as for fixture battery manual recharging, controlling another device or being controlled by another device, networking, or others. Note that the air condition can avoid the cable exiting therefrom, such as via being self-contained. The air conditioner can include a sensor, as disclosed herein (e.g. battery, capacitor, or mains powered). The sensor can trigger any input or output action of an input device or an output device of the air conditioner. The air conditioner can include a controller, as disclosed herein, and a user interface, as disclosed herein, where the controller is electrically coupled to the user interface, as disclosed herein. The air conditioner can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the air conditioner can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the air conditioner can be combined with all embodiments, devices, systems, features, or components thereof, as disclosed herein, and can be used to perform all methods, processes, algorithms, or sequences, as disclosed herein.

Figure 24:
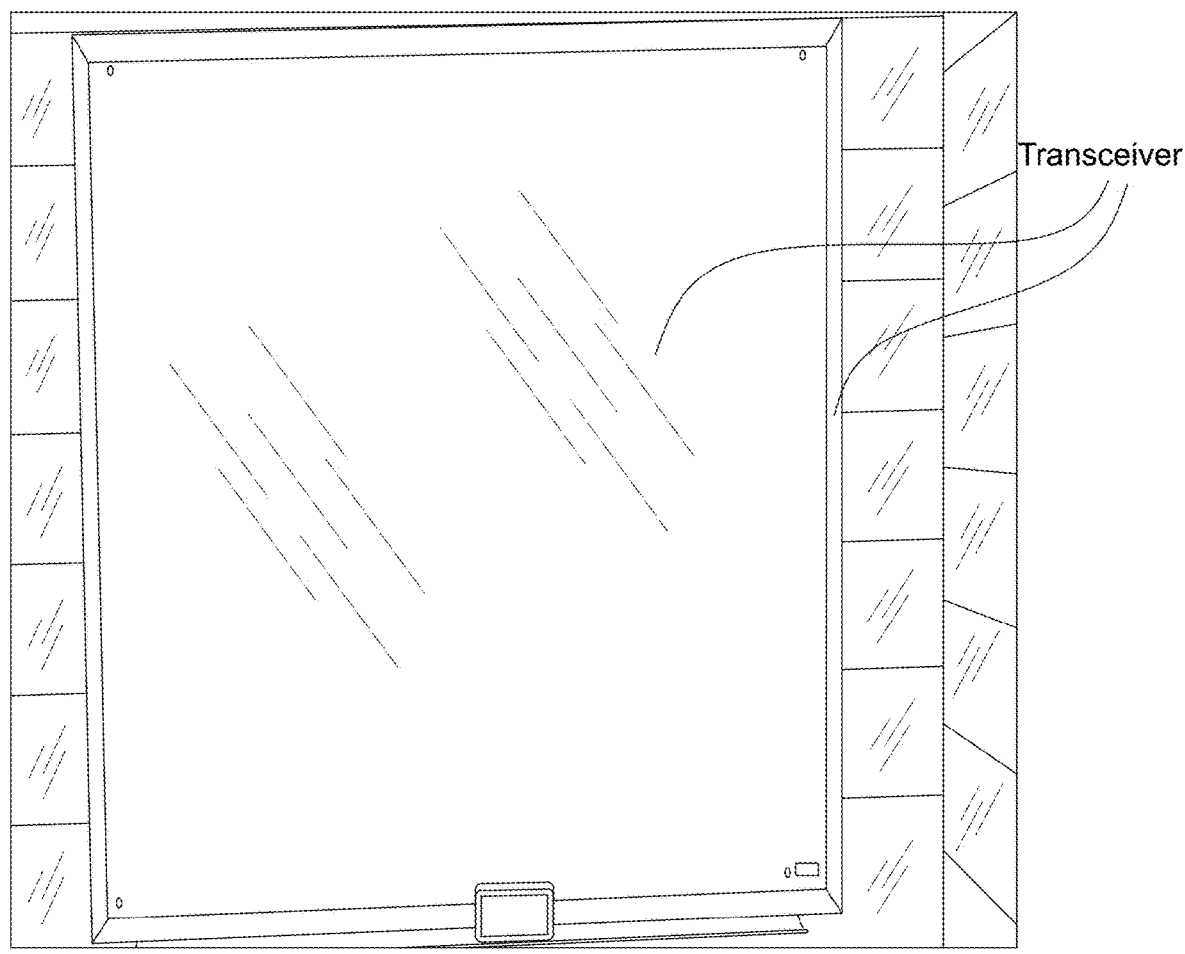
FIG. 24 shows a diagram of an embodiment of a smartboard according to this disclosure.

FIG. 24 shows a diagram of an embodiment of a smartboard according to this disclosure. In particular, a smartboard, which can include an interactive whiteboard (e.g. LCD, plasma, electrophoretic, touch or haptic enabled, or others) can be stationary (e.g. anchored, secured, mated, or fastened to a wall, floor, or ceiling) or mobile, which can be inclusive of wheels. The smartboard, inclusive of any component thereof, can operate as a control panel or a load device, as disclosed herein. The smartboard can include a sensor, as disclosed herein (e.g. battery, capacitor, or mains powered). The sensor can trigger any input or output action of an input device or an output device of the smartboard. The smartboard can include a controller, as disclosed herein, and a user interface, as disclosed herein, where the controller is electrically coupled to the user interface, as disclosed herein. The smartboard can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the smartboard can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the smartboard can be combined with all embodiments, devices, systems, features, or components thereof, as disclosed herein, and can be used to perform all methods, processes, algorithms, or sequences, as disclosed herein.

Figure 25:
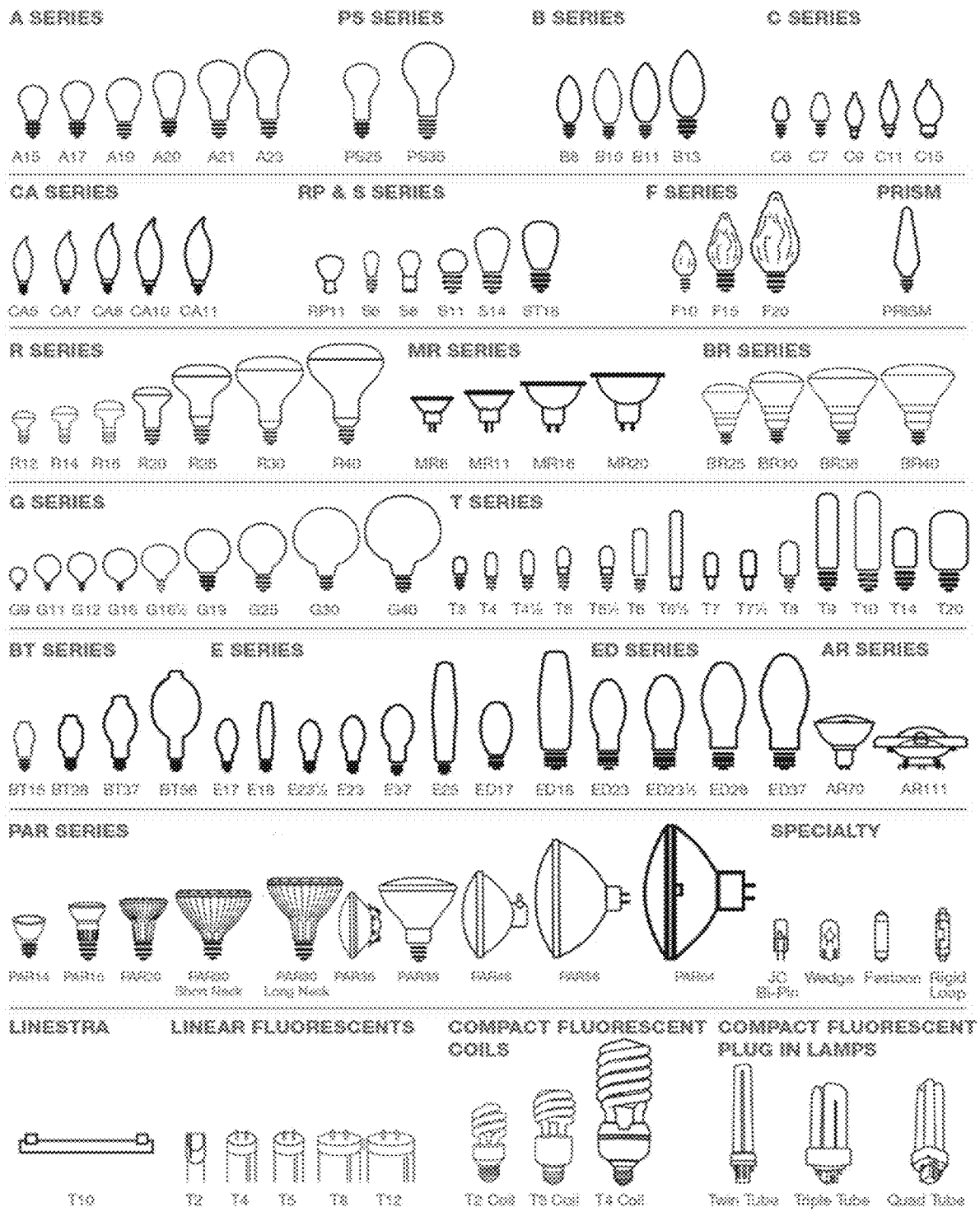
FIGS. 25-27 show a plurality of embodiments of a plurality of light bulbs according to this disclosure
Figure 26:
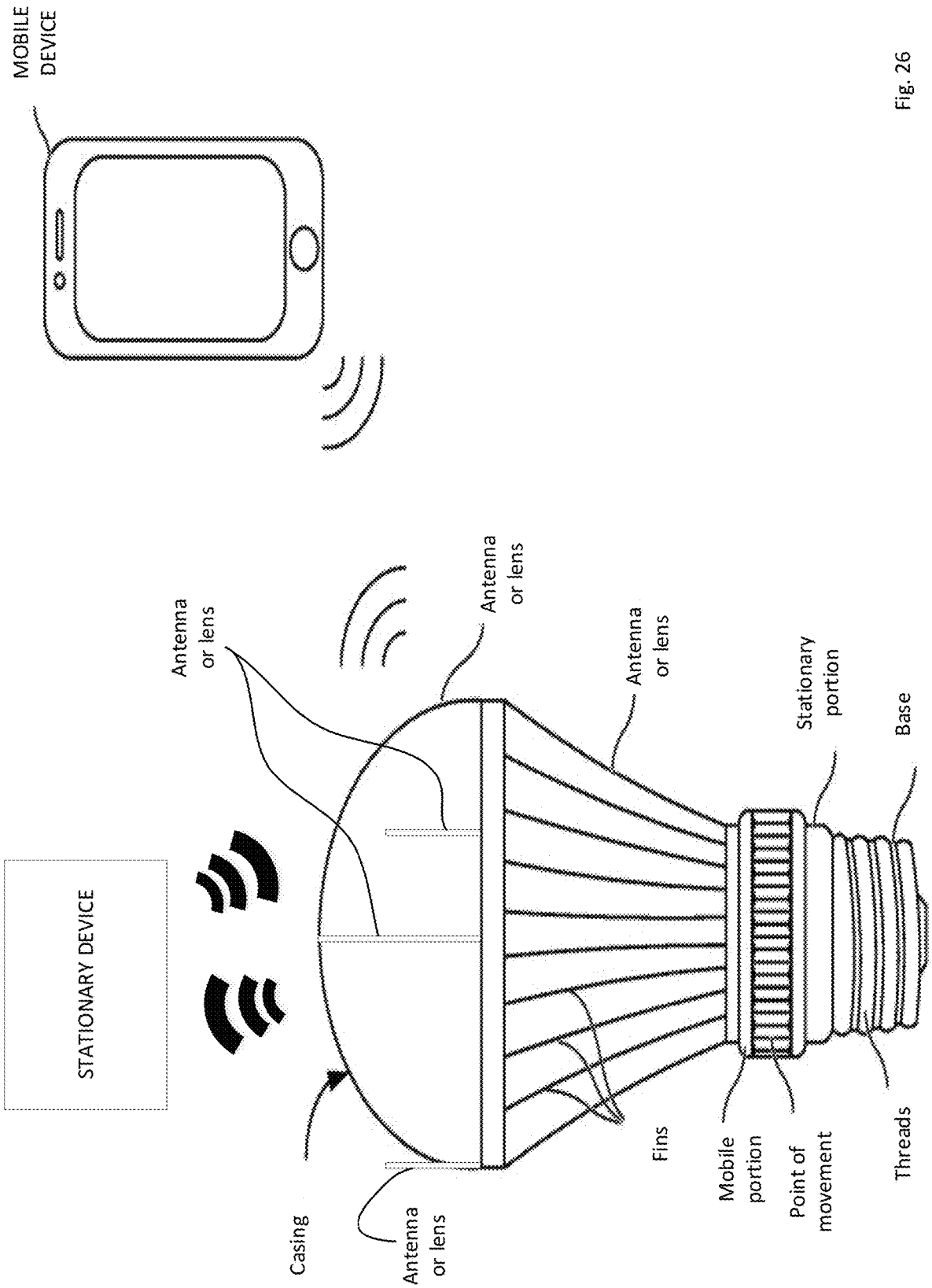
Figure 27:
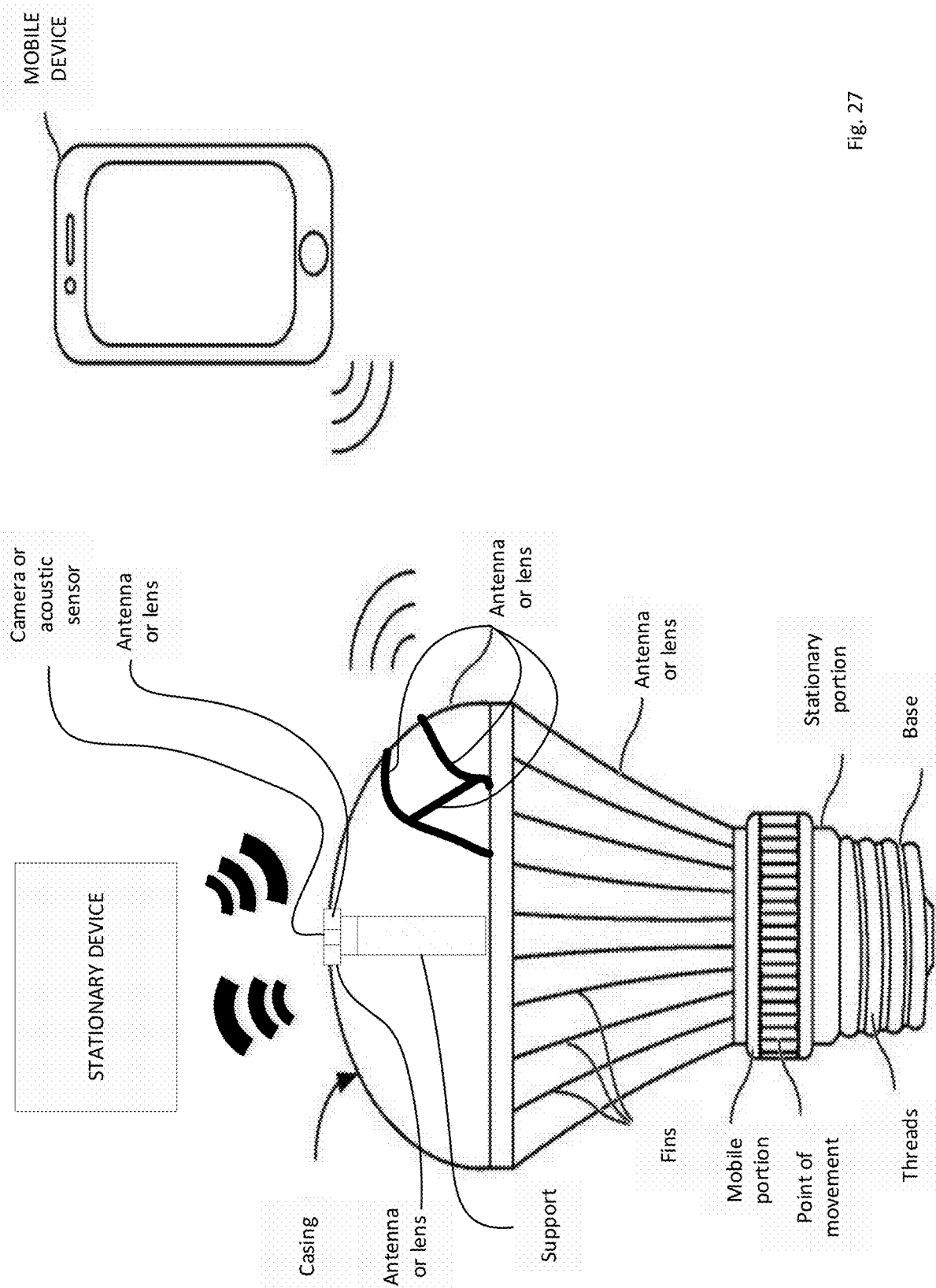

FIGS. 25-27 show a plurality of embodiments of a light bulb according to this disclosure. In particular, a light bulb, inclusive of any component thereof, can operate as a control panel or a load device, as disclosed herein. The light bulb can be embodied as all light bulbs shown in FIG. 25 (e.g. threaded, pins, or others) or others. The light bulb includes a base (e.g. cylinder with threads, housing or platform with pins, or others), a light source (e.g. filament, light emitting diode (LED), gas discharge, or others) and a casing (e.g. transparent, translucent, colored, frosted, or others). The casing is secured to the base (e.g. fastening, interlocking, mating, adhering, magnetizing, or others), the light source is secured (e.g. fastening, interlocking, mating, adhering, magnetizing, or others) to the base (e.g. via platform, frame, chassis, columns, housing, or others), and the casing encloses the light source (e.g. dome, hemisphere, semi-ovoid, T-shape, or others) such that the light source can output a light (e.g. white, colored, warm, cool, flashing, or others) through the casing. The light source can be incandescent, LED, gas-discharge (e.g. noble gas, helium, nitrogen, fluorescent, argon, krypton, xenon, neon, sodium, or others), CFL, halogen, or others. The light bulb can host a plurality of heat dispersing fins or a heat sink. The light bulb can include a sensor as disclosed herein (e.g. battery, capacitor, or mains powered). For example, the sensor can include a proximity sensor, motion sensor, acoustic sensor, heat sensor, or others. The sensor can trigger any input or output action of an input device or an output device of the light bulb (e.g. turn on or off, change color or intensity, control wireless power signal setting or wireless control or information signal settings, or others). Note that the light bulb can be included in a string of lights. Likewise, the string of lights can host all devices of the light bulb (e.g. wireless power signal or wireless control or information signal transmitters, wireless power signal or wireless control or information signal receivers, sensors, or others).

Note that in light fixtures (e.g. sconce fixtures or others) that have shades or diffusers (e.g. transparent, translucent, colored, opaque, frosted, photovoltaic coating (transparent or non-transparent) or cells, or others), then the shades or diffusers (e.g. conical shaped, frustum shaped, tubular shaped, or others) can include a threaded or pin base allowing for insertion into a bulb socket and have a bulb socket for reception of the light bulb, thereby enabling the shades or the diffusers functioning as adapters or intermediary devices between the light bulb and the light fixture and providing electrical power to the light bulb. In such scenarios, the shades or diffusers, inclusive of any component thereof, can operate as a control panel or a load device, as disclosed herein. For example, the shades or diffusers can include a sensor, as disclosed herein (e.g. battery, capacitor, or mains powered). The sensor can trigger any input or output action of an input device or an output device of the shades or diffusers. The shades or diffusers can include a controller, as disclosed herein, and a user interface, as disclosed herein, where the controller is electrically coupled to the user interface, as disclosed herein. The shades or diffusers can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the shades or diffusers can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the shades or diffusers can be combined with all embodiments, devices, features, systems, or components thereof, as disclosed herein, and can be used to perform all methods, processes, algorithms, or sequences, as disclosed herein.

The light bulb can include a network-enabled (e.g. Wi-Fi, Bluetooth, Zigbee, Z-Wave, NFC, Insteon, radio, infrared, laser, acoustic, or others) smart light bulb. The light bulb can include a controller, a network communication device, a card or data port, a mover, an input device, a geolocation device, or an output device, each of which can be controlled by the controller or powered via the light bulb. For example, the network communication device can include a Wi-Fi chip, Bluetooth chip, Zigbee chip, Z-Wave chip, or others. For example, the card or data port can include a removable memory card (e.g. SD, mini SD, compact flash, memory stick, SIM card, MMC, Smart Media, or others), a USB port, a Lightening port, a micro USB port, or others, whether unidirectional or bidirectional. For example, the mover can include an electric motor (e.g. brushed, brushless, or others), an actuator (e.g. electric, pneumatic, hydraulic, coiled polymer, memory alloy, mechanical, piezoelectric, or others), a gear system (e.g. planetary, rack-pinion, worm, or others), a hinge (e.g. spring, barrel, pivot, flag, or others), or others. For example, the input device can include a camera (e.g. wide angle, fish-eye, 360-degree, infrared, or others), a microphone or an acoustic sensor, or others. For example, the geolocation device can include a GPS device, a GLONASS device, a terrestrial base station signal triangulation device, or others. For example, the output device can include a display (e.g. LCD, plasma, electrophoretic, touch-enabled or haptic, or others), a speaker or transducer, or others. For example, the light bulb can be configured for a two-way audio session via the network communication device (e.g. via Wi-Fi or others), the speaker and the microphone. For example, the light bulb can be configured to adjust a position of the casing or the light source (e.g. can adjust illumination direction, wireless power signal or wireless control or information signal direction, or others), such as via the base being configured for swiveling, rotation, tilting, pivoting, or others. For example, the base can have a first portion (e.g. with threads, pins, or others) that remains stationary when inserted into a bulb socket and a second portion that is configured to swivel, rotate, tilt, or pivot relative to the first portion. These forms of movement can be manual, such as via hand adjustment, or automated, such as via the mover. These forms of movement can include more than one full rotation, less than one full rotation, less about 360 degrees, 270 degrees, 180 degrees, 120 degrees, 90 degrees, 60 degrees, 45 degrees, 30 degrees, 15 degrees, or less, whether along a horizontal, vertical, or diagonal plane or axis.

The light bulb can wirelessly pair with a stationary or mobile computing device (e.g. smartphone, tablet, laptop, desktop, wearable, vehicle, or others) via a software application (e.g. dedicated, productivity suite, home or building security, browser, or others) or mobile app (e.g. downloaded from iTunes, Google Play, or others) over a network (e.g. 2 ghz, 5 ghz, Wi-Fi, Bluetooth, Zigbee, NFC, Li-Fi, or others). Consequently, the light bulb can grant the computing device read, write, or delete access to some, most, or all captured data (e.g. videos, photos, sounds, area map, or others), whether this access wired, wireless, or via the removable memory card. For example, the position of the casing or the light source can be adjusted remotely via the computing device (e.g. via touchscreen, joystick, physical or virtual keyboard, cursor device, or others). For example, the position of the casing or the light source can be adjusted via a timer or scheduling logic of the software application or mobile app. For example, the timer or scheduling logic can be adjustable based on the geolocation device, such as when crossing time-zones, moving clocks back or forward, or others. For example, the light bulb can host an image processing logic (e.g. software or hardware) to real-time preprocess image data, if necessary, and perform real-time object (e.g. opaque, non-opaque, transparent, translucent, frosted, or others) detection/tracking on the preprocessed image data (e.g. humans, faces, poses, pets, furniture, eating or cooking utensils, construction or mechanic or industrial tools, toys, sports equipment, medical devices, firearms or explosives, wirelessly chargeable devices, robots, object actions, or others) and then act accordingly. For example, some of such actions can include reading, writing, modifying, sending, or deleting local (e.g. light bulb memory or others) or remote (e.g. computing device, server, or others) data (e.g. alphanumeric text, image, sound, videos, photos, or others). For example, some of such actions can include notify the computing device of some detected/tracked event, direct or redirect or focus or refocus wireless power signals or wireless control or information signals to specified objects or specified areas or avoid specified objects or specified areas or change wireless power modalities (e.g. between infrared laser beam and radio signals or others) or change wireless power settings (for one or more than one modality) or change wireless power rates or others) or move the casing or the light source toward or away from specified objects or specified areas. For example, when the light bulb includes a plurality of acoustic sensors, then the light bulb can be configured to emit sound signals (e.g. via transmitter or others) and detect/track objects via echoes of the sound signals or aid (e.g. confirm, deny, reconfirm, cooperate, collaborate, or others) camera-based object detection and then notify the computing device of some detected/tracked event, direct or redirect or focus or refocus wireless power signals or wireless control or information signals to specified objects or specified areas or avoid specified objects or specified areas or change wireless power modalities (e.g. between infrared laser beam and radio signals or others) or change wireless power settings (for one or more than one modality) or change wireless power rates or others) or move the casing or the light source toward or away from specified objects or specified areas. Note that the light bulb can also wirelessly coordinate with off-board devices (e.g. smartphones, tablets, light fixtures, furniture, stationary devices, cameras, sensors, vehicles, or others) to detect/track objects aid (e.g. confirm, deny, reconfirm, cooperate, collaborate, or others) camera-based or acoustic-sensor-based object detection and then notify or enable notification of the computing device of some detected/tracked event or direct or redirect or focus or refocus wireless power signals or wireless control or information signals to specified objects or specified areas or avoid specified objects or specified areas or change wireless power modalities (e.g. between infrared laser beam and radio signals or others) or change wireless power settings (for one or more than one modality) or change wireless power rates or others or move the casing or the light source toward or away from specified objects or specified areas.

The light bulb can include a controller, as disclosed herein, and a user interface, as disclosed herein, where the controller is electrically coupled to the user interface, as disclosed herein. The light bulb can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the light bulb can include a wireless power signal transceiver and a wireless control or information signal transceiver. For example, the light bulb can include a first wireless power transmitter and a second wireless power transmitter, where the first wireless power transmitter transmits in accordance with a first modality (e.g. radio signal, infrared laser, or others) and the second wireless power transmitter transmits in accordance with a second modality (e.g. radio signal, infrared laser, or others), where the first modality can be identical to or different from each other. For example, the first wireless power transmitter transmits wireless power via radio signals and the second wireless power transmitter transmits wireless power via infrared laser beams. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the light bulb can be combined with all embodiments, devices, features, systems, or components thereof as disclosed herein and can be used to perform all methods, processes, algorithms, or sequences, as disclosed herein.

As shown in FIG. 26, the light bulb can include the wireless power signal transceiver (e.g. transmitter or receiver) or the wireless control or information signal transceiver (e.g. transmitter or receiver). As such, the light bulb can include various signal propagation devices to propagate those signals (e.g. antenna, infrared laser beam lens, acoustic beam generator, or others), which may be helpful for signal propagation depending on how the light bulb is installed (e.g. facing down, facing up, facing sideways, or others). For example, the light bulb can host the signal propagation devices (e.g. antenna, infrared laser beam lens, or others) via the base, the casing, or internal light bulb structure hosting the light source (e.g. pedestal, column, housing, or others). For example, the casing or the base can have the antenna extend thereon or therein horizontally, vertically, diagonally, rectilinearly, non-rectilinearly (e.g. arcuate, sinusoidal, zigzag, pulse, or others), grid or mesh (e.g. longitude-latitude or others) manner, open-shape manner, closed-shape manner, asymmetrical manner, symmetrical manner, star manner, tree manner, lasso manner, symbol manner, alphanumeric character manner inclusive of letters, numbers, grammar signs, small fonts, or capital fonts (e.g. Q, W, E, R, T, Y, U, I, O, P, A, S, D, F, G, H, J, K, L, Z, X, C, V, B, N, M, or others). As shown in FIG. 26, the light bulb is transmitting or receiving wireless power signals with a mobile device in a first wireless power modality (e.g. radio signals, infrared laser beam, or others) and a stationary device in a second power modality (e.g. infrared laser beam, radio signals or others), where the first wireless power modality (e.g. infrared laser beam) is different from the second wireless power modality (e.g. radio signals), although identical modality is possible. Note that this form of operation may also apply to wireless control or informational signals. Further, note that signal propagation can include sending of signals or receiving of signals, such as via wireless transmitter or wireless receiver.

As shown in FIG. 27, the light bulb hosts a support unit supporting an input device and a signal propagation device. In particular, the support unit (e.g. column, housing, encasement, pedestal, beam, bar, wall, frame, chassis, platform, cable, chain, rope, or others) extends from the base and is encased by the casing. However, note that the support unit does not need to be encased by the casing, but the casing can extend along, about, or around the support unit (e.g. umbrella style or others) and the support unit can extend up to the casing, past the casing, or below the casing (e.g. dimpled or others). For example, the support unit can be central or non-central (e.g. offset) to the casing. The support unit can be rigid, flexible, resilient, or elastic. The light sources (e.g. light diodes or others) can extend along, about, or around the support unit. The input device is powered via the light bulb and can include a camera, an acoustic sensor, a proximity sensor, a motion sensor, a temperature sensor, a heat sensor, or others. The signal propagation device is powered via the light bulb and can include an antenna, an infrared laser beam generator, or others. The signal propagation device is included or electrically coupled to a wireless power signal transceiver (e.g. transmitter or receiver) or a wireless control or information signal transceiver (e.g. transmitter or receiver). The signal propagation device can extend along, about, or around the input device, where such extension can be concentric, C-shaped, I-shaped, J-shaped, O-shaped, D-shaped, V-shaped, S-shaped, T-shaped, O-shaped, U-shaped, or others. The input device can extend along, about, or around the propagation device, where such extension can be concentric, C-shaped, I-shaped, J-shaped, O-shaped, D-shaped, V-shaped, S-shaped, T-shaped, O-shaped, U-shaped, or others. As such, as explained above, the light bulb can employ the input device to assist in propagation of wireless power signals or wireless control or information signals, as disclosed herein. For example, such assistance can enable direct or redirect or focus or refocus wireless power signals or wireless control or information signals to specified objects or specified areas or avoid specified objects or specified areas or change wireless power modalities (e.g. between infrared laser beam and radio signals or others) or change wireless power settings (for one or more than one modality) or change wireless power rates or others) or move the casing or the light source toward or away from specified objects or specified areas. Note that the support unit can include the wireless power signal receiver or the wireless power signal transmitter or the wireless control or information signal receiver or the wireless control or information signal transmitter.

Figure 28:
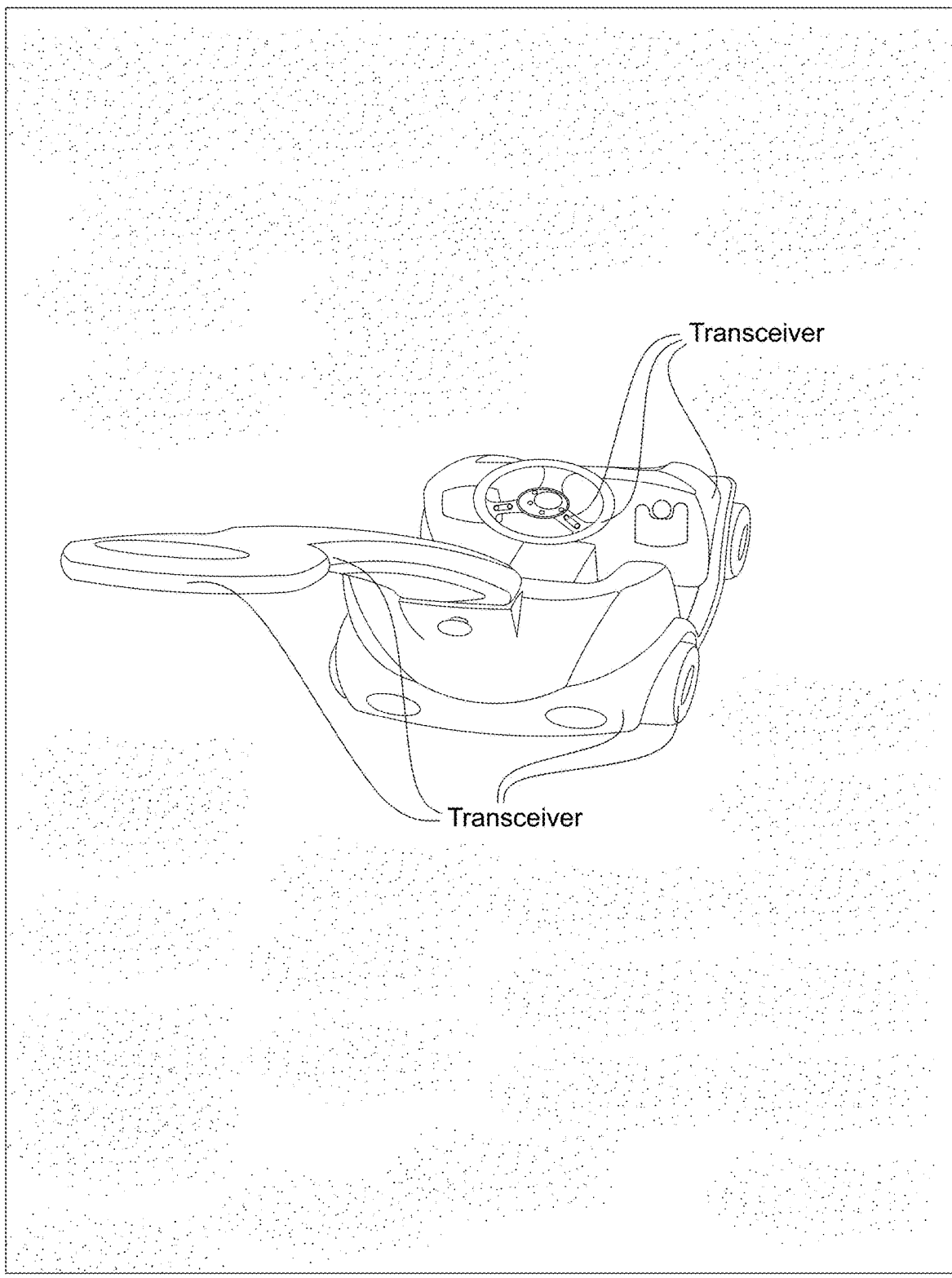
FIG. 28 shows a diagram of an embodiment of a toy vehicle according to this disclosure.

FIG. 28 shows a diagram of an embodiment of a toy vehicle according to this disclosure. In particular, a toy vehicle (e.g. a body and an elongated looped handle), inclusive of any component thereof, can operate as a control panel or a load device, as disclosed herein. The toy vehicle can include a sensor, as disclosed herein (e.g. battery, capacitor, or mains powered). The sensor can trigger any input or output action of an input device or an output device of the toy vehicle. The toy vehicle can include a controller, as disclosed herein, and a user interface, as disclosed herein, where the controller is electrically coupled to the user interface, as disclosed herein. The toy vehicle can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the toy vehicle can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the toy vehicle can be combined with all embodiments, devices, systems, features, or components thereof, as disclosed herein, and can be used to perform all methods, processes, algorithms, or sequences, as disclosed herein.

Figure 29:
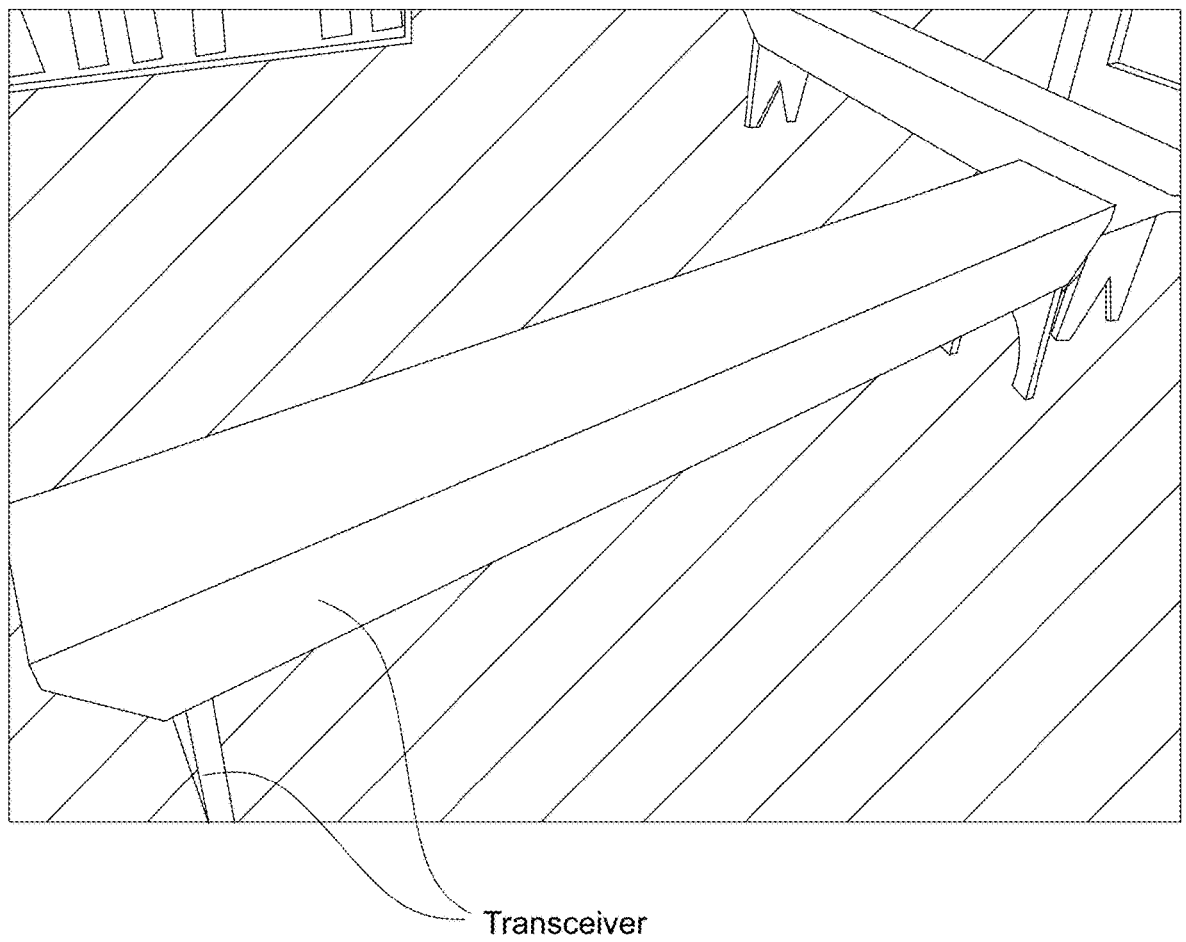
FIG. 29 shows a diagram of an embodiment of a bench according to this disclosure.

FIG. 29 shows a diagram of an embodiment of a bench according to this disclosure. In particular, a bench (e.g. platform, legs, or others) can be stationary (e.g. anchored, secured, mated, or fastened to a wall, floor, or ceiling) or mobile, which can be inclusive of wheels. The bench, inclusive of any component thereof, can operate as a control panel or a load device, as disclosed herein. The bench can include a sensor, as disclosed herein (e.g. battery, capacitor, or mains powered). The sensor can trigger any input or output action of an input device or an output device of the bench. The bench can include a controller, as disclosed herein, and a user interface, as disclosed herein, where the controller is electrically coupled to the user interface, as disclosed herein. The bench can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the bench can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the bench can be combined with all embodiments, devices, systems, features, or components thereof, as disclosed herein, and can be used to perform all methods, processes, algorithms, or sequences, as disclosed herein.

Figure 30:
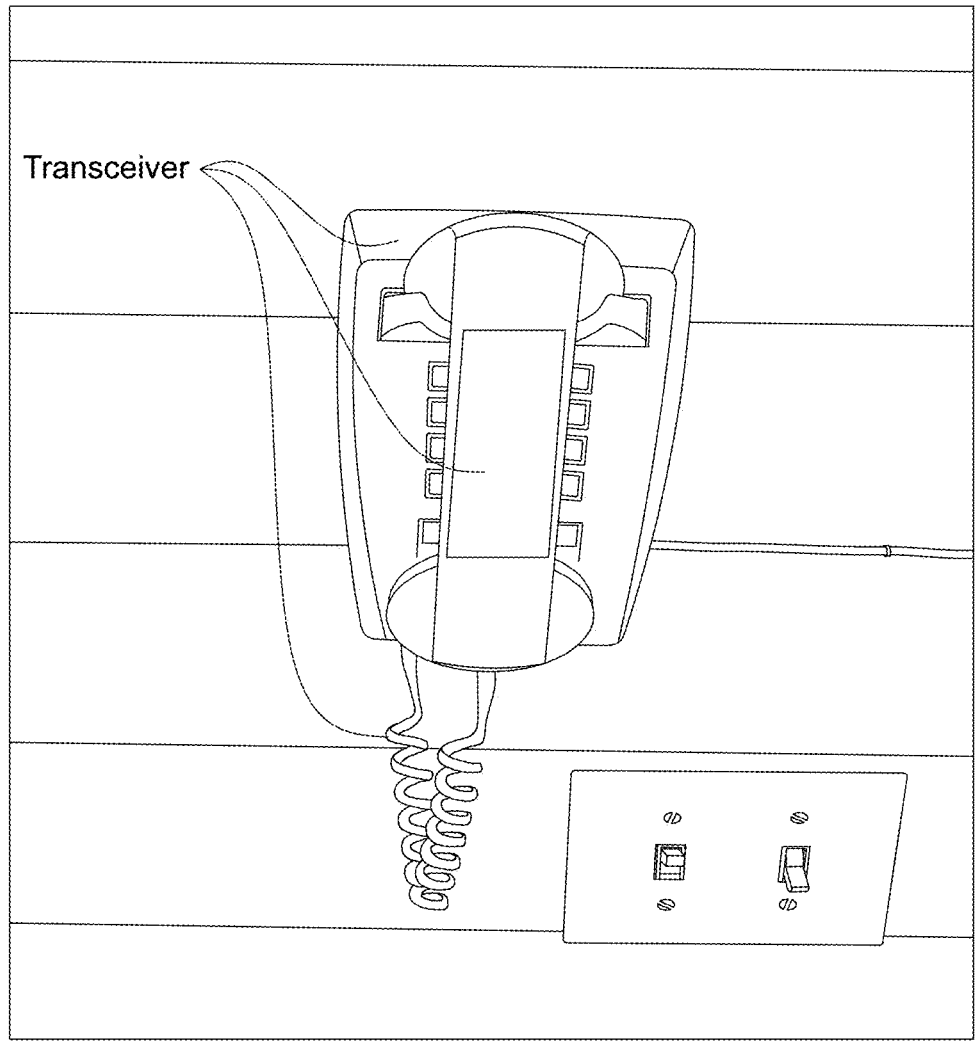
FIG. 30 shows a diagram of an embodiment of a stationary phone according to this disclosure.

FIG. 30 shows a diagram of an embodiment of a stationary phone according to this disclosure. In particular, a stationary phone (e.g. base, cord, headset, or others) is secured to a wall, as disclosed herein. The stationary phone is powered via a power source (e.g. battery, mains, or others). The stationary phone can communicate in a wired or wireless manner. The stationary phone, inclusive of any component thereof, can operate as a control panel or a load device, as disclosed herein. The stationary phone can include a sensor, as disclosed herein (e.g. battery, capacitor, or mains powered). The sensor can trigger any input or output action of an input device or an output device of the stationary phone. The stationary phone can include a controller, as disclosed herein, and a user interface, as disclosed herein, where the controller is electrically coupled to the user interface, as disclosed herein. The stationary phone can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the stationary phone can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the stationary phone can be combined with all embodiments, devices, features, systems, or components thereof, as disclosed herein, and can be used to perform all methods, processes, algorithms, or sequences, as disclosed herein.

Figure 31:
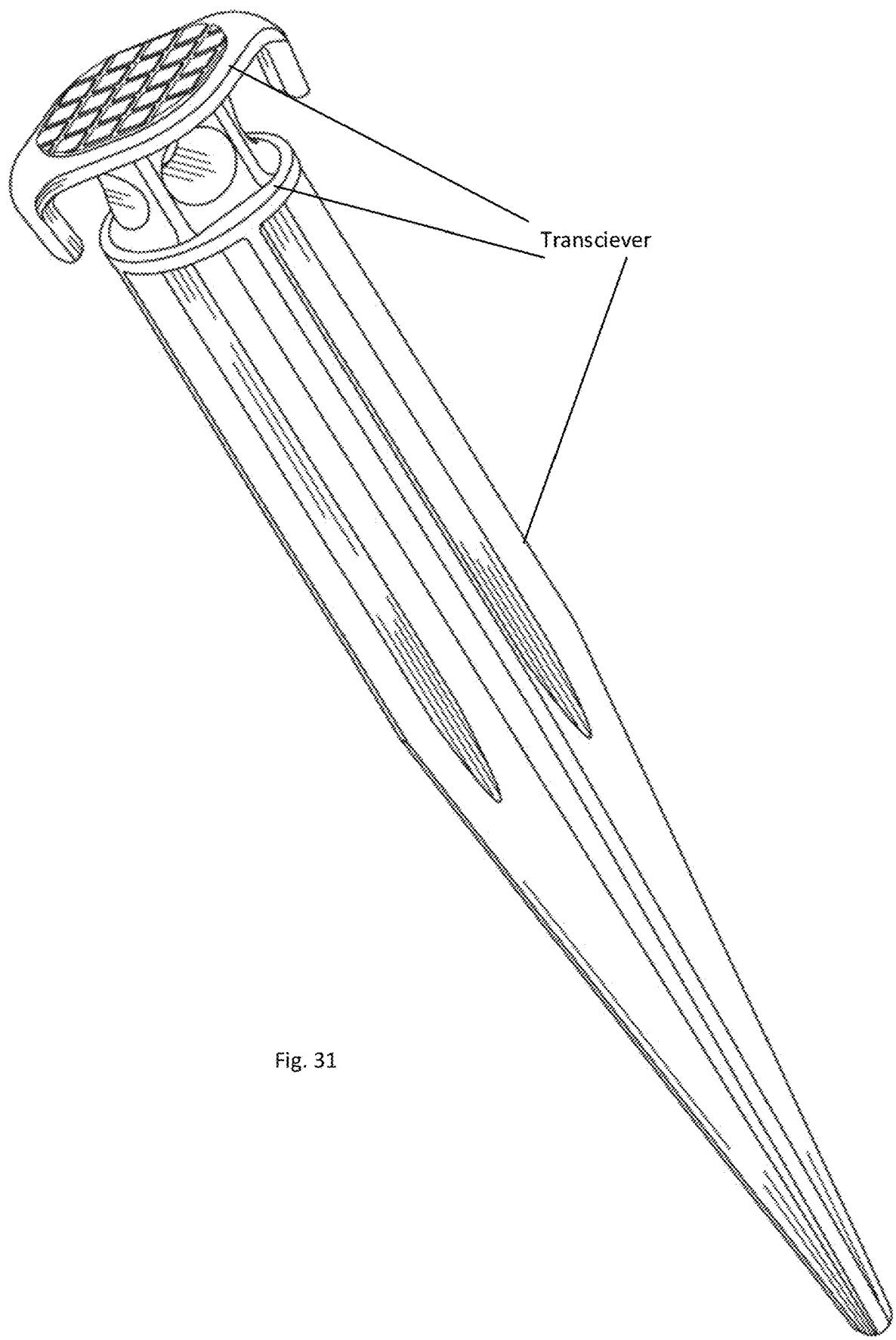
FIG. 31 shows a diagram of an embodiment of a ground stake according to this disclosure.

FIG. 31 shows a diagram of an embodiment of a ground stake according to this disclosure. In particular, a ground stake, inclusive of any component thereof, can operate as a control panel or a load device, as disclosed herein. The ground stake can be staked, moored, fastened, or anchored into a ground surface (e.g. soil, sod, mud, swamp, snow, sand, riverbed, sea floor, lake floor, ash, pebbles, coals, or others). The ground stake can include a portion (e.g. rectilinear or non-rectilinear or arcuate or sinusoidal or zigzag or symmetric or asymmetric or open-shaped or closed-shaped or rigid or flexible or elastic or resilient mast, column, beam, pillar, housing, cabinet, enclosure, case, encasing, box, frame, platform, chassis, or others) extending above or past the ground surface (e.g. less than about 1 foot, more than about 1 foot, 2 feet, 3 feet, 5 feet, 7 feet, 10 feet, 15 feet, 100 feet, or others) into air or water. For example, the ground stake can be embodied as a driveway light, pathway light, garden light, runway light, weather station, soil sensor, or others. The stake (e.g. any section thereof) or the portion (e.g. any section thereof) can include or be electrically coupled to a battery (e.g. lithium, nickel, cadmium, less than about 1 volt, about 2 volts, 4 volts, 12 volts, 14 volts, 16 volts, 18 volts, 24 volts, 48 volts, 50 volts, an automotive battery, a deep-cycle battery, a lead-acid battery, a valve-regulated battery, nickel metal hydride or lithium ion battery, a fuel cell, a flow battery, a rechargeable battery stationary energy storage, or others) and a photo-voltaic cell or panel charging the battery (e.g. via charge controller or others). The ground stake can include a sensor, as disclosed herein (e.g. battery, capacitor, or mains powered). The sensor can trigger any input or output action of an input device or an output device of the ground stake. The ground stake can include an output device (e.g. battery, capacitor, or mains powered), such as a night lamp (e.g. driveway, walkway, backyard, pool, runway, or others), a bug repellent spray or mist or heated or burning incense smoke or steam emitter (e.g. mosquitoes, flies, bees, hornets, yellow-jackets, wasps, or others), a speaker (e.g. ultrasonic, music, human inaudible, animal audible, or others), a camera (e.g. wide-angle, fish-eye, pan-tilt-zoom (PTZ), infrared, or others). The ground stake can include a controller, as disclosed herein, and a user interface, as disclosed herein, where the controller is electrically coupled to the user interface, as disclosed herein. The ground stake can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the ground stake can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the ground stake can be combined with all embodiments, devices, features, systems, or components thereof, as disclosed herein, and can be used to perform all methods, processes, algorithms, or sequences, as disclosed herein.

Figure 32A:
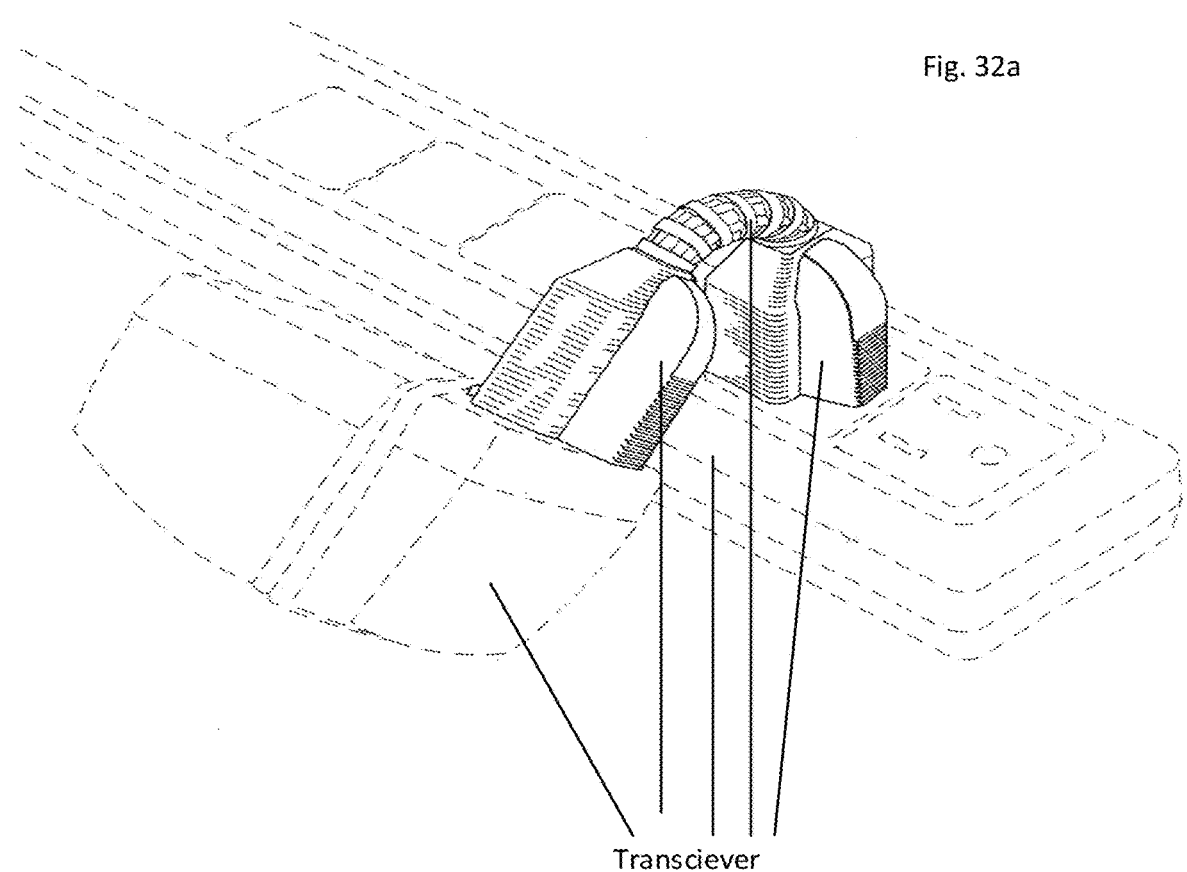
FIGS. 32a-32b show diagrams of various embodiments of extension cords according to this disclosure.
Figure 32B:
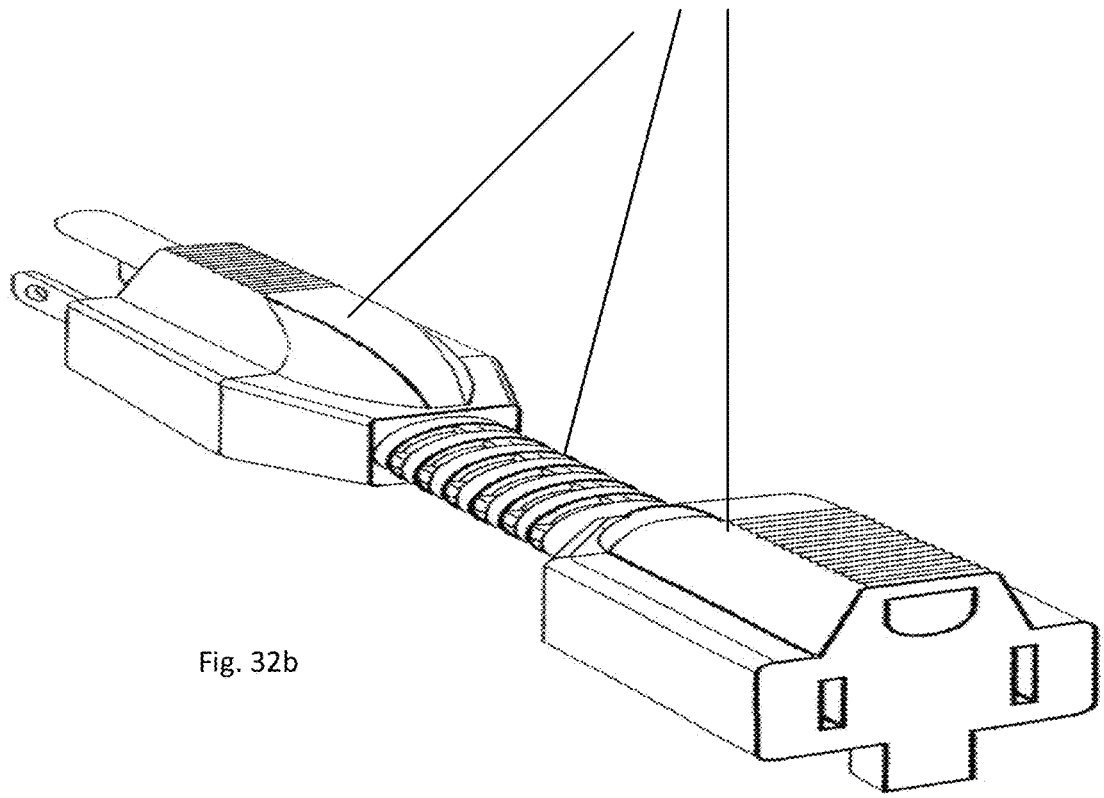

FIGS. 32a-32b show diagrams of various embodiments of extension cords according to this disclosure. In particular, each extension cord, inclusive of any component thereof, can operate as a control panel or a load device, as disclosed herein. Each extension cord, which can include a surge protector system, includes an electrical cable (e.g. about 0.3 foot, 0.5 foot, 0.75 foot, 1 foot, 3 feet, 5 feet, 10 feet, 15 feet, 20 feet, 30 feet, 50 feet, or others) with an electrical plug and a housing with an electrical socket. The electrical cable extends from the housing such that the electrical cable spans between the electrical plug and the housing. The housing can include a controller and a user interface, where the controller is electrically coupled to the user interface, as disclosed herein. The housing (or the electrical cable or the electrical plug) includes a sensor or a wireless transceiver (e.g. transmitter or receiver), as disclosed herein. The sensor can trigger any input or output action of an input device or an output device of the extension cord. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, each extension cord can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that each extension cord can be combined with all embodiments, devices, features, systems, or components thereof, as disclosed herein, and can be used to perform all methods, processes, algorithms, or sequences, as disclosed herein.

Figures 33A, 33B:
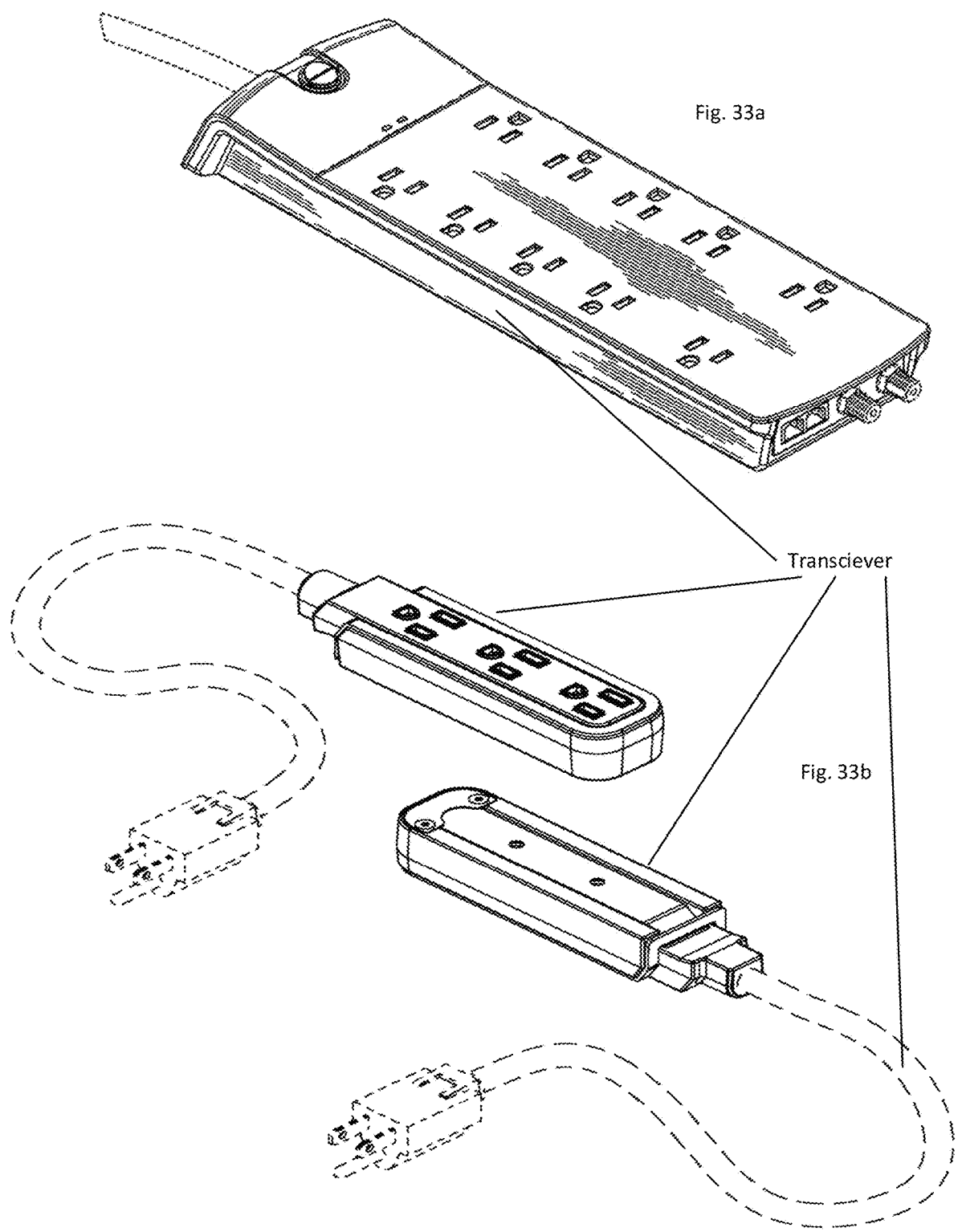
FIGS. 33a-33b show diagrams of various embodiments of power strips according to this disclosure.

FIGS. 33a-33b show diagrams of various embodiments of power strips according to this disclosure. In particular, each power strip, inclusive of any component thereof, can operate as a control panel or a load device, as disclosed herein. Each power strip, which can include a surge protector system or a battery backup system, includes an electrical cord (e.g. about 1 foot, 3 feet, 5 feet, 10 feet, 15 feet, 20 feet, 30 feet, 50 feet, or others) with an electrical plug and a housing with various electrical sockets (or coaxial cable connectors or modular connectors). The electrical cord extends from the housing such that the electrical cord spans between the electrical plug and the housing. The housing can include a controller and a user interface, where the controller is electrically coupled to the user interface, as disclosed herein. The housing (or the electrical cord or the electrical plug) includes a sensor or a wireless transceiver (e.g. transmitter or receiver), as disclosed herein. The sensor can trigger any input or output action of an input device or an output device of the power strip. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, each power strip can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or informational signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that each power strip can be combined with all embodiments, devices, features, systems, or components thereof, as disclosed herein, and can be used to perform all methods, processes, algorithms, or sequences, as disclosed herein.

Figure 34A:
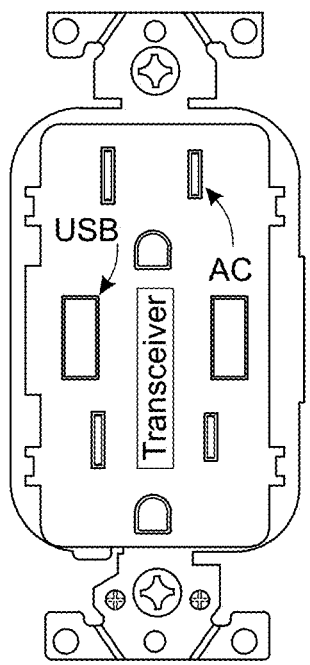
FIG. 34a-34d show diagrams of various embodiment of wall outlets according to this disclosure.
Figure 34B:
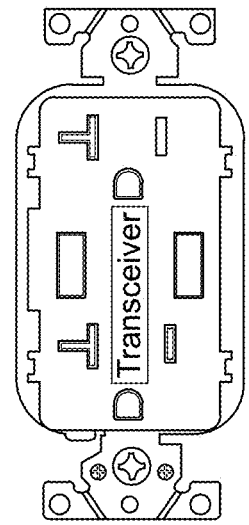
Figure 34C:
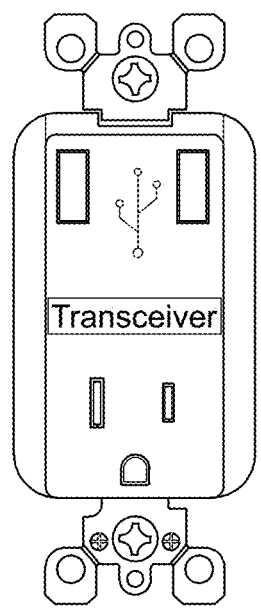
Figure 34D:
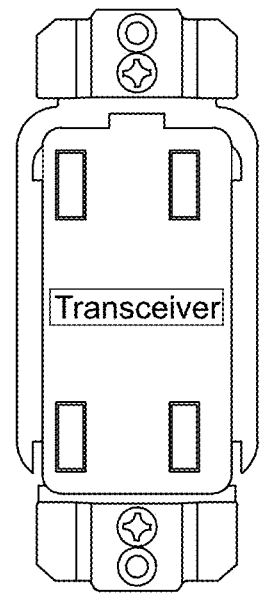

FIG. 34a-34d show diagrams of various embodiment of wall outlets according to this disclosure. In particular, each wall outlet, inclusive of any component thereof, can operate as a control panel or a load device, as disclosed herein. FIG. 34a shows a combination wall outlet with a pair of AC outlets and a pair of USB ports (e.g. USB v1, USB v2, USB v3, or others), although other data ports are possible (e.g. Lightning, micro-USB, Thunderbolt, PDMI, dock connector, or others). FIG. 34b shows a combination wall outlet for a 20 ampere electrical circuit. FIG. 34c shows a combination wall outlet with a single AC plug socket and a pair of USB ports. FIG. 34d shows a wall outlet with four USB ports. Note that an outlet with an AC plug socket and no USB ports is possible as well. Further note that an outlet can be configured for 110 volts or 220 volts or others.

When installed, each wall outlet, which can include a surge protector system or a light source system, includes a face plate (e.g. cover plate or others) and an electrical receptacle, either of which can include a controller and a user interface, where the controller is electrically coupled to the user interface, as disclosed herein. The face plate or the electrical receptacle can include the control panel or the load device, as disclosed herein. For example, the face plate or the electrical receptacle may include a light source (e.g. LED or halogen or incandescent bulb, blacklight bulb, LED strip) or a display (e.g. LCD, electrophoretic, touch-enabled, haptic) that can activate/deactivate, turn on/off, pulsate, flicker, adjust luminosity, output alphanumeric or pictorial content, change alphanumeric or pictorial content, or any other illumination or display property when wirelessly charging another device or being wirelessly charged relative to not wirelessly charging another device or not being wirelessly charged or vice versa.

Likewise, regardless of how embodied as disclosed herein, the control panel or the load device can communicate (e.g. wired, wireless, waveguide, radio, infrared, acoustic) with each other or with a smartphone, tablet, eyewear unit, laptop or another mobile device having a camera, a radio frequency identification (RFID) interrogator, an acoustic reader, or another reading device. As such, if (1) the control panel or the load device are wirelessly charging each other or another device or being charged by another device, and (2) the camera, the RFID interrogator, the acoustic read, or another reading device are oriented, pointed, focused, or otherwise directed at the control panel or the load device, then (3) the smartphone, tablet, eyewear unit, laptop or another mobile device can output an augmented reality content related to this charging. For example, the augmented reality content can inform a user that wireless changing is taking place, for how long, between which devices, how much wireless charging has been done so far, how much wireless charging is expected, wireless charging levels, wireless charging interference, suggestions on to increase or decrease speed of wireless charging, modality of wireless charging, wireless charging rate, battery levels, battery type, how much time remaining until battery is full, or others.

The face plate or the electrical receptacle can include a sensor or a wireless transceiver (e.g. transmitter or receiver), as disclosed herein. The sensor can trigger any input or output action of an input device or an output device of the face plate or the electrical receptacle. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the face plate or the electrical receptacle can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or informational signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the face plate or the electrical receptacle can be combined with all embodiments, devices, features, systems, or components thereof, as disclosed herein, and can be used to perform all methods, processes, algorithms, or sequences as disclosed herein.

Figure 35:
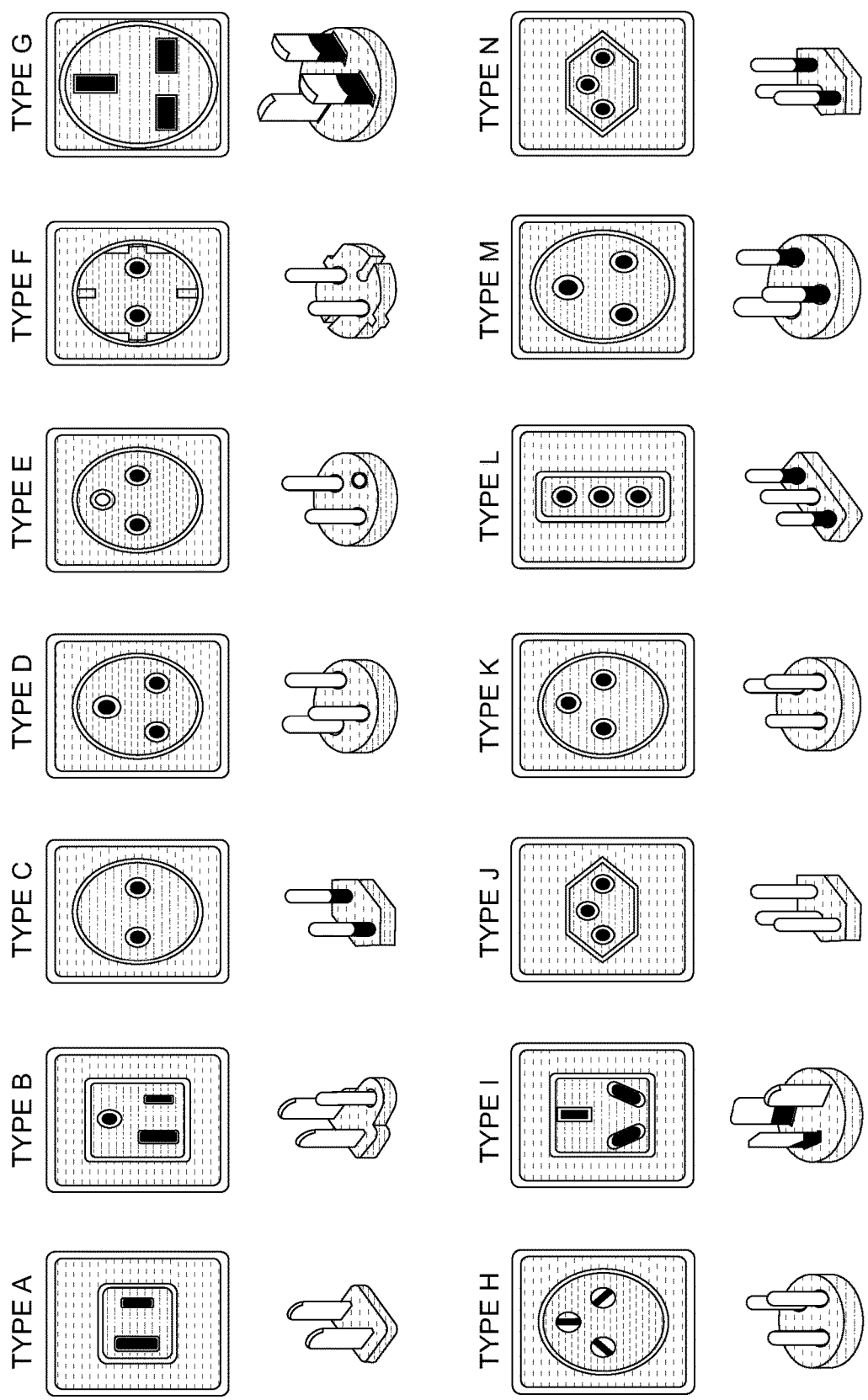
FIG. 35 shows a plurality of diagrams of a plurality of embodiments of AC power plugs and sockets that can be included in all embodiments of this disclosure according to this disclosure.

FIG. 35 shows a plurality of diagrams of a plurality of embodiments of AC power plugs and sockets that can be included in all embodiments of this disclosure according to this disclosure. In particular, all devices disclosed herein or all components thereof can host all plugs or sockets shown in FIG. 35.

Note that this disclosure can also relate to medicine inclusive of medical or biological research. In particular, a medical (inclusive of research) device, inclusive of any component thereof, can operate as a control panel or a load device, as disclosed herein. The medical device can include a housing, a case, an encasement, a casing, an enclosure, a frame, a member, a chassis, a platform, a cable, a rope, a chain, a fabric, or others and can be equipped with or host all devices disclosed herein, component of all devices disclosed herein, feature of all devices disclosed herein in all combinatory manner or can be configured to perform all methods disclosed herein, algorithm disclosed herein, technique disclosed herein, process disclosed herein in all combinatory manners.

The medical device can include a controller and a user interface, where the controller is electrically coupled to the user interface, as disclosed herein. The medical device includes a sensor or a wireless transceiver (e.g. transmitter or receiver), as disclosed herein. The sensor can trigger any input or output action of an input device or an output device of the medical device. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the medical device can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or informational signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the medical device can be combined with all embodiments, devices, systems, or components thereof as disclosed herein and can be used to perform all methods, processes, algorithms, or sequences, as disclosed herein.

The medical device can be configured to forecast, diagnose, monitor, or treat a medical condition, disorder, or disease of a human, an animal, a pet, a fish, or a bird, whether unborn, born, baby, infant, toddler, preschooler, kid, teen, adult, elderly, paralyzed, wheel-chair bound, or others. The medical device can include a mechanical device, an electro-mechanical, or a software-driven device, inclusive as a wearable, such as a bandage, a wristband, an armband, a headband, a diaper, a vest, a garment (of all types on all body parts e.g. head, neck, torso, hand, arm, foot, leg), a shoe (of all types), a skin patch (e.g. worn underneath clothing or exposed), an activity tracker, a hat, a skullcap, an eyewear frame, an artificial eyewear lens, or others. For example, the medical device can include a glucose level sensor, an insulin level sensor, an estrogen level sensor, a hormone level sensor, a cortisol sensor, a printed nanocircuit, a cholesterol level sensor, a peptide sensor, an oxytocin sensor, a parathyroid hormone or others. For example, the medical device can be configured for forecasting, diagnosis, prevention, monitoring, treatment, or alleviation of disease, condition, or disorder or for diagnosis, monitoring, treatment, alleviation, or compensation for an injury or handicap or for investigation, replacement, or modification of patient anatomy or of a physiological process. The medical device can be active or passive, whether implanted or semi-implanted or non-implanted, whether internally or externally. For example, the medical device as implanted can be manufactured to replace a missing biological structure, support a damaged biological structure, or enhance an existing biological structure. For example, the medical device can include a biomedical material, such as titanium, silicone, gold, carbon nanotube, shape memory material (e.g. alloy, polymer, nitinol), or others. For example, the medical device can include artificial pacemaker, cochlear implant, bioactive device (e.g. subcutaneous drug delivery devices in form of implantable pills, drug-eluting stents, or others). For example, when the medical device is implanted, then the medical device can include sensory implant for disorders affecting major senses or brain, as well as other neurological disorders, such as cataract, glaucoma, keratoconus, and other visual impairments; otosclerosis and other hearing loss issues, as well as middle ear diseases, such as otitis media or others; and neurological diseases, such as epilepsy, Parkinson's disease, treatment-resistant depression, or others. For example, when the medical device is implanted, then the medical device can include intraocular lens, intrastromal corneal ring segment, cochlear implant, tympanostomy tube, or others. For example, when the medical device is implanted, then the medical device can include cardiovascular medical devices implanted in cases where heart, its valves, or rest of circulatory system is in disorder. The cardiovascular devices can be used to treat conditions, such as heart failure, cardiac arrhythmia, ventricular tachycardia, valvular heart disease, angina pectoris, atherosclerosis, or others. The cardiovascular devices can include artificial heart, artificial heart valve, implantable cardioverter-defibrillator, cardiac pacemaker, coronary stent, or others. For example, when the medical device is implanted, then the medical device can include orthopedic implants to help alleviate issues with bones and joints of body. The orthopedic implants can be used to treat bone fractures, osteoarthritis, scoliosis, spinal stenosis, chronic pain, or others. The orthopedic implants can include pins, rods, screws, and plates used to anchor fractured bones while those heal. For example, when the medical device is implanted, then the medical device can include contraceptive implants to prevent unintended pregnancy or treat conditions, such as non-pathological forms of menorrhagia. The contraceptive implants can include copper or hormone-based intrauterine devices. For example, when the medical device is implanted, then the medical device can include cosmetic implants—often prosthetics—attempt to bring some portion of body back to an acceptable aesthetic norm. The cosmetic implants can be used as a follow-up to mastectomy due to breast cancer, for correcting some forms of disfigurement, and modifying aspects of the body (as in buttock augmentation, facial augmentation, or others). The cosmetic implants can include breast implant, nose prosthesis, ocular prosthesis, or others. For example, when the medical device is implanted, then the medical device can be used for other types of organ dysfunction can occur in body systems including the gastrointestinal, respiratory, or urological systems. For example, the medical device as implanted can be used in those and other locations to treat conditions, such as gastroesophageal reflux disease, gastroparesis, respiratory failure, sleep apnea, urinary and fecal incontinence, erectile dysfunction, or others. Some examples of medical devices include adhesion barrier, adjustable gastric band, aortic valve, argus retinal prosthesis, artificial facet replacement, artificial heart, artificial heart valve, artificial iris, artificial kidney, artificial lung, artificial organ, artificial cardiac pacemaker, artificial pancreas, artificial urinary bladder, auditory brainstem implant, stent, bioresorbable stent, Bjork-Shiley valve, brain implant, breast implant, catheter, syringe, hypodermic needle, cannula, bone implant, artificial bone, cerebral shunt, cervical pessary, cochlear implant, contraceptive implant, cortical implant, craniofacial prosthesis, dental implant, direct acoustic cochlear implant, drug-eluting stent, endobronchial valve, endoclip, esophageal stent, etonogestrel birth control implant, flow diverter, glaucoma valve, hippocampal prosthesis, implantable cardioverter-defibrillator, implantable loop recorder, inferior vena cava filter, insulin pump, infusion device, internalnet device, intraocular lens, intrathecal pump, kirschner wire, levonorgestrel-releasing implant, microchip implant, mynx vascular closure device, neuroprosthetics, ocular prosthesis, ossicular replacement prosthesis, palatal obturator, penile prosthesis, peritoneovenous shunt, pessary, sponge, port, portacaval shunt, propel mometasone furoate implant, punctal plug, retinal implant, root analogue dental implant, self-expandable metallic stent, shunt, sinus implant, sling, stent, stent-electrode recording array, lumbar anterior root stimulator, subcutaneous Implantable Defibrillator (S-ICD), subdermal implant, surgical mesh, transdermal implant, transjugular intrahepatic portosystemic shunt, tympanostomy tube, ureteric stent, vascular closure device, ventricular assist device, visual prosthesis, voice prosthesis, Wade-Dahl-Till valve, or others. For example, the medical device can include a dialysis machine, a saline machine, a blood transfusion machine, a heart pump, or others.

For example, the medical device can include a patch. The patch can be square, rectangular, circular, oval, triangular, wristband shaped, volumetric, helical, sinusoidal, arcuate, polygonal, or others. The patch can be kid friendly (e.g. cartoon characters), transparent, translucent, opaque, or others. The patch (e.g. liner, housing, reservoir, drug gel, drug fluid, drug coating, drug powder, drug composition, adhesive, membrane, backing permeation enhancer, matrix filler, circuitry, pump, actuator, motor, needle, processor, memory, sensor, transmitter, receiver, input device, output device as disclosed herein) can include a dermal or skin patch (e.g. deliver medication into skin), a transdermal patch (e.g. deliver medication through skin into bloodstream), a nicotine patch, an insulin injection patch, a glucose monitoring patch, or others. The patch can be adhered (or otherwise coupled) to a patient (e.g. human, animal) at head (e.g. cheeks, nose, forehead, chin, ears, behind ears, eyelids, temples), neck (e.g. front, side, back), torso (e.g. chest, stomach area, back), right or left arm (e.g. upper arm, elbow, lower arm), right or left hand (e.g. palm, back, fingers), right or left leg (e.g. upper leg, knee, lower leg), right or left foot (e.g. toes, ankle, upper foot, sole), tail, horn, or other body parts. The patch (or any layer or component thereof) can include a fabric, a plastic, a metal, a shape memory material, leather, rubber, silicon, paper, interweaved circuitry (e.g. processor, memory, transmitter, receiver, sensor, input device, output device all as disclosed herein), a fabric with interweaved circuitry, a medicinal coating, or others. For example, the patch can include a bandage, a flector (diclofenac epolamine) patch (e.g. nonsteroidal anti-inflammatory drug (NSAID) topical patch for treatment of acute pain due to minor strains, sprains, contusions, for treatment of pain and inflammation for chronic conditions benefiting from NSAIDs, including fibromyalgia and arthritis), lidocaine patch (e.g. for treatment of peripheral pain of shingles (herpes zoster), for treatment of pain from acute injuries and chronic pain), a scopolamine patch (e.g. for treatment of motion sickness), an opiod patch, a hormonal patch, a nitroglycerin patch, a clonidine patch, an emsam patch, a vitamin patch, an analgesic patch, an insulin injection patch, a glucose monitoring patch (e.g. needleless, reservoir collection based), or others. For example, the patch can include a noninvasive adhesive patch that draws glucose out from fluid between cells across hair follicles that are individually accessed through an array of miniature sensors using an electric current (as enabled by on-board battery wirelessly recharged as disclosed herein). The patch can include a single layer or multilayer drug-in-adhesive. The patch can have a reservoir and a sensor, as disclosed herein, monitoring the reservoir (or any fluid therein). For example, the patch can include a FreeStyleLibre patch type. For example, the medical device, whether the control panel or the load device, can be swallowed (e.g. tablet, capsule, caplet, pill), which can be tracked, guided, interrogated, interfaced, or recharged. Note that although the patch is disclosed for a medical use, the patch can also be a non-medical patch, such as a wall patch, a clothing patch, a sensor patch, or others.

For example, some medical conditions, disorders, or diseases can include arthritis, hypo and hypertension, asthma, cancer (e.g. lung, bronchus, prostate, colon, rectum, breast, liver, pancreas, gallbladder, bladder, endometrial, kidney, leukemia, melanoma, non-hodgkin lymphoma, thyroid, or others), diabetes (e.g. type 1 and type 2), bronchitis, coronary heart disease, dementia, Parkinson's disease, Alzheimer's disease, epilepsy, multiple sclerosis, osteoporosis, stroke, heart attack, chronic kidney disease, deep vein thrombosis, shingles, acne, anxiety, sleep apnea, atherosclerosis, nephritis, nephrotic syndrome, skin burn, nephrosis, gallstones, jaundice, cirrhosis, dyspepsia, gastric ulcer, infectious disease (e.g. flu or others), scoliosis, spondylosis, spinal stenosis, bone fracture, ischemic heart disease, or others.

Figure 36A:
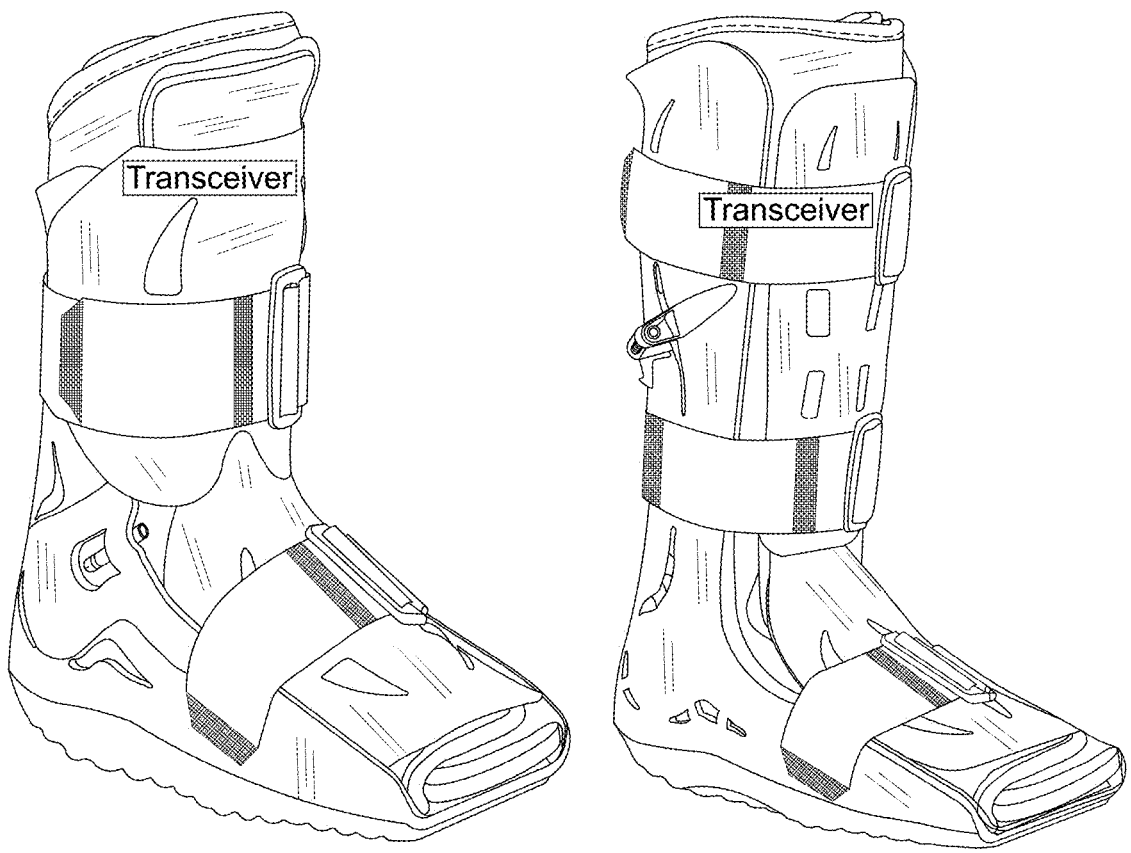
FIGS. 36a-36c show a plurality of diagrams of a plurality of embodiments of a plurality of orthopedic boots, shoes, or casts according to this disclosure.
Figure 36B:
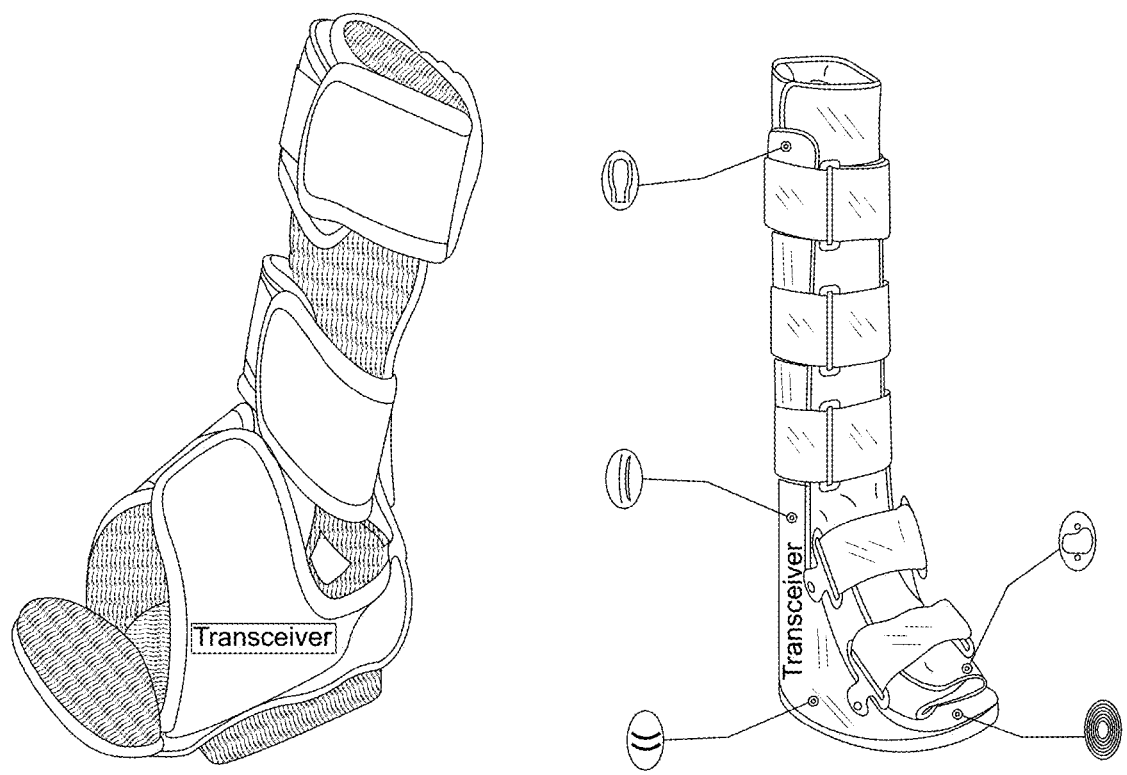
Figure 36C:
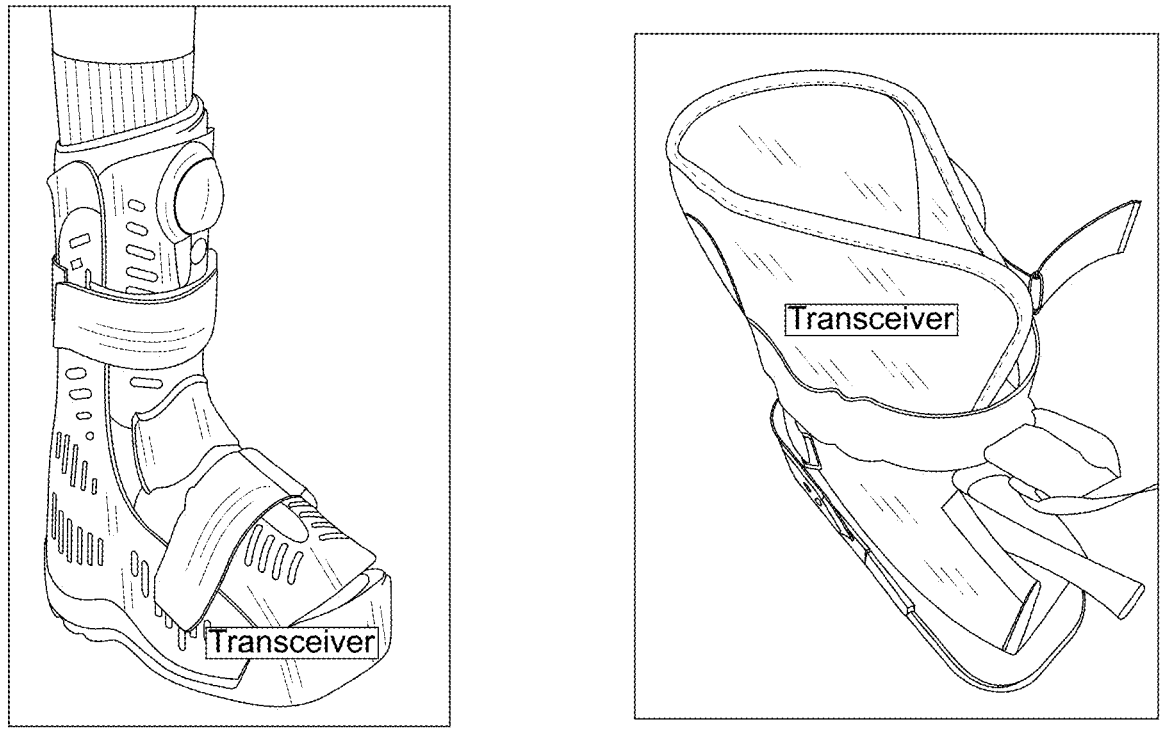

FIGS. 36a-c show a plurality of diagrams of a plurality of embodiments of a plurality of orthopedic boots, shoes, or casts according to this disclosure. In particular, an orthopedic boot, shoe, or cast can include plastic, metal, wood, leather, rubber, silicon, shape memory material, fabric, gypsum, buttons, snaps, strings, hook-and-loop straps, belts, buckles, or others. The orthopedic boot, shoe, or cast, inclusive of any component thereof, can operate as a control panel or a load device, as disclosed herein. The orthopedic boot, shoe, or cast can host (e.g. internal or external to main body, straps, buckles, sole, sleeve, base) a battery (e.g.

button cell, cylindrical, flat, cuboid, cube, spherical, conical, pyramidal), which can be non-rechargeable or rechargeable. The orthopedic boot, shoe, or cast can externally host a photovoltaic cell, which can be electrically coupled to the battery (e.g. via inverter) to charge the battery. The orthopedic boot, shoe, or cast can include a sensor, as disclosed herein. The sensor can trigger any input or output action of an input device or an output device of the orthopedic boot, shoe, or cast. The orthopedic boot, shoe, or cast can include a controller, as disclosed herein, and a user interface, as disclosed herein, where the controller is electrically coupled to the user interface, as disclosed herein. The orthopedic boot, shoe, or cast can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the orthopedic boot, shoe, or cast can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the orthopedic boot, shoe, or cast can be combined with all embodiments, devices, systems, features, or components thereof, as disclosed herein, and can be used to perform all methods, processes, algorithms, or sequences, as disclosed herein. Note that the orthopedic boot, shoe, or cast is illustrative and other orthopedic devices can be used, whether additionally or alternatively. For example, some of such orthopedic devices can include a splint (e.g. ankle stirrups, finger splints, nasal splint, posterior lower leg splints, posterior full leg splints, posterior elbow splints, sugar tongs, thumb spicas, ulnar gutters, volar wrist splints, wrist/arm splints, vacuum splints, traction splints, structural aluminum malleable splints), a cervical collar (e.g. hard, soft), a kendrick extrication device, a spinal board, an orthotic or diabetic shoe insert (e.g. with temperature, pressure, or heat based shape changing material), a forearm or axillary crutch (e.g. cuff, handgrip, post, tip, shoulder rest, handgrip, central strut), a wheelchair (e.g. seat, frame, hand rest, front wheels, back wheels, push handles), a diabetic shoe, an orthotic shoe with a shape shifting sole (e.g. motor-based, actuator-based, gas/air/liquid inflation pump-based, heating element-based, pneumatic valve-based) or others, whether implanted or non-implanted.

Figure 37:
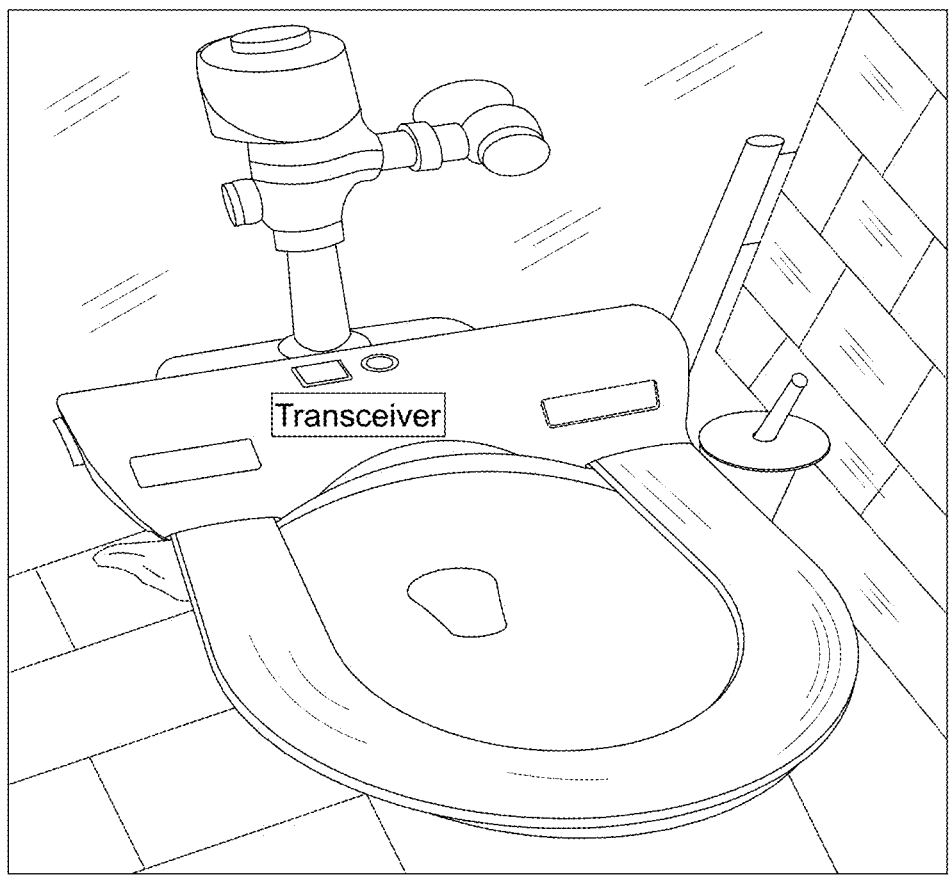
FIG. 37 shows an embodiment of a toilet having a seat with a cover dispenser according to this disclosure.

FIG. 37 shows an embodiment of a toilet having a seat with a cover dispenser according to this disclosure. In particular, a toilet (e.g. single flush, dual flush) having a seat (e.g. U-shape, C-shape, O-shape, D-shape) with a cover dispenser (e.g. Brill toilet seat cover dispenser type) enables a user to have a more sanitary toilet. The cover dispenser includes a roll of a clean cover web (e.g. paper web, plastic web, fabric web, elastic web, leather web), a roll of a dirty cover web (e.g. paper web, plastic web, fabric web, elastic web, leather web), a processor (e.g. single core, multicore, PLC, circuit board, chip), an electric motor (e.g. brushed, brushless), a blade (e.g. flat, serrated), a sensor (e.g. motion, proximity, image, acoustic), a battery (e.g. button cell, cylindrical, flat cuboid, cube, spherical, conical, pyramidal), an informational wireless transceiver (e.g. receiver or transmitter), and a wireless power transceiver (e.g. receiver or transmitter). The clean cover web or the dirty cover web can flatly rest on the seat, be U-shaped over the seat, C-shaped over the seat, D-shaped over the seat, O-shaped over the seat, or others. The processor is coupled (e.g. wired, wireless) to the electric motor, the sensor, the informational wireless transceiver, and the wireless power transceiver, at least some, many, most, or all of these components are powered via the battery. The roll of the clean cover web is coupled to the roll of the dirty cover web (e.g. same web). The battery can be rechargeable or non-rechargeable. When requested by the processor based on the sensor, the electric motor engages the roll of the dirty cover web and removes (e.g. pulls) the dirty cover web from the seat and introduces the clean cover web to the seat. The blade can cut the dirty cover web (e.g. to prevent reuse) before rolling the dirty cover web onto the roll of the dirty cover web. The electric motor engages the roll of the dirty cover web when a user is sensed via the sensor or when the user activates an input device coupled to the processor. For example, the user can wave a hand in front of a wall-mounted, hands-free sensor (e.g. motion sensor, proximity sensor, image sensor, acoustic sensor). For example, the user can press or depress a button or icon (e.g. physical, virtual).

The toilet, the seat, the cover dispenser, or a web of material (e.g. clean, dirty), inclusive of any component thereof, can operate as a control panel or a load device, as disclosed herein. The toilet, the seat, the cover dispenser, or the web of material can include a sensor, as disclosed herein (e.g. battery, capacitor, or mains powered). The sensor can trigger any input or output action of an input device or an output device of the toilet, the seat, the cover dispenser, or the web of material. The toilet, the seat, the cover dispenser, or the web of material can include a controller, as disclosed herein, and a user interface, as disclosed herein, where the controller is electrically coupled to the user interface, as disclosed herein. The toilet, the seat, the cover dispenser, or the web of material can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the toilet, the seat, the cover dispenser, or the web of material can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the toilet, the seat, the cover dispenser, or the web of material can be combined with all embodiments, devices, systems, features, or components thereof, as disclosed herein, and can be used to perform all methods, processes, algorithms, or sequences, as disclosed herein.

Figure 38:
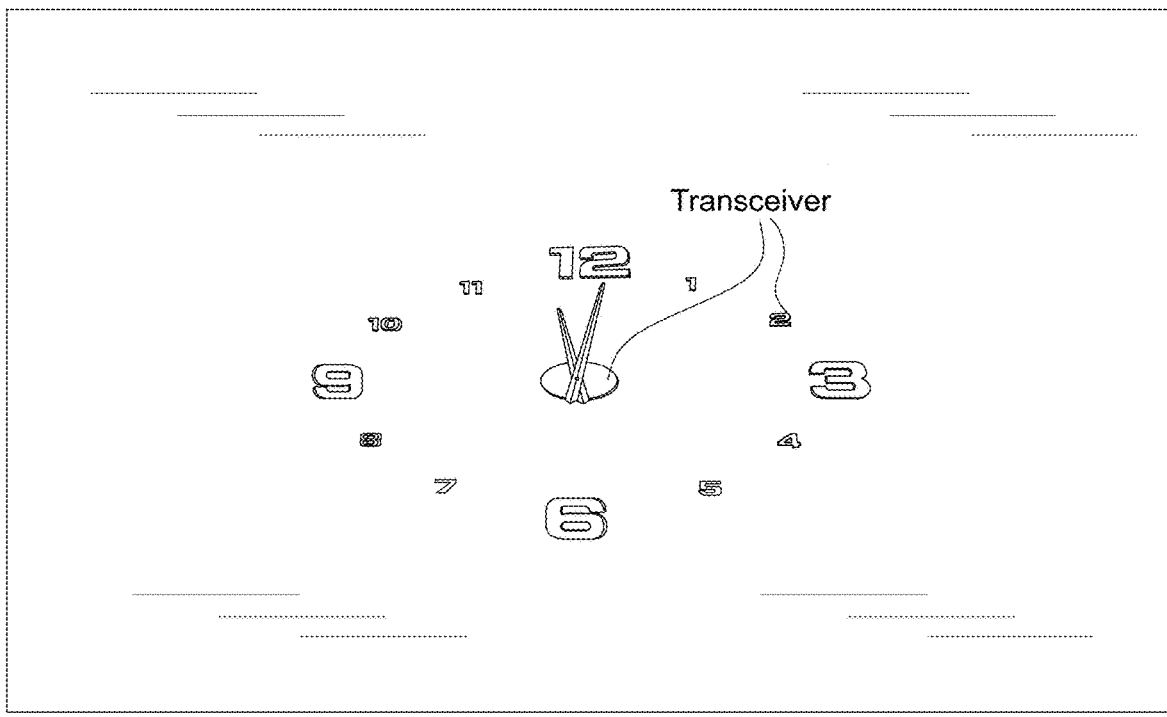
FIG. 38 shows a diagram of an embodiment of a clock arranged on a wall (or floor or ceiling) according to this disclosure.

FIG. 38 shows a diagram of an embodiment of a clock arranged on a wall (or floor or ceiling) according to this disclosure. In particular, the clock includes a central housing coupled (e.g. anchored, secured, mated, fastened, adhered, bolted, hook-and-looped, magnetized, suction cupped, bonded, bracketed) to a wall (or floor or ceiling). The central housing includes a plurality of hands (e.g. hour, minute, or second). The clock includes a clockface defined via a plurality of dial symbols coupled (e.g. anchored, secured, mated, fastened, adhered, bolted, hook-and-looped, magnetized, suction cupped, bonded, bracketed) to the wall (or floor or ceiling) about the central housing. The central housing can house various internal components (e.g. gears, weights, pendulum, springs). The central housing, the hands, or the dial symbols can exhibit photoluminescence. The central housing, the hands, or the dial symbols can include an alarm function.

The central housing, the hands, or the dial symbols can be powered via a power source (e.g. mains powerline, battery, accumulator). The battery can be or avoid being button cell, cylindrical, flat cuboid, cube, spherical, conical, or pyramidal. The central housing, the hands, or the dial symbols can include a photovoltaic cell coupled to the battery (e.g. inverter) to charge the battery. The central housing, the hands, or the dial symbols, inclusive of any component thereof, can operate as a control panel or a load device, as disclosed herein. The central housing, the hands, or the dial symbols can include a sensor, as disclosed herein (e.g. battery, capacitor, or mains powered). The sensor can trigger any input or output action of an input device or an output device of the clock. The central housing, the hands, or the dial symbols a controller, as disclosed herein, and a user interface, as disclosed herein, where the controller is electrically coupled to the user interface, as disclosed herein. The clock can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the clock can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the clock can be combined with all embodiments, devices, systems, features, or components thereof, as disclosed herein, and can be used to perform all methods, processes, algorithms, or sequences, as disclosed herein.

Figure 39:
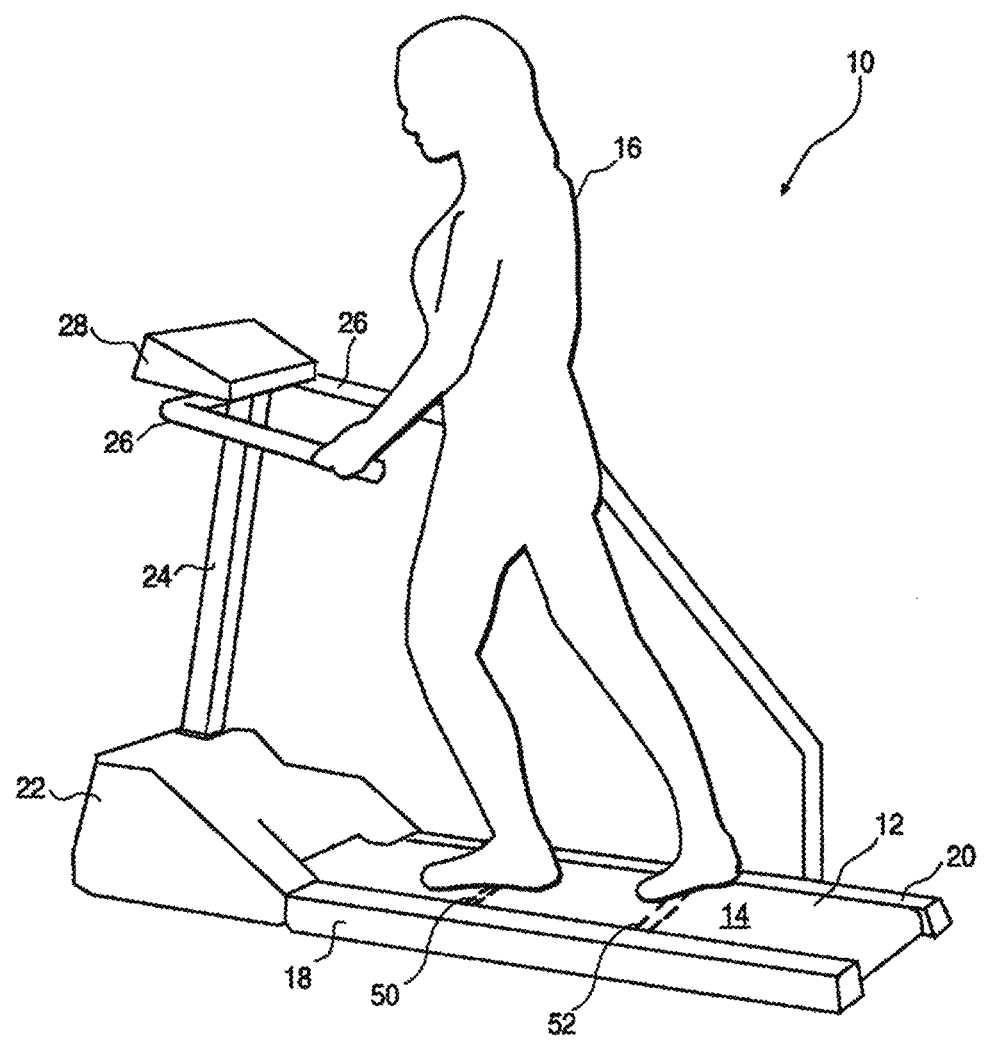
FIG. 39 shows a diagram of an embodiment of a treadmill for measuring a posture of a foot according to this disclosure.

FIG. 39 shows a diagram of an embodiment of a treadmill for measuring a posture of a foot according to this disclosure. In particular, a treadmill 10 includes an endless belt 12 having an upper run 14 which provides a support surface upon which a user 16 may stride upon (e.g. walk, jog, run). The belt 12 is supported by a frame which includes a left-side member 18, a right-side member 20, a pair of opposing L-shaped handles 26, and a front housing 22 for rotational movement therebetween. Attached to the front housing 22 is an upright post 24 for supporting a plurality of handrails 26 and a console 28. The belt 12 (or a portion of the frame below the belt 12) can include a plurality of sensors 50, 52, as disclosed herein. For example, the sensors 50, 52 can include pressure sensors, load cells, accelerometers, gyroscopes, acoustic sensors, or others. The sensors 50, 52 can sense a posture of a foot of the user 16, as the user 16 is striding on the belt 12, when the belt 12 is moving (e.g. powered). For example, the posture can include various size or pressure points (e.g. toes, arch, heel, sole) or lack thereof of the foot relative to the belt 12 (or a portion of the frame below the belt 12), as sensed via the sensors 50, 52. For example, the user 16 can stride the belt 12 less than about 5, 4, 3, 2, or 1 minute inclusively and inclusive of all time periods therebetween. For example, the belt 12 can be kept at constant speed, accelerated, or decelerated, whether as controlled by the user 16, a service provider (e.g. podiatrist, nurse) or on-the-fly (e.g. heuristics based on user parameters, machine learning based on user parameters) in order to see how the posture changes based on striding speed. For example, the belt 12 can be kept at constant level, inclined, or declined, whether as controlled by the user 16, a service provider (e.g. podiatrist, nurse) or on-the-fly (e.g. heuristics based on user parameters, machine learning based on user parameters) in order to see how the posture changes based on striding surface angling. At least one of the handles 26 may include a bio sensor (e.g. heartrate, pressure, pulse), which can sense a bio parameter of the user 16, while the user 16 is striding on the belt 12. The bio parameter may be used to supplement the sensed data from the sensors 50, 52, inclusive of striding speed and surface angling modalities.

The sensors 50, 52 (inclusive of the bio sensor) can share, avail, send, or upload (e.g. wired, wireless) this sensed data to the console 28 for availing, sharing, sending, or uploading (e.g. wired, wireless) to a computing unit (e.g. laptop, desktop, terminal, kiosk, workstation, tablet, smartphone, wearable), whether local or remote to the treadmill 10. The computing unit converts this sensed data into a visual representation (e.g. diagram, graph, icons, avatar, two dimensional, three dimensional, volumetric) that enables a medical service provider (e.g. podiatrist, nurse) to visualize the posture of the foot of the user 16. The sensed data or the visual representation can be used to generate a set of data based on which a custom orthotic or diabetic shoe insert (e.g. arch supports, insoles, heel liners, foot cushions) or custom orthotic shoe or diabetic shoe can be formed (e.g. additively manufactured, subtractively manufactured, CNC manufactured, plaster casted, foam boxed, molded, 3D printed) for the user 16. The custom orthotic or diabetic shoe insert or custom orthotic shoe or diabetic shoe can be used to treat flatfoot, cavus foot, high or low arches, second metatarsalgia, metatarsalgia, arthritis, pain relief, ulcers, calluses, toe walking, foot and gait abnormalities resulting from diabetes or another medical condition failed surgery or injury, foot deformities resulting from failed surgery or a medical condition or injury, or other foot or ankle or physiological conditions. Since the posture of the foot of the user 16 is sensed, while the user 16 is continuously striding on the belt 12, which is continuous, the sensed data is more accurate and faster to obtain than having the user 16 walk back and forth across a still mat having the sensors 50, 52.

The treadmill 10 (or any component thereof) can be stationary (e.g. anchored, secured, mated, or fastened to a wall, floor, or ceiling) or mobile, which can be inclusive of wheels. The treadmill 10, inclusive of any component thereof, can operate as a control panel or a load device, as disclosed herein. The treadmill 10 can be or avoid being mains powered or battery (e.g. button cell, cylindrical, flat cuboid, cube, spherical, conical, pyramidal) powered. The treadmill 10 (or any component thereof) can include a sensor, as disclosed herein (e.g. battery, capacitor, or mains powered). The sensor can trigger any input or output action of an input device or an output device of the treadmill 10 (or any component thereof). The treadmill 10 (or any component thereof) can include a controller, as disclosed herein, and a user interface, as disclosed herein, where the controller is electrically coupled to the user interface, as disclosed herein. The treadmill 10 (or any component thereof) can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the treadmill 10 (or any component thereof) can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the treadmill 10 (or any component thereof) can be combined with all embodiments, devices, systems, features, or components thereof, as disclosed herein, and can be used to perform all methods, processes, algorithms, or sequences, as disclosed herein.

Figure 40:
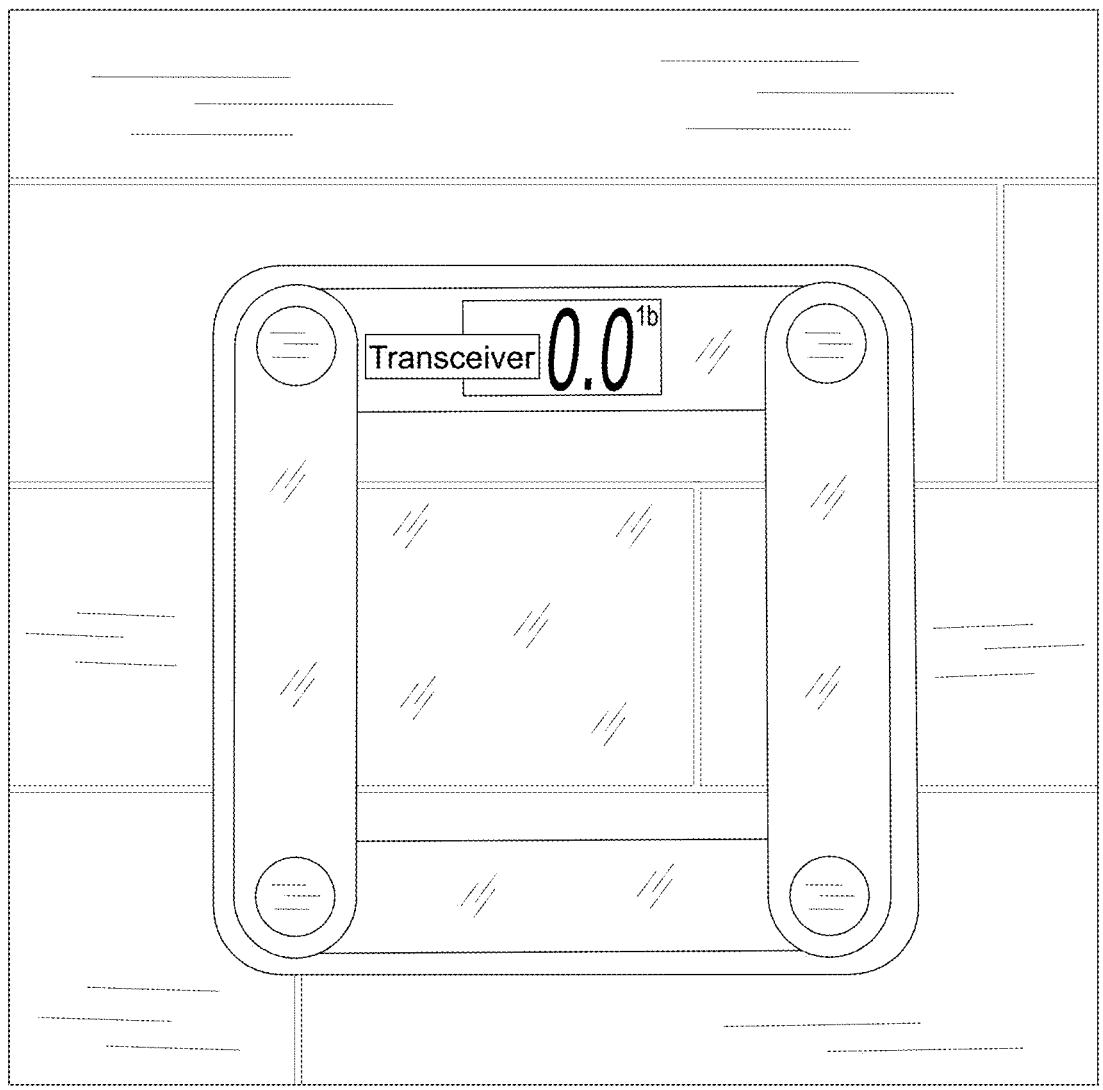
FIG. 40 shows a diagram of a weighing scale according to this disclosure.

FIG. 40 shows a diagram of a weighing scale according to this disclosure. In particular, a weighing scale (e.g. platform, legs) can be stationary (e.g. anchored, secured, mated, or fastened to a wall, floor, or ceiling) or mobile, which can be inclusive of wheels. The weighing scale include a battery, which be rechargeable or non-rechargeable. The battery can be or avoid being button cell, cylindrical, flat cuboid, cube, spherical, conical, or pyramidal. The weighing scale, inclusive of any component thereof, can operate as a control panel or a load device, as disclosed herein. The weighing scale can include a sensor, as disclosed herein (e.g. battery, capacitor, or mains powered). The sensor can trigger any input or output action of an input device or an output device of the weighing scale. The weighing scale can include a controller, as disclosed herein, and a user interface, as disclosed herein, where the controller is electrically coupled to the user interface, as disclosed herein. The weighing scale can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the weighing scale can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the weighing scale can be combined with all embodiments, devices, systems, features, or components thereof, as disclosed herein, and can be used to perform all methods, processes, algorithms, or sequences, as disclosed herein.

Figure 41A:
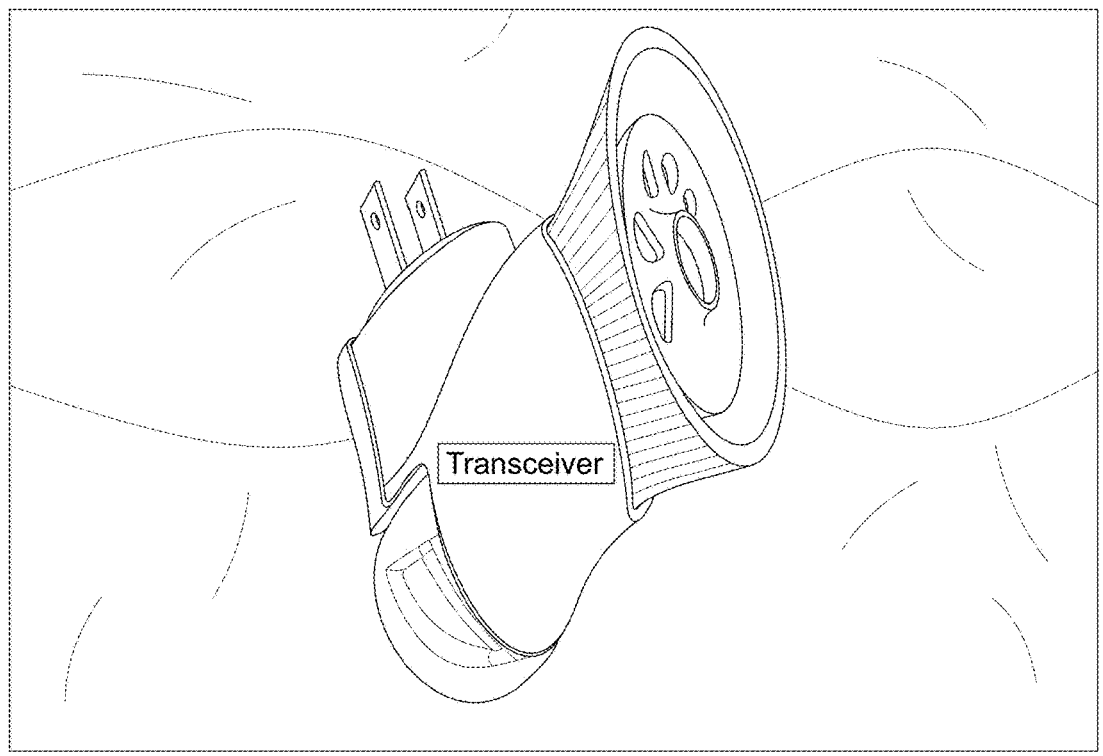
FIGS. 41a and 41b show a diagram of an embodiment of an air freshener according to this disclosure.
Figure 41B:
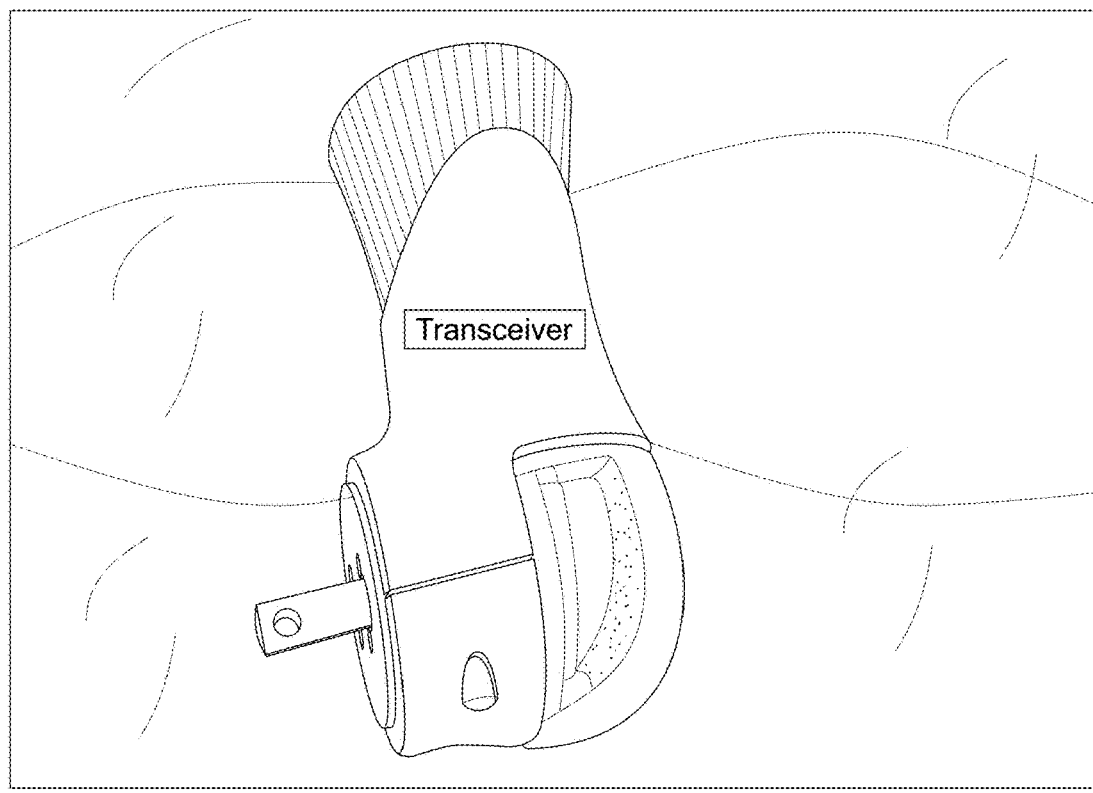

FIGS. 41a and 41b show a diagram of an embodiment of an air freshener according to this disclosure. In particular, an air freshener (e.g. Airwick type, Glade type, heating element based) with a removable or single use cartridge (e.g. scented oil) can be plugged into a wall outlet. The air freshener, inclusive of any component thereof, can operate as a control panel or a load device, as disclosed herein. The air freshener can include a sensor, as disclosed herein (e.g. battery, capacitor, or mains powered). The sensor can trigger any input or output action of an input device or an output device of the air freshener. The air freshener can include a controller, as disclosed herein, and a user interface, as disclosed herein, where the controller is electrically coupled to the user interface, as disclosed herein. The air freshener can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the air freshener can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the air freshener can be combined with all embodiments, devices, systems, features, or components thereof, as disclosed herein, and can be used to perform all methods, processes, algorithms, or sequences, as disclosed herein.

Figure 42A:
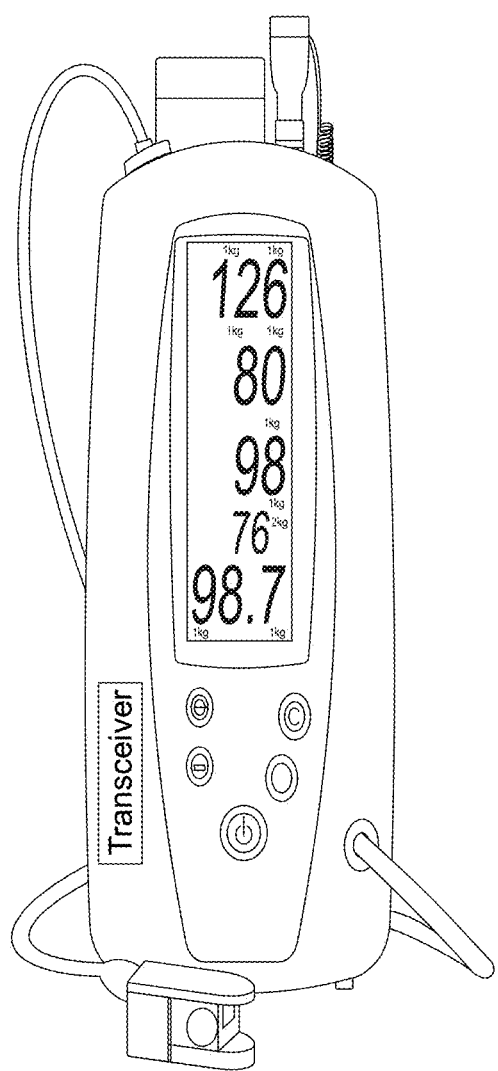
FIGS. 42a and 42b show a diagram of an embodiment of a vital signs device and a stand according to this disclosure.
Figure 42B:
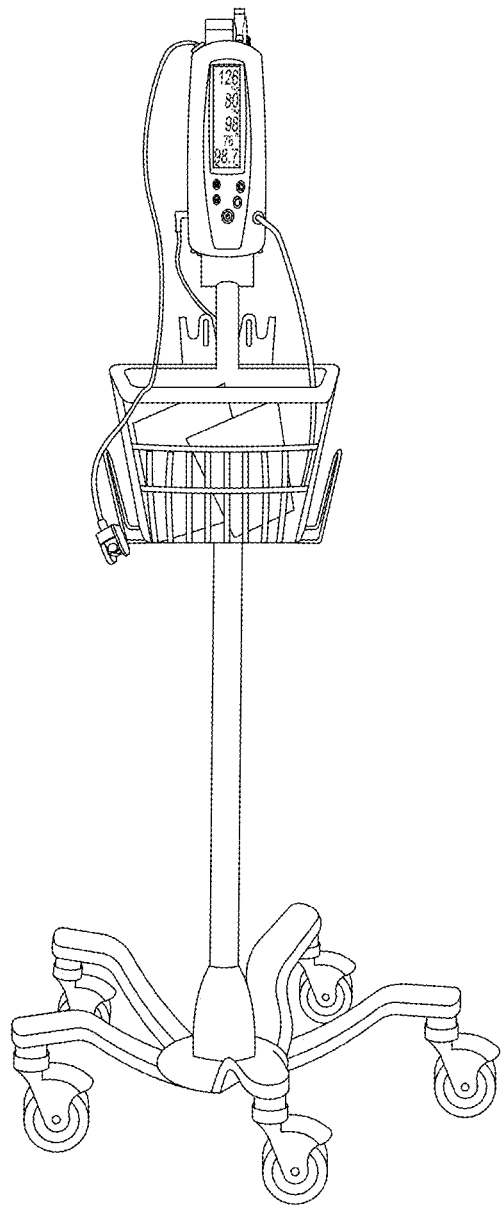
Figure 43A:
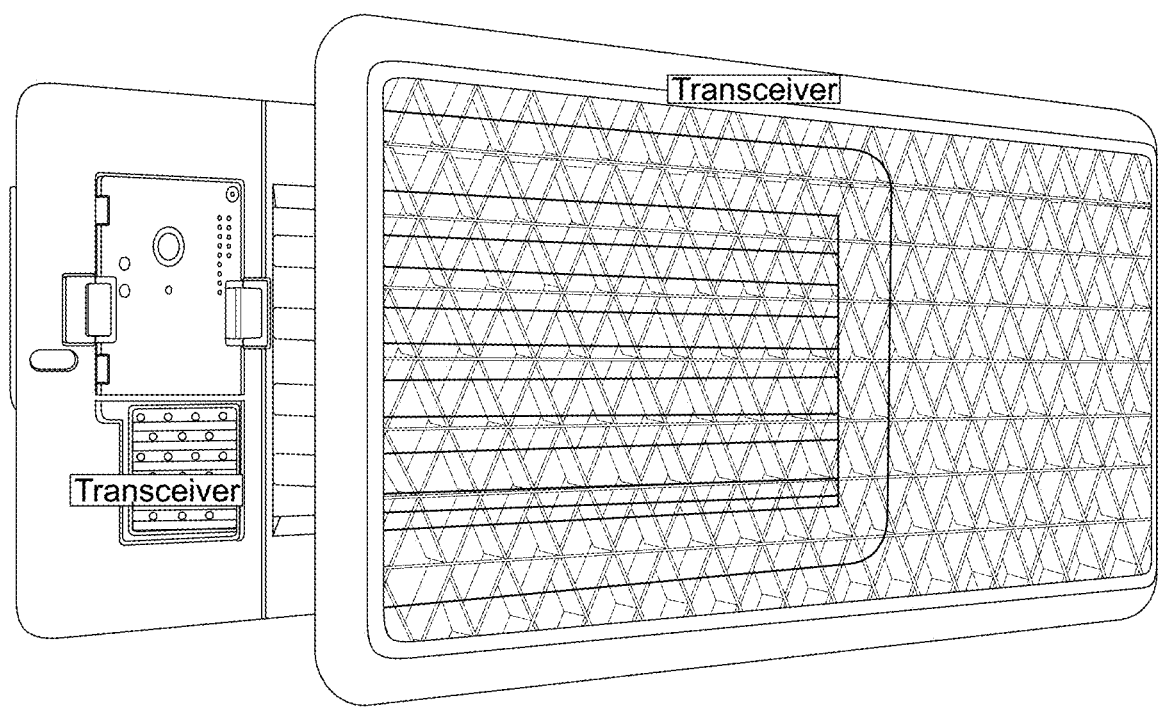

FIGS. 42a and 42b show a diagram of an embodiment of a vital signs device and a stand according to this disclosure. In particular, a vital signs device (e.g. Welch Allyn type) can be used on the stand (e.g. Welch Allyn type), mounted on a wall, or mounted to an IV pole mount. The vital signs device includes a battery, which can be rechargeable or non-rechargeable. The battery can be or avoid being button cell, cylindrical, flat cuboid, cube, spherical, conical, or pyramidal. The vital signs device includes a probe, a pulse oximeter, an inflatable cuff, or others. For example, the vital signs device can be configured to obtain blood pressure (e.g. noninvasive), heart pulse, temperature (e.g. axillary, rectal), SpO2 reading, or others. The vital signs device or the stand can be stationary (e.g. anchored, secured, mated, or fastened to a wall, floor, or ceiling) or mobile, which can be inclusive of wheels. The vital signs device or the stand, inclusive of any component thereof, can operate as a control panel or a load device, as disclosed herein. The vital signs device or the stand can include a sensor, as disclosed herein (e.g. battery, capacitor, or mains powered). The sensor can trigger any input or output action of an input device or an output device of the vital signs device or the stand. The vital signs device or the stand can include a controller, as disclosed herein, and a user interface, as disclosed herein, where the controller is electrically coupled to the user interface, as disclosed herein. The vital signs device or the stand can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the vital signs device or the stand can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the vital signs device or the stand can be combined with all embodiments, devices, systems, features, or components thereof, as disclosed herein, and can be used to perform all methods, processes, algorithms, or sequences, as disclosed herein.

FIGS. 43a-43d show a plurality of diagrams of a plurality of embodiments of a plurality of powered vents/registers/dampers according to this disclosure. In particular, a vent/register/damper can be a supply unit or a return unit in a residential, industrial, commercial, or vehicular HVAC system. The vent/register/damper can include a frame (e.g. rectangular, square, oval, triangular, polygonal, circular). The frame can be covered by a grill cover. The grill cover can be coupled (e.g. fastening, mating, interlocking, mounting, bracketing, snapping, hook-and-looping, adhering, magnetizing, suction cupping) to the frame, an HVAC duct, a wall, a floor, a ceiling, a vertical member, a horizontal member, or a diagonal member.

The frame can host a battery, which can be rechargeable or non-rechargeable. The battery can be or avoid being button cell, cylindrical, flat cuboid, cube, spherical, conical, or pyramidal.

The frame can also host a processor (e.g. single core, multicore, processing circuit, PLC), a mover (e.g. electric motor, brushed motor, brushless motor, actuator), a sensor (e.g. pressure, humidity, temperature), and a transceiver, some, many, most, or all can be powered via the battery. The processor can be in communication (e.g. wired, wireless) with the mover, the sensor, and the transceiver. The processor can control the mover. The sensor can sense various operational parameters of the vent/register/damper, such as pressure, static pressure, dynamic pressure, temperature, humidity, air blockage, or others. The processor can control the motor based on the sensor. The transceiver (e.g. transmitter or receiver) that can receive (e.g. wired, wirelessly) or send (e.g. wirelessly) information to a computing device distal to or spaced apart from the vent/register/damper.

The frame can further host a plurality of blades/foils/fins/grates (e.g. rectangular, square, oval, triangular, polygonal, circular, teardrop cross-section, uniform cross-section, varying cross-section) that can move (e.g. tilt, rotate, pivot, slide, cascade, telescope) relative to the frame along a vertical, horizontal, or diagonal axis. The blades/foils/fins/grates can be configured to move based on a manual input (e.g. user adjustment). The blades/foils/fins/grates can be coupled (e.g. gears, shafts, brackets, hinges, pulleys, cords) to the mover such that the blades/foils/fins/grates move based on the mover. The blades/foils/fins/grates can move between a plurality of positions. For example, the positions can include an open position based on which a fluid (e.g. gas, conditioned air) is output (e.g. supply) from the HVAC duct past the blades/foils/fins/grates or vice versa (e.g. return). For example, the positions can include a closed position based on which a fluid (e.g. gas, conditioned air) is not output (e.g. supply) from the HVAC duct past the blades/foils/fins/grates or vice versa (e.g. return). Note that positions intermediary between the open position and the closed positions are included as well.

The computing device can include a smartphone, a tablet, a wearable, or others. The computing unit can include a remote unit inclusive of a housing, which can be puck shaped, disc shaped, spherical, ovoid, cube, cuboid, pyramidal, cylindrical, or others. The housing can be stationary or mobile. The housing can include a battery, which can be rechargeable or non-rechargeable. The battery can be button cell, cylindrical, flat cuboid, cube, spherical, conical, or pyramidal. The housing can include a sensor, as disclosed herein. For example, the sensor can include a temperature sensor, a proximity sensor, a motion sensor, a humidity sensor, or others. The housing can include a transceiver (e.g. receiver or transmitter) that can communicate (e.g. wired, wirelessly) with the transceiver of the frame. For example, such communication can include various information (e.g. temperature, humidity, pressure, object presence) that can trigger or avoid triggering the motor (or an input or output device of the vent/register/damper) to move the blades/foils/fins/grates.

The vent/register/damper, inclusive of any component thereof, can operate as a control panel or a load device, as disclosed herein. The vent/register/damper can include a sensor, as disclosed herein (e.g. battery, capacitor, or mains powered). The sensor can trigger any input or output action of an input device or an output device of the vent/register/damper. The vent/register/damper can include a controller, as disclosed herein, and a user interface, as disclosed herein, where the controller is electrically coupled to the user interface, as disclosed herein. The vent/register/damper can include a wireless transceiver (e.g. transmitter or receiver), as disclosed herein. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the vent/register/damper can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the vent/register/damper can be combined with all embodiments, devices, systems, features, or components thereof, as disclosed herein, and can be used to perform all methods, processes, algorithms, or sequences, as disclosed herein.

Figure 44:
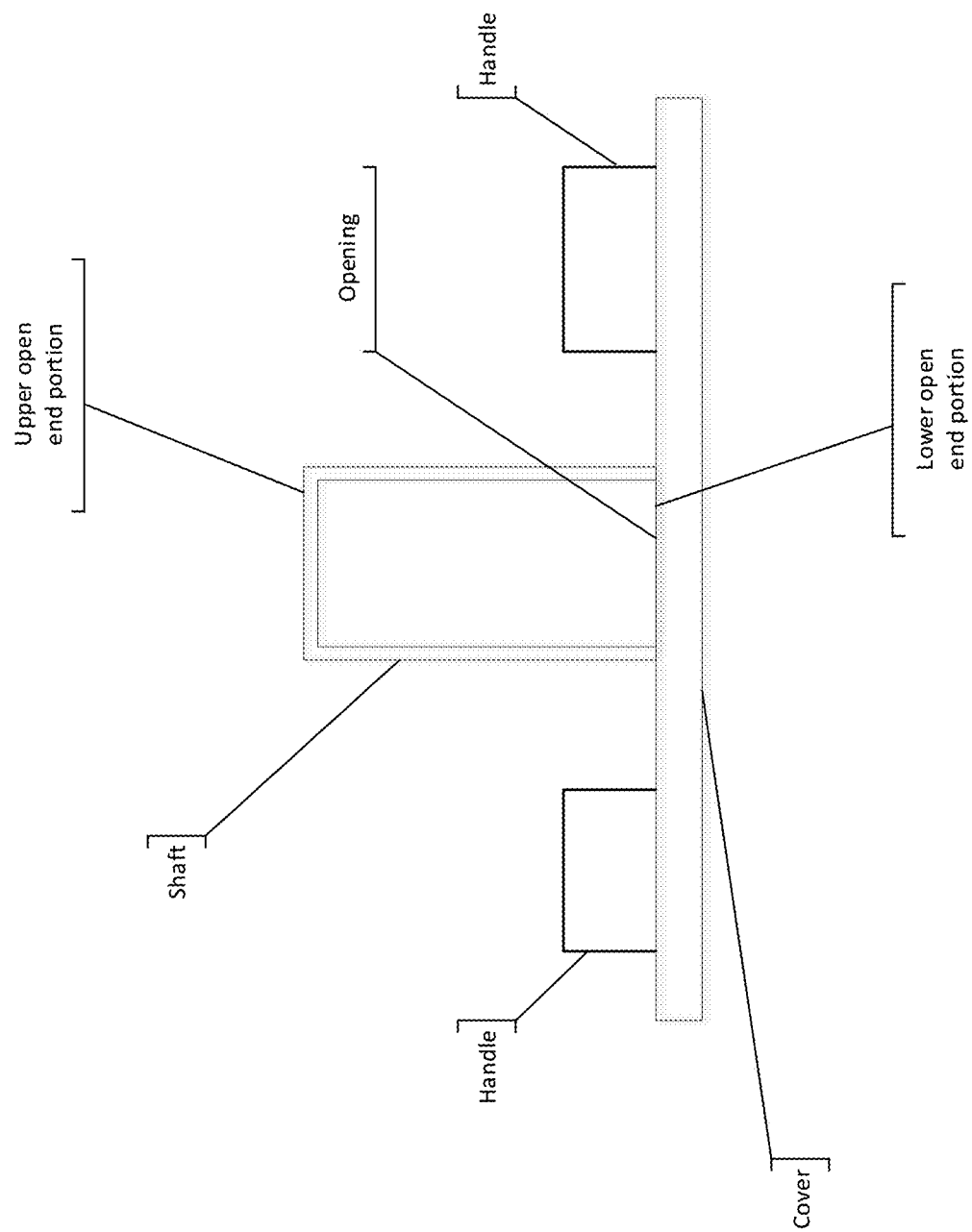
FIG. 44 shows a diagram of an embodiment of a cover of a skillet or pot according to this disclosure.

FIG. 44 shows a diagram of an embodiment of a cover of a skillet or pot according to this disclosure. In particular, a cover (e.g. circular, oval, square, polygonal) includes an opening (e.g. circular, oval, square, polygonal) therethrough. The opening can be centrally positioned, off-center, or along a periphery (e.g. perimeter, circumference) of the cover. The cover is unitary (e.g. cast, molded, 3D printed) with or assembled (e.g. fastened, mated, interlocked) with a shaft (e.g. rectilinear, arcuate, sinusoidal). The shaft is internally hollow and has an upper open-end portion (e.g. circular, oval, square, polygonal) and a lower open-end portion (e.g. circular, oval, square, polygonal). The shaft can include metal, glass, silicon, rubber, wood, ceramic, shape memory, thermally insulating material, or others. The shaft is rigid, but can be flexible, resilient, or elastic. The lower open-end portion is exposed to the opening (e.g. fluid communication, faces) such that if a food item (e.g. vegetable, meat) is dropped from the upper open-end portion toward the lower open-end portion, then the food item falls into a skillet or a pot on which the cover rests. The shaft can host a hatch or trapdoor (e.g. sliding, hinged, elastic, resilient, rigid, flexible, solid, perforated) at or between the upper open-end portion and the lower open-end portion, whether internally or externally. The hatch or trapdoor can include rubber, silicon, metal, wood, or other suitable materials. Likewise, the cover can host the hatch or trapdoor. Therefore, if the skillet or pot has a hot oil, then the cover reduces a splatter of the hot oil, while the shaft reduces likelihood of the splatter. The cover hosts a plurality of U-shaped, C-shaped, or D-shaped handles such that the shaft is positioned between the handles. Note that a single handle is possible as well, whether the handle extends from the cover or the shaft. The upper open-end portion can be covered with a cap. Note that more than one shaft can be used.

Figure 45A:
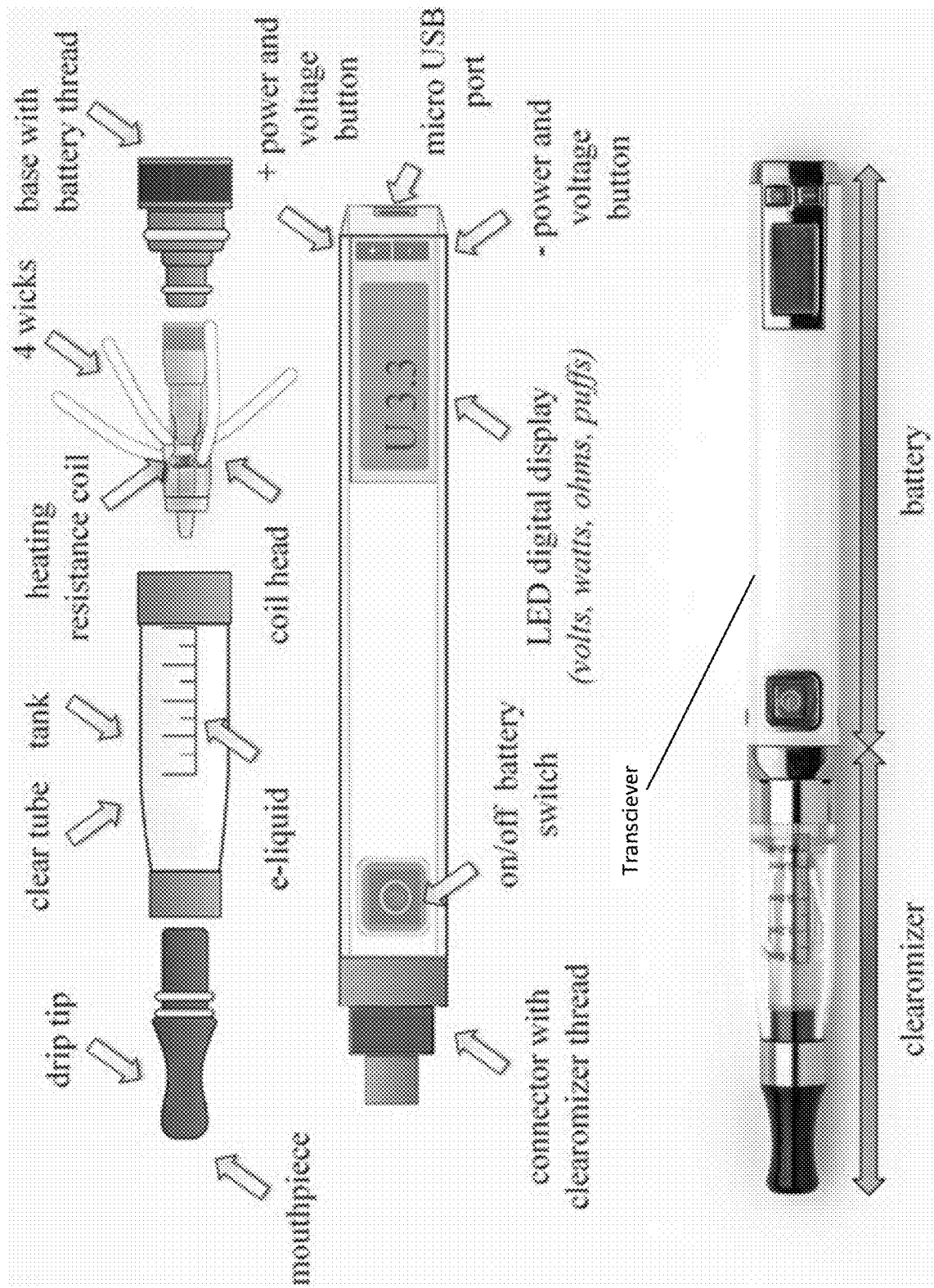
FIGS. 45a and 45b shows a plurality of embodiments of an electronic cigarette according to this disclosure.
Figure 45B:
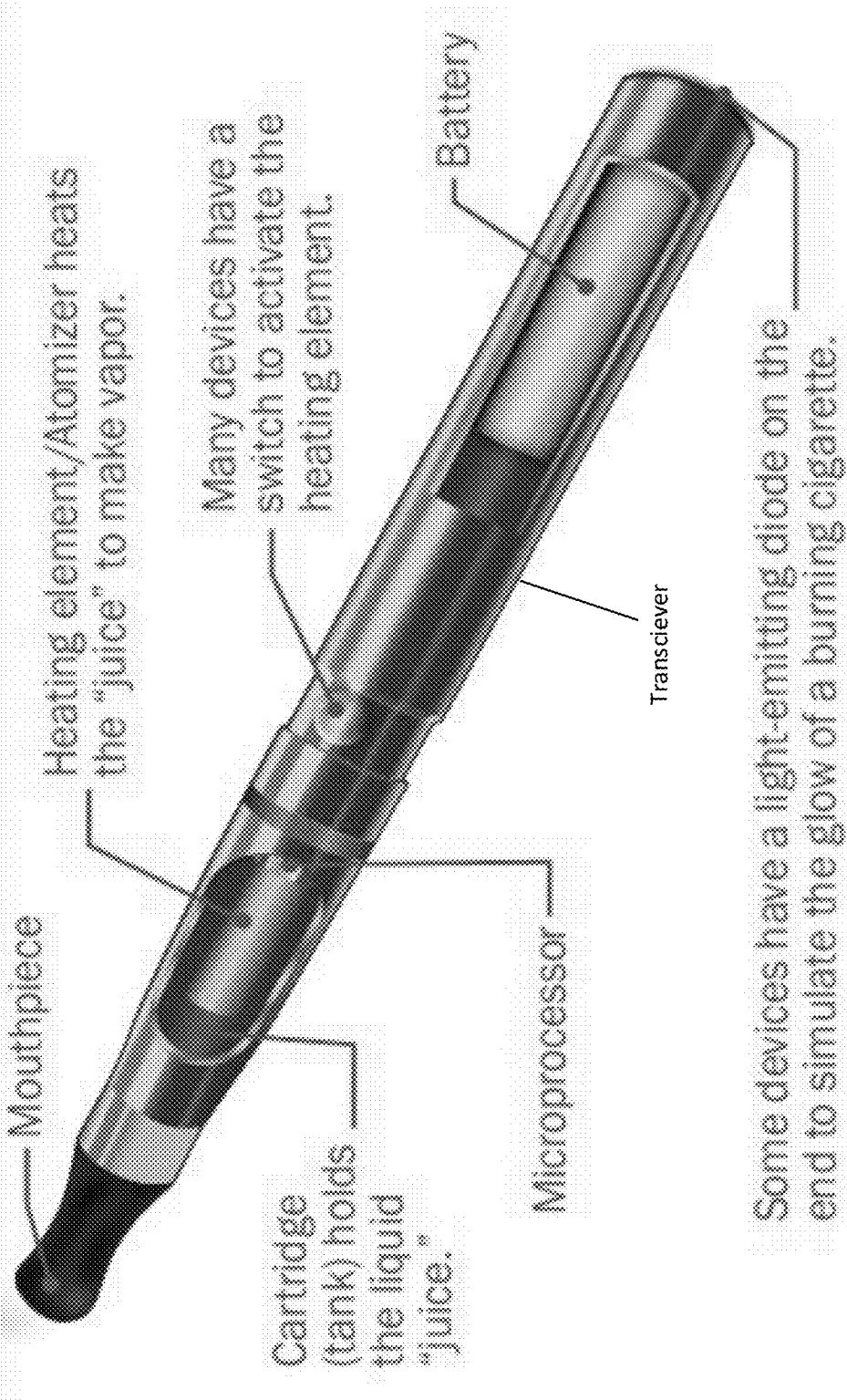

FIGS. 45*a* and 45*b* shows a plurality of embodiments of an electronic cigarette according to this disclosure. In particular, an electronic cigarette includes a handheld electronic device that simulates a feel of smoking by heating a liquid (e.g. e-liquid) to generate an aerosol (e.g. vapor) that a user inhales. For example, the liquid includes nicotine, propylene glycol, glycerine, a flavoring, or others. The electronic cigarette can include a mouthpiece, a cartridge (tank), a heating element/atomizer, a microprocessor, a battery, a transceiver, a sensor, a distal end light source, a temperature control device, a load device, or others, as disclosed herein. The atomizer comprises a small heating element, or coil, that vaporizes e-liquid and wicking material that draws liquid onto the coil. When the user pushes a button, or (in some variations) activates a pressure sensor by inhaling, then the heating element atomizes the liquid solution. The e-liquid reaches a temperature of roughly 100-250° C. within a chamber to create an aerosolized vapor, which the user then inhales. The aerosol provides a flavor and feel similar to tobacco smoking. There can be several types of electronic cigarettes: cigalikes, looking like cigarettes; eGos, bigger than cigalikes with refillable liquid tanks; and mods, assembled from basic parts or by altering existing products.

The electronic cigarette can include variable power/watt or voltage devices. Variable power and/or variable voltage have an electronic chip allowing the user to adjust at least some power applied to the heating element. The amount of power applied to the coil affects the heat produced, thus changing the vapor output. Greater heat from the coil increases vapor production. Variable power devices monitor the coil's resistance and automatically adjust the voltage to apply the user-specified level of power to the coil. The variable power/watt or voltage devices can be rectangular but can also be cylindrical. The variable power/watt or voltage devices can have a screen to show information, such as voltage, power, and resistance of the coil. To adjust the settings, the user presses buttons or rotates a dial to turn the power up or down. Some of these devices can include additional settings through their menu system such as: atomizer resistance meter, remaining battery voltage, puff counter, wireless charging level, mesh network information, and power-off or lock. The power source can include a rechargeable lithium-ion battery but others are possible (e.g. a non-rechargeable battery or a replaceable battery that is either rechargeable or non-rechargeable for power). For example, the battery can include nickel-cadmium (NiCad), nickel metal-hydride (NiMh), lithium ion (Li-ion), alkaline and lithium polymer (Li-poly), and lithium manganese (LiMn) batteries, which can also be used for any other batteries as disclosed herein. The electronic cigarette can be housed in a portable chargeable or charging case for recharging (e.g. wired, wireless far distance, wireless near distance, Qi standard).

Note that although the portable chargeable or charging case is described in context of electronic cigarettes, the portable chargeable or charging case can be used or adapted for use in any context on any device or good, as disclosed herein. For example, the medical device or Christmas decoration or others, as disclosed herein, can be charged or recharged within the portable chargeable or charging case. Further, note that the portable chargeable or charging case can be cylindrical, spherical, ovoid, cube, cuboid, polygons, or others.

The electronic cigarette (or any component thereof) or the portable chargeable or charging case (or any component thereof) can be stationary (e.g. anchored, secured, mated, or fastened to a wall, floor, or ceiling or another device) or mobile. The electronic cigarette (or any component thereof) or the portable chargeable or charging case (or any component thereof) can operate as a control panel or a load device, as disclosed herein. The electronic cigarette (or any component thereof) or the portable chargeable or charging case (or any component thereof) can include a sensor, as disclosed herein (e.g. battery, capacitor, or mains powered). The sensor can trigger any input or output action of an input device or an output device of the electronic cigarette (or any component thereof) or the portable chargeable or charging case (or any component thereof). The electronic cigarette (or any component thereof) or the portable chargeable or charging case (or any component thereof) can include a controller, as disclosed herein, and a user interface, as disclosed herein, where the controller is electrically coupled to the user interface, as disclosed herein. The electronic cigarette (or any component thereof) or the portable chargeable or charging case (or any component thereof) can include a wireless transceiver (e.g. transmitter or receiver), as disclosed herein. For example, the wireless transceiver can on any internal or external portion of the electronic cigarette (or any component thereof) or the portable chargeable or charging case (or any component thereof). For example, the wireless transceiver can be positioned within about 1/10, 2/10, 3/10, 4/10, 5/10, 6/19, 7/10, 8/10, or 9/10 of longitudinal length from the mouthpiece or at an end portion distal to the mouthpiece. The wireless transceiver, as any wireless transceiver, as disclosed herein, can be extend rectilinearly, non-rectilinearly, arcuate, circular, sinusoidal, helical, polka dot manner, zigzag, pulse, sawtooth, or other manners along an outer or inner surface of the electronic cigarette (inclusive any component thereof). The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the electronic cigarette (or any component thereof) or the portable chargeable or charging case (or any component thereof) can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or information signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the electronic cigarette (or any component thereof) or the portable chargeable or charging case (or any component thereof) can be combined with all embodiments, devices, systems, features, or components thereof, as disclosed herein, and can be used to perform all methods, processes, algorithms, or sequences, as disclosed herein.

In some embodiments, a device, as any device disclosed herein, inclusive of any component thereof, can operate as a control panel or a load device, as disclosed herein. The device can include a housing, a case, an encasement, a casing, an enclosure, a frame, a member, a chassis, a platform, a cable, a rope, a chain, a fabric, or others and can be equipped with or host all devices disclosed herein, component of all devices disclosed herein, feature of all devices disclosed herein in all combinatory manner or can be configured to perform all methods disclosed herein, algorithm disclosed herein, technique disclosed herein, process disclosed herein in all combinatory manners. The device can include a controller and a user interface, where the controller is electrically coupled to the user interface, as disclosed herein. The device can include a sensor or a wireless transceiver (e.g. transmitter or receiver), as disclosed herein. The sensor can trigger any input or output action of an input device or an output device of the device. The user interface or the controller can control the wireless transceiver, as disclosed herein. For example, the wireless transceiver can be configured to send a wireless power signal or receive a wireless power signal, as disclosed herein. For example, the wireless transceiver can be configured to send a wireless control or informational signal or receive a wireless control or informational signal, as disclosed herein. For example, the device can include a wireless power signal transceiver and a wireless control or information signal transceiver. For example, the wireless transceiver can operate as a wireless power signal source or target or as a wireless control or information signal source or target. For example, the wireless transceiver can operate as an independent, master, or slave node (e.g. wireless power signal hotspot, wireless power signal broadcaster, wireless power signal rebroadcaster, wireless power signal repeater, wireless power signal booster, or wireless power signal range extender) in a wireless charging mesh network (e.g. wirelessly charge other mobile devices or stationary devices) or an independent, master, or slave node (e.g. wireless control or informational signal hotspot, wireless control or informational signal broadcaster, wireless control or informational signal rebroadcaster, wireless control or informational signal repeater, wireless control or informational signal booster, or wireless control or informational signal range extender) in a wireless control or informational mesh network (e.g. wirelessly control other mobile devices or stationary devices). However, note that a wireless charging network or a wireless control or informational network can also be star-based or tree-based. Also, note that the device can be combined with all embodiments, devices, systems, or components thereof as disclosed herein and can be used to perform all methods, processes, algorithms, or sequences, as disclosed herein.

For example, the device can plug into a cigarette lighter port, a charging port, or a data port of vehicle, as disclosed herein. The data port can include USB, Lightening, or others.

For example, the device can be hosted on a top portion (e.g. arcuate bar) of a steering wheel of a vehicle, as disclosed herein, when the steering wheel is in a default straight position. The device can be hosted on a vent of a vehicle, as disclosed herein, whether by front seats, middle seats, side seats, or back seats, and enables a signal mesh (or star or tree) network within the vehicle, as disclosed herein. However, note that other parts of the vehicle, whether internal or external, can also host the device. Some of these parts include a rear-view mirror (e.g. internal, external), a button, a knob, a handle (e.g. door, ceiling, fixed, pivoting), a visor, a gear or drive mode shift lever, dial, or button, (to switch gears or drive modes), a cup holder, a pedal, a steering wheel, a headrest (e.g. front, side, floor, ceiling, or back facing), a seat (e.g. back portion, flat portion), a floor, a ceiling, a window, a pillar, a seat belt, a buckle, a trunk, a hood, an engine, a gear system, a catalytic converter, a sensor, or others.

For example, the device can include a smart fabric (e.g. interweaved fiber circuitry) where the processor, the memory, the sensor, the transceiver, the receiver, or other devices, as disclosed herein, are interweaved thereinto. Therefore, the device with the smart fabric can communicate with another device having another smart fabric. This communication can include control information or wireless power signals. For example, if a first wearable (e.g. sweater, shoe, shirt, undergarments) has the smart fabric and a second wearable (e.g. buttoned shirt, sock, sweater, pants) has the smart fabric, then the first wearable can communicate with the second wearable or wirelessly charge the second wearable or vice versa. Note that this is not limited to wearables, but can be applied to bedding (e.g. pillowcases, pillows, blankets, comforters, sheets), napkins, curtains, cushions, furniture fabrics, vehicular seat or belt fabrics, toys, medical fabrics (e.g. patches, bandages) or others.

For example, the device can include a phone stand (e.g. L-shaped, T-shaped, V-shaped, U-shaped, D-shaped, F-shaped, S-shaped, C-shaped, butterfly, clamshell, hinged, magnetic, suction cupped, vehicular) or a tablet stand (e.g. L-shaped, T-shaped, V-shaped, U-shaped, D-shaped, F-shaped, S-shaped, C-shaped, butterfly, clamshell, hinged, magnetic, suction cupped, vehicular). The phone stand or the tablet stand can include a chargeable battery, a first wireless power transceiver, whether near-field or far-field, and a second wireless power transceiver, whether near-field or far-field. The battery can be wirelessly charged via the first wireless power transceiver (e.g. far-field). The phone stand or the tablet stand can wirelessly charge a phone or a tablet, respectively, from the battery via the second wireless power transceiver (e.g. near-field) when the phone stand supports the phone or the tablet stand supports the tablet, respectively.

Aspects of this disclosure may be embodied as a system, a method, and/or a computer program product. Accordingly, some implementations of this disclosure may be embodied in an entirely hardware embodiment, an entirely software embodiment (including firmware, resident software, microcode, and so forth), or an embodiment combining software and hardware aspects that may all generally be referred to herein as a "circuit," "module" or "system." Furthermore, some implementations of this disclosure may take the form of a computer program product embodied in a computer readable medium having computer readable program code embodied thereon. The computer readable medium may be a computer readable signal medium or a computer readable storage medium (including, but not limited to, non-transitory computer readable storage media). The computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include an electrical connection having a wire, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or others. In the context of this disclosure, the computer readable storage medium may be any tangible medium that can contain, or store a program for use by or in connection with an instruction execution system, apparatus, or device. The computer readable signal medium may include a propagated data signal with computer readable program code embodied therein, for example, in baseband or as part of a carrier wave. Such propagated signal may take any of a variety of forms, including, but not limited to, electromagnetic, optical, or others. The computer readable signal medium may be any computer readable medium that is not a computer readable storage medium and that can communicate, propagate or transport a program for use by or in connection with an instruction execution system, an apparatus or a device. At least some program code embodied on a computer readable medium may be transmitted using any appropriate medium, including but not limited to wireless, wired, optical fiber cable, radio frequency, and so forth, or any suitable combination of the foregoing. Computer program code for carrying out operations for aspects of this disclosure may be written in any combination of programming languages, including an object-oriented programming language, such as Java, Smalltalk, C #, C++ or others, and procedural programming languages, such as the "C" programming language or other programming languages, such as XML, JavaScript, Python, Ruby, or others. The program code may execute entirely on a user's computer, partly on the user's computer, as a stand-alone software package, partly on the user's computer and partly on a remote computer or entirely on the remote computer or server. In latter scenario, the remote computer may be connected to the user's computer through any type of network, including a local area network (LAN) or a wide area network (WAN), or a connection may be made to an external computer (for example, through the Internet using an Internet Service Provider).

This disclosure has been presented for purposes of illustration and description, but is not intended to be fully exhaustive or limited to form disclosed. Many modifications and variations in techniques and structures will be apparent to skilled artisans without departing from scope and spirit of this disclosure. Accordingly, such modifications and variations are contemplated as being included in this disclosure.

What is claimed is:

1. A system, comprising:
    a far-field wireless power receiver electrically coupled to at least one of (i) a fixture or (ii) an electrical load positioned in at least one a bathroom or a shower room;
    a housing having a plurality of holes;
    a plurality of pongs directly extending from the housing through the holes, wherein the prongs are configured for plugging into an electrical socket; and
    a far-field wireless power transmitter powered via the prongs when the prongs are plugged into the electrical socket, wherein the housing houses the far-field wireless power transmitter such that the far-field wireless power transmitter is able to send a far-field wireless power signal to the far-field wireless power receiver electrically coupled to at least one of (i) the fixture as the far-field wireless power signal includes at least one of a light wave or a sound wave, or (ii) the electrical load as the electrical load and the electrical socket are co-positioned in at least of the bathroom or the shower room.
2. The system of claim 1, wherein the far-field wireless power transmitter is a radio transmitter.
3. The system of claim 1, wherein the far-field wireless power transmitter is a line-of-sight transmitter, wherein the far-field wireless power signal includes at least one of light wave or a sound wave.
4. The system of claim 3, wherein the housing includes an outer side from which the line-of-sight transmitter transmits.
5. The system of claim 4, wherein the outer side is a sidewall.
6. The system of claim 4, wherein the outer side is a face.
7. The system of claim 4, wherein the outer side is a top side or a bottom side.
8. The system of claim 1, further comprising:
    a sensor powered via the prongs when the prongs are plugged into the electrical socket, wherein the housing houses the sensor, wherein the far-field wireless power transmitter is operative based on the sensor.
9. The system of claim 1, wherein the housing houses the far-field wireless power transmitter such that the far-field wireless power transmitter is able to send the far-field wireless power signal to the far-field wireless power receiver electrically coupled to the fixture.
10. The system of claim 9, wherein the fixture is a door.
11. The system of claim 9, wherein the fixture is a door frame.
12. The system of claim 9, wherein the fixture is secured to a wall.
13. The system of claim 9, wherein the fixture is a window blind.
14. The system of claim 9, wherein the fixture is a window shade.
15. The system of claim 9, wherein the fixture is a plumbing fixture.
16. The system of claim 9, wherein the fixture is a light fixture.
17. The system of claim 1, wherein the housing houses the far-field wireless power transmitter such that the far-field wireless power transmitter is able to send the far-field wireless power signal to the far-field wireless power receiver electrically coupled to the electrical load positioned in at least one of the bathroom or the shower room.
18. The system of claim 17, wherein the electrical load is positioned in the bathroom.
19. The system of claim 18, wherein the electrical load is of an installed fixture.
20. The system of claim 17, wherein the electrical load is positioned in the shower room.
21. The system of claim 20, wherein the electrical load is of an installed fixture.
22. A method, comprising:
    providing a device to a user, wherein the device includes a housing, a plurality of prongs, and a far-field wireless power transmitter, wherein the housing has a plurality of holes,wherein the prongs directly extend from the housing through the holes wherein the prongs are configured for plugging into an electrical socket, wherein the far-field wireless power transmitter is powered via the prongs when the prongs are plugged into the electrical socket, wherein the housing houses the far-field wireless power transmitter,
    wherein the device is provided to the user such that the prongs are plugged into the electrical socket by the user and power the far-field wireless power transmitter and the far-field wireless power transmitter transmits a far-field wireless power signal to a far-field wireless power receiver electrically coupled to at least one of (i) a fixture as the far-field wireless power signal includes at least one of a light wave or a sound wave or an electrical load as the electrical load and the electrical socket are co-positioned in at least one of a bathroom or a shower room.

23. The method of claim 22, wherein the far-field wireless power transmitter is a line-of-sight transmitter, wherein the far-field wireless power signal includes the light wave or the sound wave.

24. The method of claim 22, wherein the far-field wireless power transmitter is a radio transmitter.

25. The method of claim 22, wherein providing the device to the user is such that the prongs are plugged into the electrical socket by the user and power the far-field wireless power transmitter to transmit the far-field wireless power signal to the far-field wireless power receiver electrically coupled to the fixture.

26. The method of claim 25, wherein the fixture is a door.

27. The method of claim 25, wherein the fixture is a door frame.

28. The method of claim 25, wherein the fixture is secured to a wall.

29. The method of claim 25, wherein the fixture is a window blind.

30. The method of claim 25, wherein the fixture is a window shade.

31. The method of claim 25, wherein the fixture is a plumbing fixture.

32. The method of claim 25, wherein the fixture is a light fixture.

33. The method of claim 22, wherein providing the device to the user is such that the prongs are plugged into the electrical socket by the user and power the far-field wireless power transmitter to transmit the far-field wireless power signal to the far-field wireless power receiver electrically coupled to the electrical load positioned in at least one of the bathroom or the shower room.

34. The method of claim 33, wherein the electrical load is positioned in the bathroom.

35. The method of claim 34, wherein the electrical load is of an installed fixture.

36. The method of claim 33, wherein the electrical load is positioned in the shower room.

37. The method of claim 36, wherein the electrical load is of an installed fixture.

38. A method, comprising:
accessing a device including a housing, a plurality of prongs, and a far-field wireless power transmitter, wherein the housing has a plurality of holes, wherein the prongs directly extend from the housing through the holes, wherein the prongs are configured for plugging into an electrical socket, wherein the far-field wireless power transmitter is powered via the prongs when the prongs are plugged into the electrical socket, wherein the housing houses the far-field wireless power transmitter; and
operating the device such that the prongs are plugged into the electrical socket and power the far-field wireless power transmitter and the far-field wireless power transmitter transmits a far-field wireless power signal to a far-field wireless power receiver electrically coupled to at least one of (i) a fixture as the far-field wireless power signal includes at least one of a light wave or a sound wave or (ii) an electrical load as the electrical load and the electrical socket are co-positioned in at least one of a bathroom or a shower room.

39. The method of claim 38, wherein operating the device is such that the prongs are plugged into the electrical socket by the user and power the far-field wireless power transmitter to transmit the far-field wireless power signal to the far-field wireless power receiver electrically coupled to the fixture.

40. The method of claim 39, wherein the fixture is a door.

41. The method of claim 39, wherein the fixture is a door frame.

42. The method of claim 39, wherein the fixture is secured to a wall.

43. The method of claim 39, wherein the fixture is a window blind.

44. The method of claim 39, wherein the fixture is a window shade.

45. The method of claim 39, wherein the fixture is a plumbing fixture.

46. The method of claim 39, wherein the fixture is a light fixture.

47. The method of claim 38, wherein operating the device is such that the prongs are plugged into the electrical socket and power the far-field wireless power transmitter to transmit the far-field wireless power signal to the far-field wireless power receiver electrically coupled to the electrical load positioned in at least one of the bathroom or the shower room.

48. The method of claim 47, wherein the electrical load is positioned in the bathroom.

49. The method of claim 48, wherein the electrical load is of an installed fixture.

50. The method of claim 47, wherein the electrical load is positioned in the shower room.

51. The method of claim 50, wherein the electrical load is of an installed fixture.

* * * * *